United States Patent

Ohashi et al.

[11] Patent Number: 6,142,026
[45] Date of Patent: Nov. 7, 2000

[54] WHEEL INFORMATION ESTIMATING APPARATUS

[75] Inventors: Hideki Ohashi; Hiroyuki Kawai, both of Susono; Hiroyoshi Kojima, Nishio; Takaji Umeno, Aichi-ken; Katsuhiro Asano, Toyoake; Toshiharu Naito, Okazaki; Nobuyoshi Onogi, Nagoya, all of Japan

[73] Assignees: Toyota Jidosha Kabushiki Kaisha, Toyota; Kabushiki Kaisha Toyota Chuo Kenkyusho, Aichi-gun, both of Japan

[21] Appl. No.: 08/458,099

[22] Filed: Jun. 1, 1995

[30] Foreign Application Priority Data

Jun. 6, 1994 [JP] Japan .................... 6-123858
Jun. 24, 1994 [JP] Japan .................... 6-143641

[51] Int. Cl.⁷ .......................... G01M 15/00; B60C 23/00; B60C 23/06; G01L 17/00
[52] U.S. Cl. ...................... 73/865.9; 73/146.2; 701/37; 701/65
[58] Field of Search ................ 73/117, 146, 146.2, 73/146.3, 146.5; 701/37, 65

[56] References Cited

U.S. PATENT DOCUMENTS

| | | | |
|---|---|---|---|
| 5,343,741 | 9/1994 | Nishihara et al. | 73/146.2 |
| 5,497,657 | 3/1996 | Taguchi et al. | 73/146.2 |
| 5,531,110 | 7/1996 | Ohashi et al. | 73/146 |
| 5,553,491 | 9/1996 | Naito et al. | 73/146.5 |
| 5,557,552 | 9/1996 | Naito et al. | 364/424.03 |
| 5,561,415 | 10/1996 | Dieckmann | 364/424.03 |
| 5,583,483 | 12/1996 | Baumann | 73/146 |
| 5,589,815 | 12/1996 | Nishihara et al. | 340/444 |
| 5,596,141 | 1/1997 | Nishikawa et al. | 73/146.2 |

FOREIGN PATENT DOCUMENTS

| | | |
|---|---|---|
| 1-0 555 073 | 8/1993 | European Pat. Off. . |
| 0 578 826 A1 | 1/1994 | European Pat. Off. . |
| 0 636 503 A1 | 2/1995 | European Pat. Off. . |
| 0 695 653 | 2/1996 | European Pat. Off. . |
| 62-149502 | 7/1987 | Japan . |
| 62-149503 | 7/1987 | Japan . |
| 2-45461 U | 3/1990 | Japan . |
| 5-133831 | 5/1993 | Japan . |
| 2 241 672 | 9/1991 | United Kingdom . |
| 2 270 167 | 3/1994 | United Kingdom . |

OTHER PUBLICATIONS

English language Abstract of Japanese 5–133831 (May 28, 1993).

*Primary Examiner*—George Dombroske
*Attorney, Agent, or Firm*—Oliff & Berridge, PLC

[57] ABSTRACT

A wheel information estimating apparatus, which includes: a detecting device for detecting a wheel motion state relating to a movement of a tired wheel of a motor vehicle; an estimating device for estimating wheel information relating to the tired wheel, on the basis of the wheel motion state detected by the detecting device; and a modifying device for modifying an element relating to estimation of the wheel information, so as to improve an accuracy of estimating the wheel information. The element to be modified is selected from a movement of a center of rotation of the tired wheel as viewed in a plane in which the wheel is rotated, a signal applied from the detecting device to the estimating device, and an internal parameter used by the estimating means for estimating the wheel information.

14 Claims, 40 Drawing Sheets

WHEEL INFORMATION ESTIMATING APPARATUS

BACKGROUND OF THE INVENTION

1. Field of the Invention

The present invention relates to an apparatus adapted to estimate a certain kind of information relating to a tired wheel (hereinafter referred to as "vehicle wheel" or "wheel") of a motor vehicle, on the basis of a parameter indicative of the motion of the wheel, and particularly to techniques for improving the accuracy of estimating the wheel information.

2. Discussion of Related Art

For controlling a motor vehicle, it is useful and significant to known the motions and changing characteristics of the wheels of the vehicle, because the wheels are the only components at which the vehicle contacts a road surface. However, it is not easy to directly detect the motions and the changing characteristics of the vehicle wheels during running of the vehicle, since the wheels are attached to the body of the vehicle through a suspension system such that the wheels are displaceable relative to the vehicle body, and since the wheels are rotated.

For a motor vehicle equipped with wheels having tires that are inflated by compressed air so as to maintain a suitable degree of elasticity, for example, the air pressure in the tires has an important effect or influence on the operating characteristics of the wheels. Accordingly, it is desirable to detect the air pressure levels of the wheel tires, but the detection of the tire pressure is also difficult.

The air pressure of a wheel tire may be detected by a pneumatic pressure sensor attached thereto. However, it is not easy to transmit the output of the sensor on the rotating tire to a desired position on the vehicle body while the vehicle is running. It is also possible to determine the tire pressure on the basis of a change in the distance between the road surface and the vehicle body, which change occurs due to deformation of the wheel tire as the tire pressure is lowered. Further, it is possible to estimate a decrease of the tire pressure of one or more wheels as compared with the tire pressure of the other wheels, depending upon the detected rotating speeds of the wheels, based on a fact that the tire pressure decreases with an increase in the rotating speed. However, these methods do not assure accurate detection of the tire pressure. In particular, the latter method does not permit the detection of a decrease of the tire pressure of any wheel if the tire pressure levels of all the wheels whose speeds are detected are lowered.

In the light of the difficulty in detecting a change in the tire pressure of a vehicle wheel, JP-A-62-149502 proposes a tire pressure detecting apparatus which operates depending on a fact that the tire pressure changes with an amount or rate of change of the rotating speed of the corresponding wheel when an external force acting on the wheel varies for some reason, for example, when the wheel runs over a projection of the road surface. Since the maximal value of the amount of change of the rotating speed of the wheel decreases with a decrease in the tire pressure, the tire pressure can be estimated on the basis of the detected maximal value of the wheel speed change amount. The tire pressure detecting apparatus includes signal generating means for generating a signal when the detected amount of change of the wheel speed is higher than a predetermined threshold value, and tire pressure estimating means responsive to that signal, for estimating the tire pressure on the basis of the maximal value of the wheel speed change amount.

However, the condition of the road surface that permits the above-indicated apparatus to detect the tire pressure is limited. Described in detail, the tire pressure can be estimated from the maximal value of the detected wheel speed change amount, only where the relevant wheel runs over a single projection on the road surface. When the wheel passes successive projections and recesses on a bumpy or washboard road surface, changes of the rotating speed of the wheel due to those projections and recesses overlap each other, whereby the maximum value of the detected wheel speed change amount is not commensurate with the tire pressure, making it impossible to effect accurate detection of the tire pressure.

While the difficulty of detecting the tire pressure of the vehicle wheel has been described above by way of example, it has been also difficult to detect other parameters indicative of the motion of the vehicle wheel, such as the angular velocity, angular acceleration, vertical or normal speed, and vertical or normal acceleration of the wheel, and the changing states of the other characteristics of the vehicle wheel and/or tire, such as the eccentricity of the wheel, replacement of the metal wheel member per se, wear of the tire, and attachment of a foreign matter to the tire.

In view of the above situation, the present inventors proposed a wheel information estimating apparatus which includes (a) a detecting device for detecting a wheel motion state or parameter indicative of the motion of a tired wheel of a motor vehicle; (b) a disturbance observer for estimating a disturbance acting on the wheel, on the basis of at least the detected wheel motion state, and a basic value indicative of a specific kind of wheel information about the tired wheel; (c) means for estimating an amount of change from the basic value to a current value indicative of a current state of the wheel information of the tired wheel, on the basis of the disturbance detected by the disturbance observer, and (d) means for estimating the wheel information which is a sum of the estimated amount of change and the basic value indicated above.

The disturbance which acts on the tired wheel is not limited to that given to the wheel from the road surface due to its irregularity. That is, the tired wheel may also suffer from other disturbance components such that those due to a change or variation in the moment of inertia or spring constant of the wheel. The moment of inertia of the tired wheel varies due to wear of the tire, attachment of some foreign matter to the tire, replacement of the tire or metal wheel member with a new one, and the like. The spring constant of the tired wheel varies due to a change of the air pressure of the tire and the like.

As a result of a further study on the wheel information estimating apparatus as described above, the present inventors found the following facts. That is, the disturbance observer is constructed using a dynamic model of a tired wheel. If the dynamic model is required to represent a lot of vibrational modes relating to the wheel, the construction of the disturbance observer becomes complicated, making it difficult to improve its estimating accuracy. On the other hand, the wheel motion state has a frequency characteristic which has a certain relationship with the estimating accuracy of the disturbance observer for estimating the specific kind of information about the tired wheel. The present inventors found that if the frequency characteristic of the wheel motion state is optimally controlled, the estimating accuracy of the disturbance observer can be easily improved, without using such a complicated dynamic model of the wheel.

Another type of wheel information estimating apparatus is proposed in JP-A-5-133831. This apparatus includes a detecting device adapted to detect a rotating speed of a tired wheel as a wheel motion state, and estimating means for estimating an air pressure of a tire as a specific kind of wheel information, on the basis of a frequency characteristic of the wheel motion state, which is received from the detecting device. More specifically, the tire air pressure is estimated on the basis of the frequency of a selected one of a plurality of frequency components of the wheel motion state, which selected one having substantially the greatest strength within a predetermined frequency range. The thus constructed apparatus is referred to as a resonance-frequency type wheel information estimating apparatus.

The present inventors then found that the above-described technique of optimally controlling the frequency characteristic may be effectively applied to the wheel information estimating apparatus of the type as described just above. According to the findings of the inventors, a filter or other device may be interposed between the detecting device and the estimating means, so as to modify the frequency characteristic of the wheel motion state, by particularly emphasizing the selected one of the plural frequency components of the parameter, which is within the predetermined frequency range. The parameter having the thus modified frequency characteristic is applied to the estimating means, with a reduced burden on the estimating means, which leads to improved estimating accuracy.

That is, with respect to the wheel information estimating apparatus which generally includes (a) a detecting device for detecting a wheel motion state, and (b) an estimating device for estimating a specific wheel information on the basis of the detected wheel motion state, the present inventors found it possible to employ the above technique of optimally controlling the frequency characteristic, so as to improve the estimating accuracy of the apparatus, no matter whether the apparatus is of the former type having the disturbance observer, or of the latter type, namely, of the resonance-frequency type.

In the former type of wheel information estimating apparatus having the disturbance observer, the basic value indicative of the specific wheel information is fixed or predetermined, and the disturbance observer estimates the disturbance on the basis of the fixed basic value. A further study by the present inventors on this type of apparatus revealed that the accuracy of estimating the wheel information can be improved by changing or compensating the wheel information basic value so that the amount of change from the basic value to the current value of the wheel information is zeroed, whereby the basic value used by the disturbance observer accurately represents an actual or current state of the wheel information. This method is also effective to improve the estimating accuracy of the wheel information estimating apparatus of the former type.

SUMMARY OF THE INVENTION

It is therefore an object of the present invention to provide a wheel information estimating apparatus which is able to estimate a specific kind of information relating to a tired wheel of a motor vehicle, with significantly improved accuracy.

The above object may be accomplished according to the principle of the present invention, which provides a wheel information estimating apparatus, comprising: a detecting device for detecting a wheel motion state relating to a movement of a tired wheel of a motor vehicle; estimating means for estimating wheel information relating to the tired wheel, on the basis of the wheel motion state detected by the detecting device; and modifying means for modifying an element relating to estimation of the wheel information, so as to improve an accuracy of estimating the wheel information, the element being at least one of: a movement of a center of rotation of the tired wheel as viewed in a plane in which the wheel is rotated; a signal applied from the detecting device to the estimating means; and an internal parameter used by the estimating means for estimating the wheel information.

The wheel motion state as indicated above may be selected from among an angular velocity, angular acceleration, vertical velocity, vertical acceleration, longitudinal velocity, and longitudinal acceleration. With respect to a tired wheel which has a rim and a belt that are connected to each other through a torsion spring, for example, the wheel information as indicated above may be selected from among: an air pressure of a tire of the tired wheel; a radius of the tire; the moment of inertia of the tired wheel, more specifically, the moment of inertia of the rim and that of the belt; a spring constant of the torsion spring; a damping coefficient of the tire; a degree of contact of the tired wheel with a road surface, and a cornering power of the tire.

In one advantageous form of the wheel information estimating device as described above, the modifying means includes frequency characteristic modifying means for providing an optimum frequency characteristic of the wheel motion state to be supplied to the estimating means, by increasing a ratio of a strength of a selected one of a plurality of frequency components of the wheel motion state, the selected one being within a selected frequency range, to a strength of the other frequency components outside the selected frequency range. In the above form of the invention, the frequency characteristic modifying means selects one of the plural frequency components of the wheel motion state, which is within the selected frequency range, increases the ratio of the strength of the selected frequency component to that of the other frequency components outside the selected frequency range, and applies the thus modified frequency characteristic to the estimating means. Accordingly, the accuracy of estimating the wheel information can be easily improved by setting the above selected frequency range to a frequency range in which the estimating means is able to estimate the wheel information with high accuracy. Since the estimating means receives the optimum frequency characteristic of the wheel motion state, the present apparatus is able to utilize a simplified dynamic model of the tired wheel for estimation of the wheel information, thus assuring sufficiently high estimating accuracy. The above-indicated ratio of the strength of the selected frequency component of the wheel motion state to that of the other components may be increased either by increasing the strength of the selected frequency component, or reducing the strength of the other frequency components.

In the above form of the present invention, the frequency characteristic modifying means may include means for changing the selected frequency range, on the basis of at least one of an estimated value of the wheel information obtained by the estimating means, and a related value of the estimated value.

The frequency characteristic representing the wheel motion state is not always constant, but varies with a vehicle speed, for example. If the selected frequency range is fixed regardless of such variation of the frequency characteristic, therefore, an optimum frequency characteristic suitable for estimation of the wheel information cannot be obtained. In view of this, the selected frequency range is changed by the above-indicated means, on the basis of the estimated value obtained by the estimating means, which reflects a change in the frequency characteristic of the wheel motion state. Thus, the selected frequency range varies with a change in the actual frequency characteristic of the wheel motion state.

In the above form of the present invention, the frequency characteristic modifying means may also include means for changing the selected frequency range, so that an amount of variation of an estimated value of the wheel information obtained by the estimating means is not greater than a predetermined value. That is, the selected frequency range is changed in a feed-back fashion so as to reduce the amount of change of the estimated value. Thus, the selected frequency range is always suitably determined to be suited with the actual frequency characteristic of the wheel motion state.

The frequency characteristic of the wheel motion state has a certain relationship with a locus of the center of a tired wheel as seen in the transverse direction of a motor vehicle, which is drawn upon relative movements of the tired wheel and a vehicle body through a suspension. Where a wheel speed that is a rotating speed of the wheel is chosen as the wheel motion state, and the above locus of the center of the wheel includes a front-to-rear or longitudinal component extending in a longitudinal or running direction of the vehicle as well as a vertical component, the wheel speed varies due to vibrations in the longitudinal direction of the vehicle, which are applied to the outer peripheral surface of the wheel due to wheel vibrations caused by projections and recesses of the road surface. As a result, the influence of the wheel vibrations appear in a particular frequency range of the wheel speed. Accordingly, if the geometry and the like of the suspension is designed such that the center of a circle (e.g., instantaneous circle) which approximates the locus of the center of the wheel is located as close as possible to the center of the wheel, so that the locus of the center of the wheel consists as much as possible of the front-to-rear or longitudinal component, the influence of the above wheel vibrations on the wheel speed is relatively emphasized in the particular frequency range. Conversely, if the geometry of the suspension is designed such that the center of the above-indicated approximate circle is located as far as possible from the center of the wheel, so that the locus of the center of the wheel consists as much as possible of the vertical component, the influence of the wheel vibrations on the wheel speed is relatively minimized in the particular frequency range.

The above-indicated frequency characteristic modifying means may generally consist of a digital filter or analog filter. In this case, such a filter is disposed between the detecting device and the estimating means. Since there is a certain relationship between the locus of the center of the wheel and the frequency characteristic of the wheel motion state, as described above, an optimum frequency characteristic may be achieved by appropriately designing or otherwise adjusting the suspension itself, without using the filter as described above.

In the above form of the wheel information estimating apparatus of the present invention, therefore, the frequency characteristic modifying means may include a geometry of a suspension which connects the tired wheel and a vehicle body such that the wheel and the vehicle body are displaceable relative to each other, the geometry being designed such that a center of the tired wheel provides an optimum locus as seen in a transverse direction of the motor vehicle, so as to improve accuracy of estimating the wheel information. The optimum locus of the center of the tired wheel, which is drawn upon a relative movement between the wheel and the vehicle body, results in an optimum frequency characteristic of the wheel motion state. This eliminates a need to provide such a filter as described above, or other device or program for providing the optimum frequency characteristic.

The wheel information includes some kinds of information which can be estimated with effectively improved accuracy, by relatively emphasizing the frequency component of the wheel speed (wheel motion state) which is most influenced by the wheel vibrations. When the estimating means estimates these kinds of information, the geometry of the suspension, for example, can be designed so that the influence of the wheel vibrations on the wheel speed appears particularly strongly in the frequency range, that is, so that the locus of the center of the wheel consists as much as possible of the front-to-rear or longitudinal component. This arrangement is one example of the above-indicated suspension adjusting means.

The wheel information includes other kinds of information which can be estimated with effectively improved accuracy, by relatively weakening the frequency component of the wheel speed (wheel motion state) which is most influenced by the wheel vibrations. When the estimating means estimates these kinds of information, the geometry of the suspension, for example, can be designed so that the influence of the wheel vibrations on the wheel speed hardly appears in the frequency range, that is, so that the locus of the center of the wheel consists as much as possible of the vertical component, and includes almost no front-to-rear component. This arrangement is another example of the above-indicated suspension adjusting means.

The latter example of the suspension adjusting means may provide a suspension which includes an upper arm and a lower arm, which cooperate to support a tired wheel relative to a vehicle body, such that the wheel is displaceable relative to the vehicle body. The geometry of this suspension may be designed such that the upper and lower arms extend substantially in parallel to each other as seen in the transverse direction of the vehicle, so that the locus of the center of the wheel does not substantially include a longitudinal or front-to-rear component.

In the above form of the wheel information estimating device of the present invention, the estimating means may include (a) a disturbance observer for estimating a disturbance acting on the tired wheel, on the basis of a basic value of the wheel information, and the wheel motion state received from the detecting device, and (b) means for estimating an amount of change from the basic value to a value indicative of an actual state of the wheel information, on the basis of the disturbance estimated by the disturbance observer. Since the disturbance observer receives the wheel motion state whose frequency characteristic is appropriately controlled by the frequency characteristic modifying means, the disturbance observer is able to estimate the disturbance with high accuracy, whereby the estimating means can always estimate the wheel information with high accuracy.

In the above form of the present invention, the estimating means may estimate the wheel information, on the basis of a frequency of a selected one of a plurality of frequency components of the wheel motion state received from the detecting device, the selected one of the frequency components having substantially the greatest strength within a selected frequency range. Since the estimating means receives the wheel motion state whose frequency characteristic is appropriately controlled by the frequency characteristic modifying means, the estimating means is able to obtain an appropriate frequency needed for estimation with constantly high accuracy, which leads to improved accuracy of estimating the wheel information.

In the above form of the present invention, the detecting device comprises a wheel speed detector for detecting, as the wheel motion state, a wheel speed which is a rotating speed of the tired wheel, and supplying the wheel speed to the estimating means, the estimating means estimating a degree of contact of the tired wheel with a road surface as the wheel information, on the basis of a strength of a selected one of a plurality of frequency components of the wheel speed received from the wheel speed detector, the selected one of the frequency components being within a within a selected frequency range. It is noted that the strength of the frequency component of the wheel speed which is within the selected frequency range increases with reduction in the degree of contact of the tired wheel with the road surface, that is, the road holding characteristic of the wheel. Using this relationship, the degree of contact of the wheel with the road surface is estimated on the basis of the detected wheel speed. Since the estimating means receives the wheel speed whose frequency characteristic is appropriately controlled by the frequency characteristic modifying means, the estimating means is able to obtain the strength of the frequency component needed for the estimation, which leads to improved accuracy of estimating the degree of contact between the wheel and the road surface.

In the above-described arrangements of the above form of the invention as described above, only one estimated value obtained by the estimating means is used as a final value to be generated by the same means. In this instance, even if the frequency characteristic of the wheel motion state is appropriately controlled as described above, the estimated value may vary from one cycle to another cycle of the routine for estimating the wheel information, resulting in reduced estimating accuracy. In view of this situation, the present wheel information estimating apparatus may be adapted such that the estimating means obtains a plurality of provisional estimated values of at least one of the wheel information and a parameter relating to the wheel information, so as to obtain a current final estimated value of the wheel information, on the basis of the plurality of provisional estimated values. A certain number of the provisional estimated values are used for at least one of re-estimation of the current final estimated value and estimation of a next final estimated value of the wheel information. The number of the provisional estimated values is variable depending upon whether an amount of change from a previously estimated value of the wheel information to a currently estimated value thereof is larger than a predetermined value. Since only one final value is obtained from a plurality of provisional estimated values of the wheel information, the obtained final value is less likely to be influenced by the variation in the individual provisional estimated values. Further, the number of the provisional values used for obtaining the one final value is properly changed as needed, depending upon an error in estimating the provisional values, so as to assure sufficiently high estimating accuracy of the apparatus.

In one arrangement of the wheel information estimating apparatus as described just above, the estimating means may be adapted to determine the number of provisional values used for obtaining the final value, depending upon the amount of change of the currently estimated value. In another arrangement, the estimating means may be adapted to increase the number of provisional values in increment, until the amount of change of the currently estimated value becomes equal to or smaller than the predetermined value, or increase the number of provisional values depending upon a difference between the amount of change and the threshold value.

In another form of the wheel information estimating apparatus of the present invention, the modifying means modifies the internal parameter used by the estimating means, and the estimating means includes (a) a disturbance observer for estimating a disturbance acting on the tired wheel, on the basis of at least the wheel motion state detected by the detecting device, and a basic value of the wheel information, the disturbance observer using the basic value as the internal parameter, (b) change amount estimating means for estimating an amount of change from the basic value to a value indicative of an actual state of the wheel information, on the basis of the disturbance estimated by the disturbance observer, (c) basic value compensating means as the modifying means for compensating the basic value of the wheel information to provide a compensated wheel information basic value, on the basis of the amount of change estimated by the change amount estimating means, so that the estimated amount of change is not larger than a predetermined value; and (d) wheel information estimating means for estimating the compensated wheel information basic value as the wheel information.

Where the basic value of the wheel information is determined as a fixed value, the accuracy of estimating an amount of change of the wheel information is reduced with an increase in the estimated amount of change from the basic value to the currently estimated value indicative of a current or actual state of the wheel information. This results in reduced accuracy of estimating the wheel information. If the wheel information basic value is changed so as to be close to the current value, thereby to reduce the estimated amount of change to a minimum, the wheel information can be estimated with sufficiently high accuracy. In the above form of the invention, therefore, the basic value compensating means is adapted to compensate the wheel information basic value to be used by the disturbance observer, on the basis of the estimated amount of change of the wheel information, so that the estimated change amount becomes equal to or smaller than the predetermined value, thereby to provide a compensated wheel characteristic basic value. The estimating means then estimates the wheel information on the basis of the thus compensated basic value. In this arrangement, the disturbance observer is able to estimate a disturbance with improved accuracy, thereby assuring improved accuracy of estimating the wheel information.

The disturbance observer estimates a disturbance as one of variables of state. The disturbance observer may assume a model of the tired wheel to be an integral rotary body on which a disturbance acts, or a model having a rim and a belt which are coupled with each other through a torsion spring, such that the rim and belt are rotatable relative to each other. The disturbance observer may also assume a model of the wheel having a rim and a belt which are coupled with each other, through a torsion spring and a damper which are connected in parallel with each other, such that the rim and belt are rotatable relative to each other. The disturbance observer may also assume a disturbance to act on a tired wheel in which a wheel (consisting of a disc and a rim) and a tire (consisting of a belt and side walls) are coupled with each other by a spring, such that the wheel and the tire are displaceable relative to each other in the vertical direction of the vehicle. In another model which may be assumed by the disturbance observer, a disturbance acts on a tired wheel in which a wheel and a tire are coupled with each other, by a torsion spring and a damper which are connected in parallel with each other, such that the wheel and the tire are displaceable relative to each other in the vertical direction of the vehicle.

When the disturbance observer assumes a model of the tired wheel having a rim and a belt which are connected to each other by a torsion spring, such that the rim and the belt are rotatable relative to each other, the disturbance observer may estimate an angular velocity $\omega_B$ of the belt, a torsion angle $\theta_{RB}$ between the rim and the belt, and a disturbance $w_2$, on the basis of a detected value of an angular velocity $\omega_R$ of the rim as the wheel motion state, and basic values of a moment of inertia $J_R$ of the rim, a moment of inertia $J_B$ of the belt, and a spring constant K of the torsion spring, as the wheel information basic value. In this case, the change amount estimating means estimates an amount of change $\Delta K$ from the basic value of the spring constant K to a value indicative of an actual spring constant, on the basis of estimated values of the angular velocity $\omega_B$ of the belt, the torsion angle $\theta_{RB}$, and the disturbance $w_2$, and the basic value compensating means compensates the basic value of the spring constant K, so that the estimated amount of change $\Delta K$ is not larger than a predetermined value. Then, the wheel information estimating means estimates the basic value of the spring constant K as the wheel information, when the amount of change $\Delta K$ is not larger than the predetermined value.

When the disturbance observer assumes an equivalent model of the tired wheel which is equivalent to a basic model in which a rim is coupled with a belt through a torsion spring and a damper which are connected in parallel with each other, such that the rim and the belt are rotatable relative to each other, the equivalent model being designed such that a rim is coupled with a belt through a torsion spring and a damper which are connected in parallel with each other, such that the rim and the belt are displaceable relative to each other in one linear direction, the disturbance observer may estimates an equivalent linear displacement velocity $x_B'$ of the belt, an equivalent relative linear displacement $x_{RB}$ between the rim and the belt, and a disturbance $w_2$, on the basis of a detected value of an equivalent linear displacement velocity $x_R'$ of the rim, as the wheel motion state, and basic values of an equivalent inertial mass $m_R$ of the rim, an equivalent inertial mass $m_B$ of the belt, a spring constant $K_W$ and a damping coefficient $D_W$, as the wheel information basic value. In this case, the change amount estimating means estimates an amount of change $\Delta K_W$ from the basic value of the spring constant $K_W$ to a value indicative of an actual spring constant, and an amount of change $\Delta D_W$ from the basic value of the damping coefficient $D_W$ to a value indicative of an actual damping coefficient, on the basis of estimated values of the equivalent linear displacement velocity $x_B'$ of the belt, the equivalent relative linear displacement $x_{RB}$ and the disturbance $w_2$, and the basic value compensating means compensates the basic values of the spring constant $K_W$ and the damping coefficient $D_W$, so that the estimated amounts of change $\Delta K_W$ and $\Delta D_W$ are not larger than respective predetermined values. Then, the wheel information estimating means estimates the basic values of the spring constant $K_W$ and the damping coefficient $D_W$ as the actual spring constant and damping coefficient, when the estimated amounts of change $\Delta K_W$ and $\Delta D_W$ are not larger than the respective predetermined values.

BRIEF DESCRIPTION OF THE DRAWINGS

The above and optional objections, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
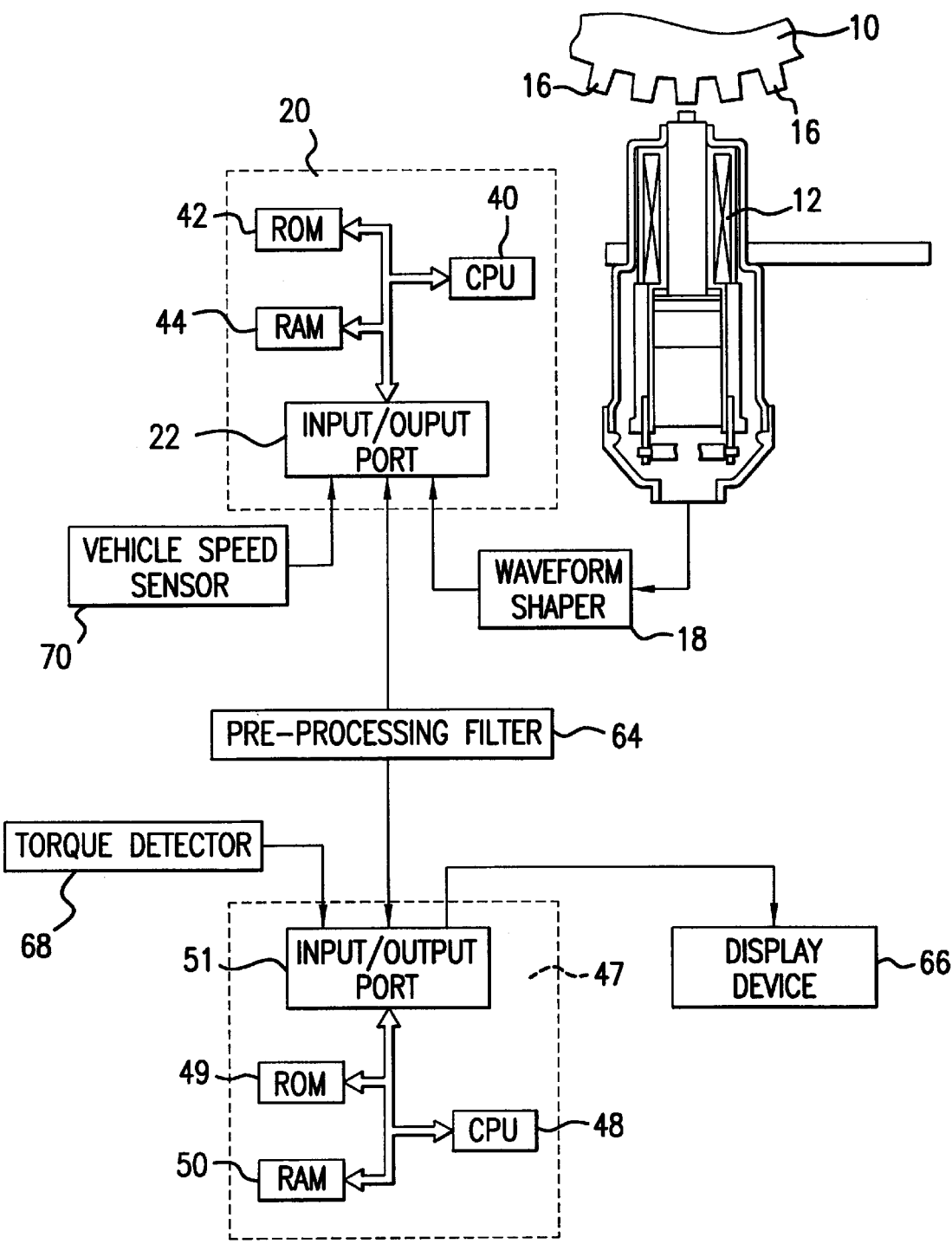
FIG. 1 is a schematic block diagram illustrating one embodiment of a wheel information estimating apparatus of the present invention adapted to estimate certain wheel information relating to a certain condition of tired wheels of an automotive vehicle.
Figure 2:
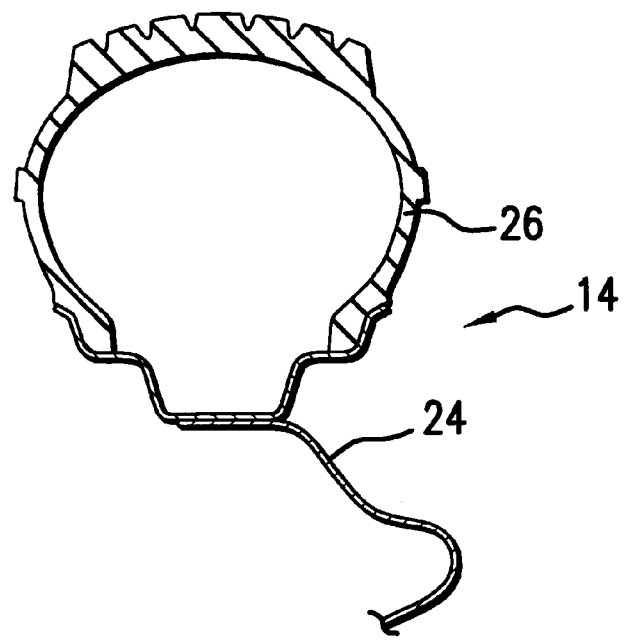
FIG. 2 is a fragmentary cross sectional view of a tired vehicle wheel whose disturbances are detected by the apparatus of FIG. 1.

Referring first to FIGS. 1 and 2, the wheel information estimating apparatus constructed according to the first embodiment of this invention includes a magnetic pickup (variable-reluctance pickup) 12 disposed adjacent to a rotor 10 which rotates with a tired wheel indicated generally at 14 in FIG. 2. The rotor 10 has a multiplicity of teeth 16 formed along its outer periphery such that the teeth 16 are equally spaced apart from each other in the circumferential direction, that is, in the direction of rotation of the rotor 10.

The magnetic pickup 12 is constructed to generate a voltage signal whose amplitude periodically changes as the teeth 16 pass the sensing head of the pickup 12. The waveform of the voltage signal generated by the pickup 12 is shaped into a rectangular pulse form by a waveform shaper 18, and the shaped pulse signal is applied to an input/output port 22 of a computer 20. While only one set of the rotor 10, pickup 12 and waveform shaper 18 is shown in FIG. 1, for illustrative purpose only, the motor vehicle has four tired wheels 14, and the rotor 10, pickup 12 and waveform shaper 18 are provided for each of the four tired wheels 14. Each of the four pickups 12 is connected to the computer 20 through the appropriate waveform shaper 18.

Figure 3:
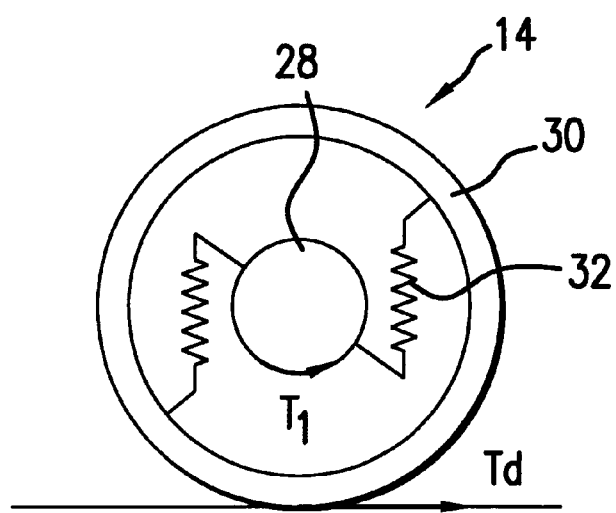
FIG. 3 is a view showing a dynamic model of the tired wheel of FIG. 2.

Each tired wheel 14 consists of a metal wheel member 24, and a tire 26 attached to a rim of the wheel member 24. The tired wheel 14 is dynamically simulated as a system or model as illustrated in FIG. 3, in which a rim 28 and a belt 30 are connected to each other by a torsion spring 32 such that the rim 28 and the belt 30 are rotatable relative to each other. The belt 30 is considered to be the outer surface of the tire 26 at which the tired wheel 14 contacts the road surface. Since the rotor 10 is disposed so as to rotate with the metal wheel member 24, the magnetic pickup 12 is adapted to detect an angular velocity of the rim 28, in a strict sense.

The computer 20 incorporates a CPU 40 as a central processing unit, a ROM 42 in the form of a read-only memory as a first memory device, and a RAM 44 in the form of a random-access memory as a second memory device, as shown in FIG. 1. The ROM 42 stores control programs for executing the routines illustrated in the flow charts of FIGS. 5 and 6, and cooperates with the CPU 40 and RAM 44 to constitute a rim speed calculator/compensator 45 indicated in the schematic block diagram of FIG. 4.

The computer 20 is connected to another computer 47 as shown in FIG. 1, which incorporates a CPU 48 as a central processing unit, a ROM 49 in the form of a read-only memory as the first memory device, a RAM 50 in the form of a random-access memory as the second memory device, and an input/output port 51 as an input/output device. The ROM 49 stores various control programs for executing the routines, such as a tire pressure alarming routine as illustrated in the flow chart of FIG. 10, and cooperates with the CPU 48 and RAM 50 to constitute a disturbance observer 52, a parameter calculator 53 including a correlation calculator 56 and a normalizer 58, and a determining processor 62, as indicated in the block diagram of FIG. 4.

The computers 20, 47 are connected to each other through a pre-processing filter 64. More specifically described referring to FIG. 4, the rim speed calculator/compensator 45 is connected to the disturbance observer 52 through the pre-processing filter 64, such that an output signal indicative of a rotating speed of each tired wheel 14 is transmitted from the rim speed calculator/compensator 45 to the disturbance observer 52, through the pre-processing filter 64. While the pre-processing filter 64 principally consists of a digital signal processor (DSP) in the present embodiment, the filter 64 may principally consist of a discrete circuit. The operation of the pre-processing filter 64 will be described in detail later.

The input/output port 51 of the computer 47 is connected to a display device 66 which provides information indicative of a result of judgement or determination made by the determining processor 62, which would aid an operator of the vehicle in recognizing the condition of each tired wheel 14. While the display device 66 is a liquid crystal display in the present embodiment, the liquid crystal display device 66 may be replaced by any other suitable indicator or display such as an indicator light device operated in a predetermined manner, for instance, in a flickering manner, and a voice indicator which speaks to the vehicle operator.

The input/output port 51 is also connected to a torque detector 68 adapted to detect a driving torque or a braking torque of the wheel member 24 (rim 28). For example, the torque detector 68 may include a strain gage fixed to the axle of the wheel member 24.

Figure 4:
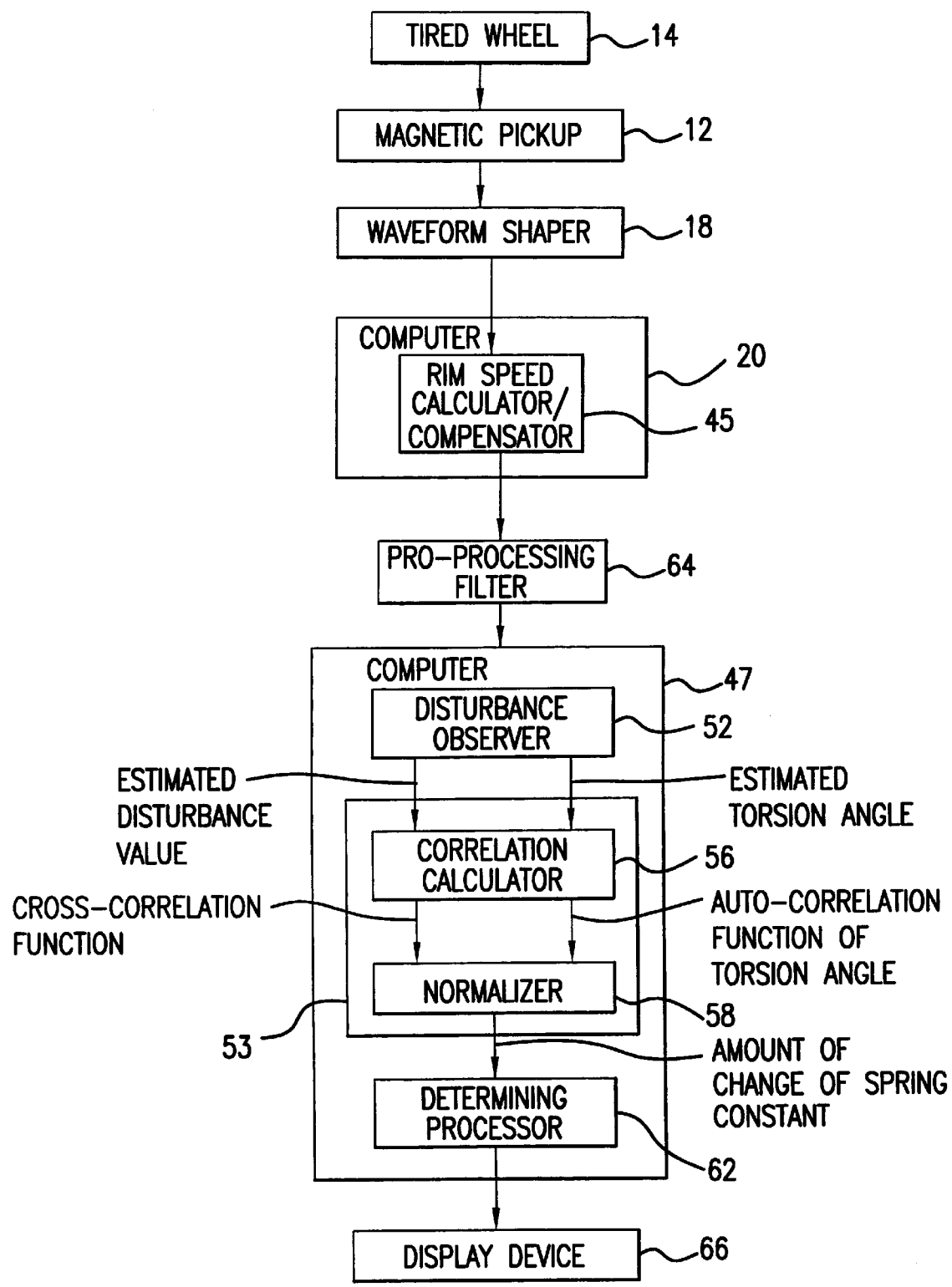
FIG. 4 is a block diagram illustrating the functional elements of the apparatus of FIG. 1.

The rim speed calculator/compensator 45 operates to calculate the rotating speed of each of the four tired wheels 14, on the basis of the signals received from the corresponding magnetic pickups 12 through the respective waveform shapers 18. The calculator/compensator 45 is further adapted to adjust the calculated speed of each tired wheel 14, on the basis of the vehicle running speed (speed of a body 72 of the vehicle as indicated in FIG. 4) detected by a suitable vehicle speed sensor 70 as indicated in FIG. 1. The vehicle speed sensor 70 may be a Doppler-effect ground-speed sensor. The adjustment of the speed of the tired wheel 14 as calculated by the magnetic pickup 12 is effected to compensate the calculated speed for a periodic or cyclic variation of the wheel speed which would arise from inherent deviations of the tired wheel 14 and rotor 10 from the nominal values due to errors during manufacture and assembling thereof.

The rotating speed of the tired wheel 14 or wheel speed is obtained as the peripheral speed of the tire 26. To this end, the radius of the tire 26 (i.e., the distance from the road surface to the axis or center of the wheel 14) should be known. In this respect, the radius of the tire 26 varies with the amount of deformation of the tire due to a load acting thereon, which in turn varies with the air pressure in the tire 26. As long as the air pressure of the tire 26 remains at the nominal or desired level, the nominal radius of the tire 26 is used to calculate the peripheral speed of the tired wheel 14 as the rotating speed. If a change of the air pressure larger than a predetermined limit is found in an appropriate routine as described later, the radius of the tire 26 used to calculate the peripheral speed is determined according to a predetermined relationship (stored in the ROM 42) between the tire radius and the amount of change of the air pressure of the tire.

Figure 5:
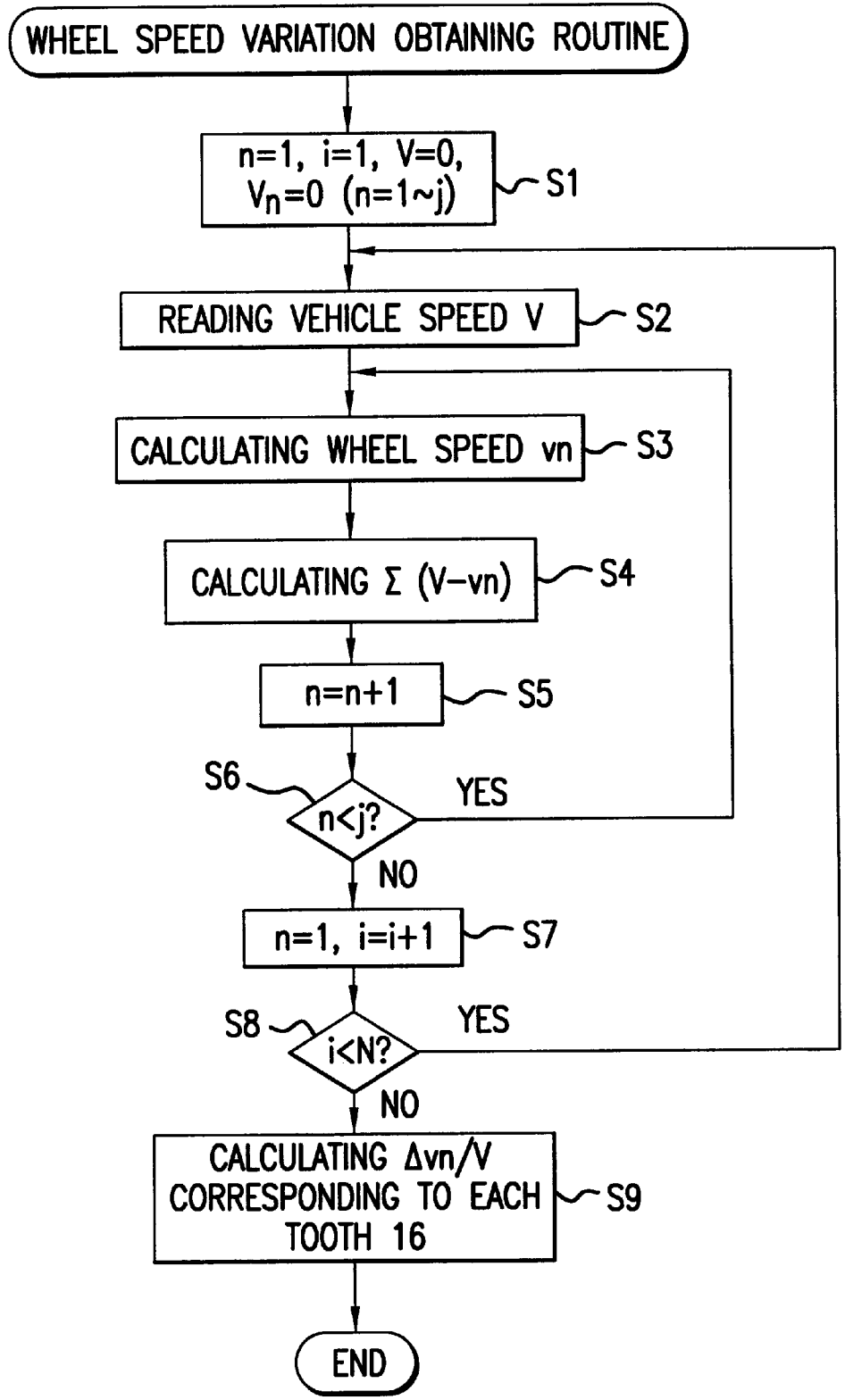
FIG. 5 is a flow chart illustrating a routine for obtaining a rotating speed variation of the tired wheel according to a control program stored in a read-only memory of a computer used by the apparatus.
Figure 6:
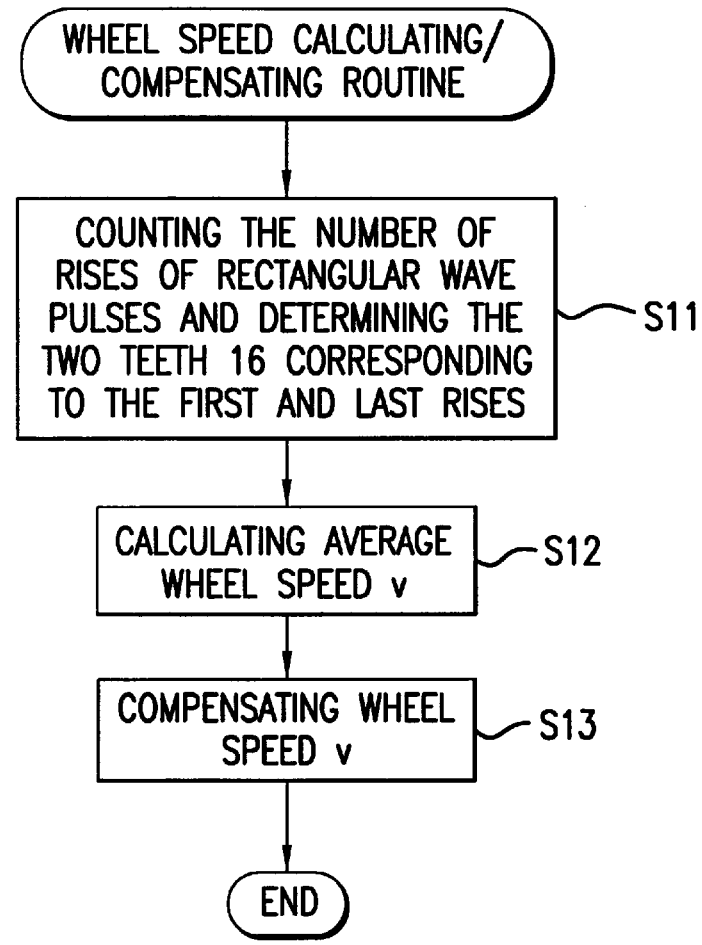
FIG. 6 is a flow chart illustrating a wheel speed calculating/compensating routine according to another control program also stored in the read-only memory.

The rim speed calculator/compensator 45 is adapted to execute a routine for obtaining the periodic wheel speed variation of FIG. 5 and a routine for calculating and compensating the detected wheel speed of FIG. 6.

The wheel speed variation obtaining routine of FIG. 5 is executed at least once after the rotor 10 and the wheel 14 have been assembled on the vehicle. An operation to obtain the wheel speed variation according to this routine may be performed by a manufacturer of the vehicle, a service engineer of a repair shop, or a user of the vehicle. Where the wheel speed variation is obtained by the user, the routine is executed each time a predetermined condition is satisfied, for example, each time the cumulative running distance or time of the vehicle reaches a predetermined value. In any case, it is desirable to execute the routine while the vehicle is running in a stable mode at a substantially constant speed within a predetermined range, without acceleration or deceleration (braking).

The wheel speed variation obtaining routine of FIG. 5 will be first described. The routine is started with step S1 in which values "n", "i", "V" and "$v_n$" are initialized. Step S1 is followed by step S2 to calculate the vehicle speed V on the basis of the output of the vehicle speed sensor 70. Then, the control flow goes to step S3 to calculate the speed $v_n$ of the tired wheel 14 (hereinafter referred to as "wheel speed $v_n$"). In a strict sense, the wheel speed $v_n$ calculated is the peripheral speed of the belt 30 (peripheral speed of the tire 26 at its outer circumference contacting the road surface), assuming that an angular velocity $\omega_B$ of the belt 30 is the same as an angular velocity $\omega_R$ of the rim 28. For easier understanding, it is assumed that the wheel speed $v_n$ is calculated when each one of the teeth 16 passes the sensing head of the magnetic pickup 12. More specifically described, the wheel speed $v_n$ corresponding to each of the teeth 16 of the rotor 10 is calculated, on the basis of a time interval between the rises or falls of the adjacent two rectangular pulses obtained from the waveform shaper 18, or a time interval between midpoints between the rise and fall of the adjacent pulses.

However, the relation between the time required for each tooth 16 to pass the pickup 12 and the time required to calculate the wheel speed $v_n$ should be taken into account. In this respect, the routine of FIG. 5 may be modified such that the wheel speed $v_n$ is calculated each time two or more teeth 16 pass the pickup 12.

Step S3 is followed by step S4 to calculate a difference $(V-v_n)$ of the calculated wheel speed $v_n$ from the vehicle speed V determined in step S2. The calculated speed difference $(V-v_n)$ is considered a variation of the wheel speed $v_n$ (hereinafter referred to as "wheel speed variation $(V-v_n)$"). The thus obtained wheel speed variation $(V-v_n)$ is stored at the appropriate one of successive addresses of a "wheel speed variation" memory of the RAM 44 whose number is equal to "j" (number of the wheel speed values $v_n$ obtained during one revolution of the rotor 10 or wheel 14). In the present embodiment wherein the wheel speed $v_n$ is obtained for each one of the teeth 16, the number "j" or the number of addresses of the "wheel speed variation" memory is equal to the number of the teeth 16. The address at which the wheel speed variation $(V-v_n)$ is stored corresponds to the current number "n". It is also noted that the content at each address represents a cumulative wheel speed variation $\Sigma(V-v_n)=((V-v_n)$ at $i=1)+((V-v_n)$ at $i=2)+\ldots)$.

Step S4 is followed by step S5 in which the integer "n" is incremented to repeat steps S3 and S4 if an affirmative decision (YES) is obtained in the following step S6, that is, if the incremented integer "n" is larger than or equal to "j". If a negative decision (NO) is obtained in step S6, this means that the tired wheel 14 has rotated one full revolution, and that the wheel speed values $v_n$ corresponding to all the teeth 16 have been obtained. With the negative decision (NO) obtained in step S6, the control flow goes to step S7 to reset the integer "n" to "1" and increment an integer "i". Then, step S8 is implemented to determine whether the integer "i" is smaller than "N". If an affirmative decision (YES) is obtained in step S8, the control flow goes back to step S2 to determine again the vehicle speed V, and repeatedly implement steps S3 and S4 for obtaining the cumulative wheel speed variations corresponding to all the teeth 16 during the next one revolution of the tired wheel 14. The wheel speed variation $(V-v_n)$ obtained by each implementation of step S4 is added to the content of the address of the "wheel speed variation" memory which corresponds to the integer "n". Thus, the content (representative of the cumulative wheel speed variation) of each address of the memory is increased each time the tired wheel 14 is rotated by one revolution.

In the illustrated embodiment, the vehicle speed V is not updated each time the integer "n" is incremented or each time steps S3 and S4 are repeated, on the assumption that the vehicle speed does not change during one full revolution of the wheel 14. However, the routine of FIG. 5 may be modified such that the control flow goes back to step S2 each time the affirmative decision (YES) is obtained in step S6, namely, each time the wheel speed variation $(V-v_n)$ corresponding to each tooth 16 is obtained.

A negative decision (NO) is obtained in step S8 when the integer "i" has become equal to the predetermined number "N", namely, when the tired wheel 14 has rotated the predetermined number "N" of revolution. In this case, step S9 is implemented to divide the content (cumulative wheel speed variation) of each address of the "wheel speed variation" memory of the RAM 44, by the number "N", to thereby obtain an average cumulative wheel speed variation $\Delta v_n$. This value $\Delta v_n$ is an average cumulative variation of the wheel speed $v_n$ at each of the teeth 16 of the rotor 10, with respect to a reference position of the rotor 10, which is the position of the tooth 16 at which the routine of FIG. 5 is initiated or at which steps S3 and S4 are implemented for the first time. Where the routine of FIG. 5 is executed from time to time or continuously during running of the vehicle, the wheel speed calculating/compensating routine of FIG. 6 does not require the reference position of the rotor 10 (wheel 14) to compensate the wheel speed for the wheel speed variation. Where the routine of FIG. 5 is executed only once immediately after the assembling of the tired wheel 14 or each time a power-on switch of the vehicle has been turned on, the reference position of the rotor 10 should be known. To this end, a suitable marking indicative of the reference position is provided on the rotor 10, and a detector for sensing the marking is fixedly disposed, to detect the reference position.

Where the marking indicative of the reference position of the rotor 10 is provided, the routine of FIG. 5 to obtain the value of the average wheel speed variation $\Delta v_n$ corresponding to the individual teeth 16 may be executed beginning with the tooth 16 at the reference position. Alternatively, the routine may be initiated at a desired position of the rotor 10, and the obtained values $\Delta v_n$ are converted to those with respect to the reference position.

Figure 7:
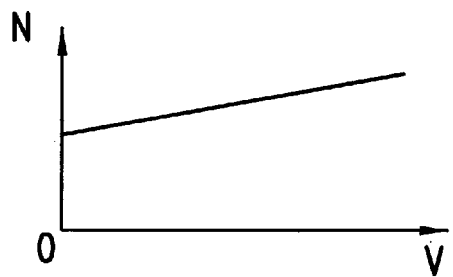
FIG. 7 is a graph illustrating a relationship between the number N used in step S8 of the routine of FIG. 5 and vehicle speed V.

The number "N" of revolutions of the rotor 10 (wheel 14) for which the average cumulative wheel speed variation values $\Delta v_n$ are obtained should be large enough to minimize an influence of the road surface condition on the obtained values $\Delta v_n$. In the present invention, the number "N" is determined depending upon the vehicle speed V, more specifically, the number "N" is determined so as to increase with the vehicle speed V, as indicated in the graph of FIG. 7.

In step S9, the obtained average cumulative wheel speed variation $\Delta v_n$ for each tooth 16 is divided by the vehicle speed V, to obtain a cumulative wheel speed variation rate $\Delta v_n/V$. The obtained rate $\Delta v_n/V$ for each tooth 16 is stored at an appropriate address of a "wheel speed variation rate" memory of the RAM 44. The values of this rate $\Delta v_n/V$ corresponding to the teeth 16 represent a rotating speed variation inherent to the specific wheel 14, which arises from manufacturing and assembling errors of the rotor 10 and wheel 14. These values $\Delta v_n/V$ are used in the routine of FIG. 6 to compensate or adjust the detected speed v of the wheel 14.

The wheel speed calculating/compensating routine of FIG. 6 is executed successively during running of the vehicle. In the present embodiment, the routine is executed to calculate the wheel speed from an average time duration between predetermined rises of the rectangular pulses generated from the waveform shaper 18 during a predetermined sampling time.

The routine of FIG. 6 is initiated with step S11 to detect the first and last rises of the rectangular pulses during the sampling time, count the number of the rises during the sampling time, and determine the two teeth 16 of the rotor 10 which correspond to the detected first and last rises of the pulses. Described in detail, each time a rectangular pulse rises, an interruption routine is executed to detect the moment of the rise on the basis of an output of a timer incorporated in the computer 20. A counter is provided to count the number of the rises which occur during the sampling time. Another counter is provided to count the number of the rises as counted from the rise corresponding to the reference position of the rotor 10. This counter is reset at the reference position, and the content of the counter identifies the tooth 16 corresponding to the rise of the rectangular pulse generated last.

Then, the control flow goes to step S12 to calculate the average speed v of the wheel 14 during the sampling time, on the basis of an average time interval between the rises of the adjacent rectangular pulses during the sampling time.

Step S12 is followed by step S13 to compensate or adjust the wheel speed v, on the basis of the wheel speed variation rates $\Delta v_{n1}/V$ and $\Delta v_{n2}/V$ corresponding to the two teeth 16 which correspond to the first and last rises of the rectangular pulses. These variation rates are read from the "wheel speed variation rate" memory of the RAM 44, on the basis of the two teeth 16 determined in step S11. The compensation of the wheel speed v is effected according to the following equation (1):

$$v = (1 + (\Delta v_{n1} - \Delta v_{n2})/2V)v \quad (1)$$

It will be understood from the above equation (1) that the wheel speed v is compensated by an amount equal to ½ of a difference between the rates $\Delta v_{n1}/V$ and $\Delta v_{n2}/V$ multiplied by the pre-compensated value v.

The compensated wheel speed v obtained in step S13 of the routine of FIG. 6 is processed by the pre-processing filter 64, and then used by the disturbance observer 52 indicated in FIG. 4. However, the disturbance observer 52 uses an angular velocity corresponding to the wheel speed v. To this end, the compensated wheel speed v obtained in step S13 is converted into the angular velocity $\omega_R$ of the rim 28, with the radius R of the tire 26 taken into account. The calculated angular velocity $\omega_R$ is stored in an "angular velocity" memory of the RAM 44.

The disturbance observer 52 is arranged according to the dynamic model of the tired wheel 14 as illustrated in FIG. 3. There will be described the arrangement of the disturbance observer 52.

If the tired wheel 14 is simulated as the dynamic model of FIG. 3 wherein the rim 28 and the belt 30 having the respective moments of inertia $J_R$ and $J_B$ are connected by the torsion spring 32 having the spring constant K, the following state equations (2), (3) and (4) are established so as to define a linear dynamic system:

$$J_R \omega_R' = -K\theta_{RB} + T_1 \quad (2)$$

$$J_B \omega_B' = K\theta_{RB} - T_d \quad (3)$$

$$\theta_{RB}' = \omega_R - \omega_B \quad (4)$$

where, $\omega_R$: angular velocity of the rim 28, $\omega_R'$: angular acceleration of the rim 28, $\omega_B$: angular velocity of the belt 30, $\omega_B'$: angular acceleration of the belt 30, $\theta_{RB}$: torsion angle between the rim 28 and the belt 30, $T_1$: driving or braking torque detected by the torque detector 68, $T_d$: disturbance torque (which is derived from rolling resistance of the wheel 14 which irregularly or regularly occur due to steps or undulation on the road surface, respectively).

Actually, however, a damper is present between the rim 28 and the belt 30. Since the influence of the damper is relatively small, the presence of the damper is ignored in the above equations according to the present embodiment.

The above state equations (2) through (4) may be converted into the following equation (5) using vectors and matrices:

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ -1/J_B \\ 0 \end{bmatrix} T_d \quad (5)$$

The motion of the tired wheel 14 when the spring constant K of the torsion spring 32 is changed from K to K+$\Delta$K due to a change in the air pressure of the tire 26 is expressed by the following equation (6):

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + $$
$$\begin{bmatrix} 1/J_R \\ 0 \\ 0 \end{bmatrix} T_1 + \begin{bmatrix} 0 \\ -1/J_B \\ 0 \end{bmatrix} T_d + \begin{bmatrix} -\Delta K/J_R \\ \Delta K/J_B \\ 0 \end{bmatrix} \theta_{RB} \quad (6)$$

The amount of change $\Delta$K of the spring constant K is equivalent to the amount of a disturbance acting on the tire 26 in the normal condition, which disturbance is expressed by the last term of the right member of the above equation (6). It will be understood that the last term of the right member of the equation (6) includes the amount of change $\Delta$K, which varies with a change in the air pressure of the tire 26. In other words, the amount of change in the air pressure of the tire 26 can be estimated by estimating the disturbance as expressed by the last term of the right member of the equation (6). The disturbance observer 52 should be adapted to estimate an overall disturbance w which includes the disturbance torque $T_d$ (due to a change of the road surface condition) of the wheel 14 as well as the disturbance due to the change in the air pressure of the tire 26. The overall disturbance w is represented by the following equation (7):

$$[w] = \begin{bmatrix} 0 \\ -1/J_B \\ 0 \end{bmatrix} T_d + \begin{bmatrix} -\Delta K/J_R \\ \Delta K/J_B \\ 0 \end{bmatrix} \theta_{RB} \quad (7)$$

Theoretically, however, only one of the three elements of the disturbance w can be estimated by the observer 52. Therefore, only the second element $w_2$ is estimated according to the following equation (8), and the motion state of the tired wheel 14 is expressed by the following state equation (9):

$$w_2 = (-1/J_B)T_d + (\Delta K/J_B)\theta_{RB} \quad (8)$$

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ 1 \\ 0 \end{bmatrix} w_2 \quad (9)$$

Thus, the disturbance observer 52 operates according to the above equation (9), to estimate the disturbance as one of variables which reflect the state of the system. To use the disturbance $w_2$ of the equation (8) as one of the variables, the following equation (10) is used to approximate the disturbance to be estimated:

$$w_2 = 0 \quad (10)$$

Figure 8:
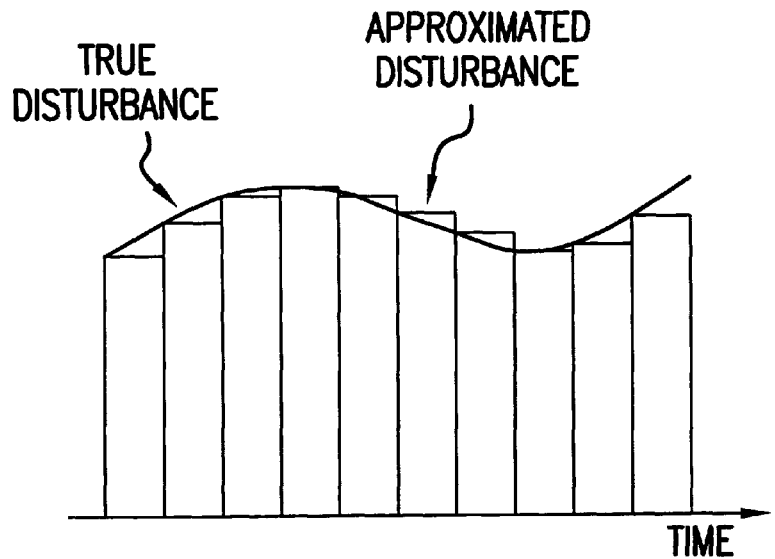
FIG. 8 is a graph explaining approximation of the disturbances as detected by the apparatus.

The approximation according to the above equation (10) means approximation (zeroth order approximation) of a continuously varying disturbance by successive values which change in steps as indicated in the graph of FIG. 8. This approximation is sufficiently acceptable if the disturbance estimating speed of the disturbance observer 52 is high enough to follow the changing rate or velocity of the disturbance to be estimated. The following equation (11) represents an expanded system which includes the disturbance $w_2$ as one of the system variables according to the equation (10):

$$\begin{bmatrix} \omega'_R \\ \omega'_B \\ \theta'_{RB} \\ w_2 \end{bmatrix} = \begin{bmatrix} 0 & 0 & -K/J_R & 0 \\ 0 & 0 & K/J_B & 1 \\ 1 & -1 & 0 & 0 \\ 0 & 0 & 0 & 0 \end{bmatrix} \begin{bmatrix} \omega_R \\ \omega_B \\ \theta_{RB} \\ w_2 \end{bmatrix} + \begin{bmatrix} 1/J_R \\ 0 \\ 0 \\ 0 \end{bmatrix} T_1 \quad (11)$$

In the above equation (11), $[\omega_B \theta_{RB} w_2]^T$ is the state which cannot be detected. In the system using the disturbance observer 52, not only the disturbance $w_2$ but also the variables $\omega_B$ and $\theta_{RB}$ that cannot be measured can be estimated.

For simplification, the above equation (11) is broken down into the following vectors and matrices:

$$[x_a] = \omega_R$$
$$[x_b] = [\omega_B \ \theta_{RB} \ w_2]^T$$
$$[u] = T_1$$
$$[A_{11}] = 0$$
$$[A_{12}] = [0 \ -K/J_R \ 0]$$
$$[A_{21}] = [0 \ 1 \ 0]^T$$
$$[A_{22}] = \begin{bmatrix} 0 & K/J_B & 1 \\ -1 & 0 & 0 \\ 0 & 0 & 0 \end{bmatrix}$$
$$[B_1] = 1/J_R$$
$$[B_2] = [0 \ 0 \ 0]^T$$

The minimum-order observer to estimate the state $[x_b] = [\omega_B \theta_{RB} w_2]^T$ is expressed by the following equation (12):

$$[z'_p] = [A_{21}][x_a] + [A_{22}][z_p] + [B_2][u] + \qquad (12)$$
$$[G]\{[x'_a] - ([A_{11}][x_a] + [A_{12}][z_p] + [B_1][u])\} =$$
$$([A_{21}] - [G][A_{11}])[x_a] +$$
$$([A_{22}] - [G][A_{12}])[z_p] + [G][x'_a] + ([B_2] - [G][B_1])[u]$$

where,

[$z_p$]: estimated value of [$x_b$],
[$z_p'$]: rate of change of the estimated value [$z_p$],
[G]: gain which determines the estimating speed of the disturbance observer 52.

Figure 9:
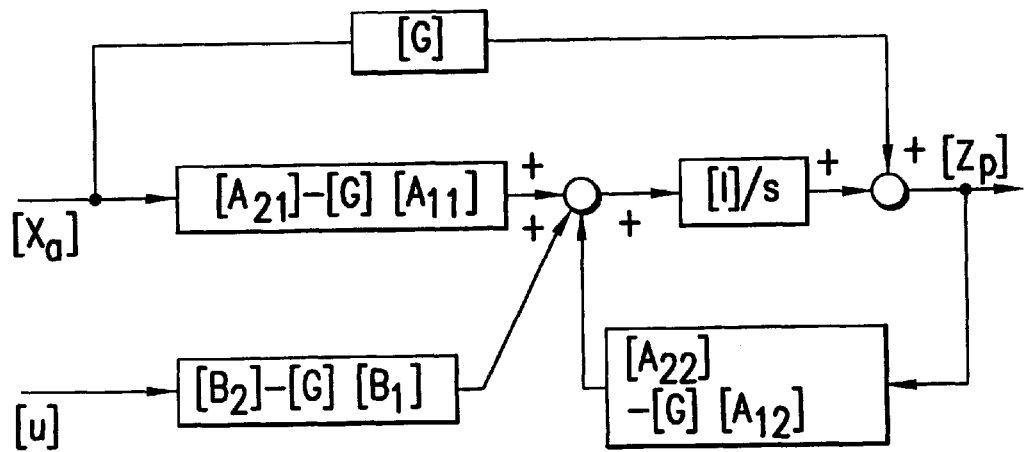
FIG. 9 is a block diagram illustrating a disturbance observer incorporated in the apparatus.

The above equation (12) is expressed by the block diaphragm of FIG. 9, wherein [I] represents a unit or identity matrix, while "s" represents a Laplace operator.

If an error between the true value [$x_b$] and the estimated value [$z_p$] is expressed as [e]=[$x_b$]-[$z_p$] and if a differentiation of the error [e] is represented by [e'], the following equation (13) is obtained:

$$[e'] = ([A_{22}] - [G][A_{12}])[e] \qquad (13)$$

The above equation (13) indicates the estimating characteristic of the disturbance observer 52, and the eigen values of the matrix ($[A_{22}]-[G][A_{12}]$) are the pole of the disturbance observer 52. Accordingly, the estimating speed of the disturbance observer 52 increases as the eigen values deviate from the origin in the left half of the S-plane. The observer gain [G] is suitably determined depending upon a desired value of the estimating speed of the disturbance observer 52.

The disturbance observer 52 arranged as described above receives as an input the angular velocity $\omega_R$ which is calculated from the compensated wheel speed v of the tired wheel 14 and the tire radius R by the rim speed calculator/compensator 45 as described above. On the basis of the angular velocity $\omega_R$, the disturbance observer 52 estimates the disturbance $w_2$ as expressed by the above equation (8) due to the amount of change $\Delta K$ of the spring constant K of the torsion spring 32. The thus obtained disturbance $w_2$ is expressed as an estimated disturbance value $w_{2p}$. In addition to the value $w_{2p}$, the disturbance observer 52 is adapted to obtain an estimated value $\omega_{Bp}$ of the angular velocity $\omega_B$ of the belt 30 and an estimated value $\theta_{RBp}$ of the torsion angle $\theta_{RB}$ between the rim 28 and the belt 30, which $\omega_B$ and $\theta_{RB}$ cannot be detected or measured.

The correlation calculator 56 operates to calculate correlation functions, on the basis of the estimated disturbance value $w_{2p}$ and torsion angle $\theta_{RBp}$. Using the calculated correlation functions, the normalizer 58 performs a normalizing operation and calculates the amount of change of the spring constant K of the torsion spring 32.

Referring next to the flow chart of FIG. 11, there will be described the manner of obtaining the amount of change of the spring constant K of the torsion spring 32.

Figure 11:
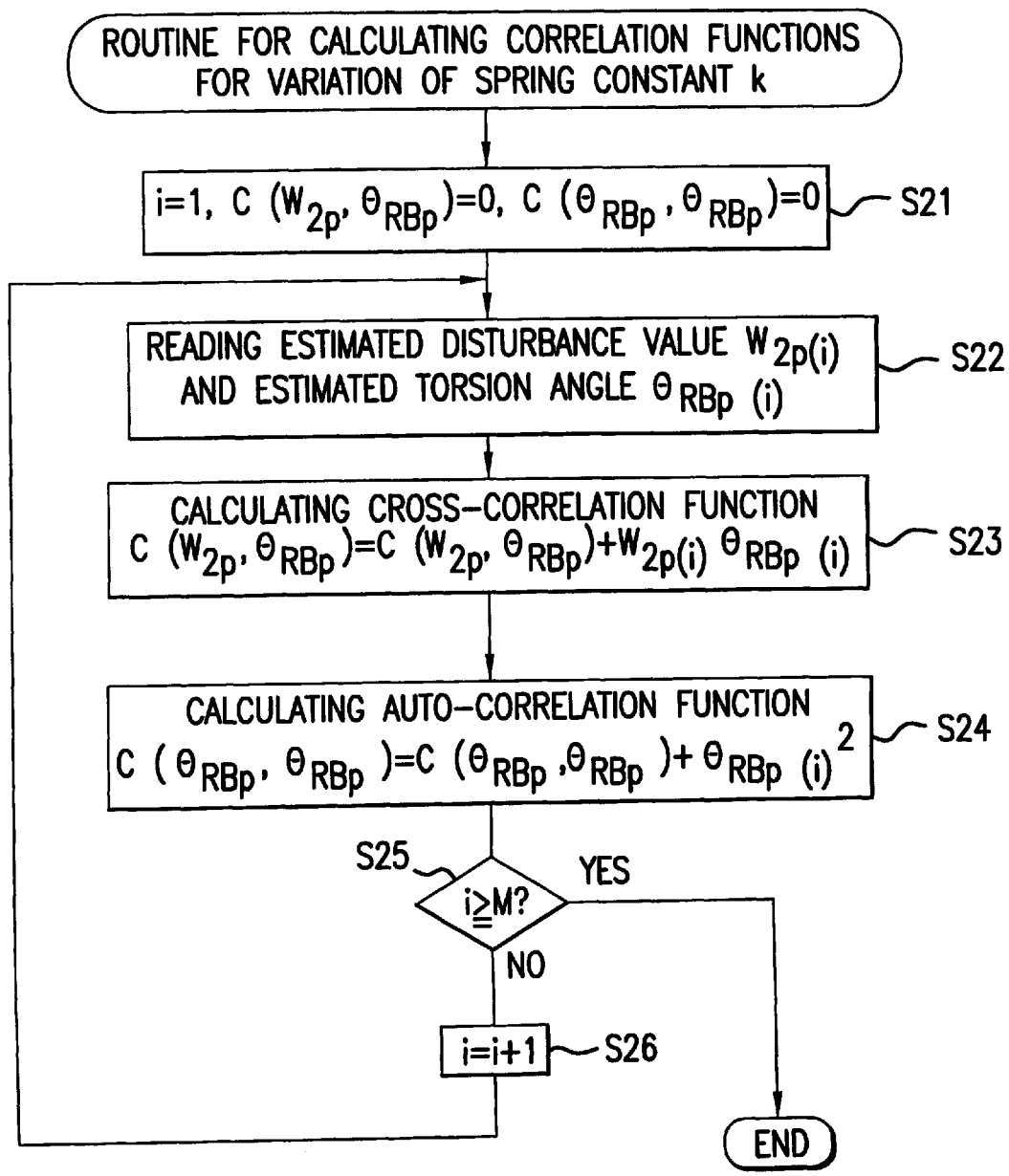
FIG. 11 is a flow chart illustrating a routine for calculating correlation functions for obtaining a spring constant variation of the tired wheel, according to another control program stored in the read-only memory.

The routine of FIG. 11 is initiated with step S21 to reset the integer "i" to "1", and reset correlation functions $C(w_{2p}, \theta_{RBp})$ and $C(\theta_{RBp}, \theta_{RBp})$ to "0". The correlation function $C(w_{2p}, \theta_{RBp})$ is a function of cross-correlation between the estimated value $w_{2p}$ of the disturbance $w_2$ expressed by the above equation (8) and the estimated torsion angle value $\theta_{RBp}$, while the function $C(\theta_{RBp}, \theta_{RBp})$ is a function of auto-correlation of the estimated torsion angle value $\theta_{RBp}$. In other words, the contents of "cross-correlation" and "auto-correlation" memories of the RAM 50 are cleared in step S21.

Step S22 is then implemented to read the present estimated disturbance value $w_{2p(i)}$ and the present estimated torsion angle value $\theta_{RBp(i)}$. Step S22 is followed by step S23 to calculate a product of the estimated disturbance value $w_{2p(i)}$ and the estimated torsion angle value $\theta_{RBp(i)}$, and add the product to the last value of the cross-correlation function $C(w_{2p}, \theta_{RBp})$ to thereby update the cross-correlation function $C(w_{2p}, \theta_{RBp})$. In the first cycle of execution of the routine of FIG. 11, the last value of the cross-correlation function $C(w_{2p}, \theta_{RBp})$ is zero, and the above-indicated product $w_{2p(i)} \times \theta_{RBp(i)}$ is stored in the "cross-correlation" memory.

The control flow then goes to step S24 to obtain the square of the estimated torsion angle value $\theta_{RBp(i)}$, and add the obtained square to the last value of the auto-correlation function $C(\theta_{RBp}, \theta_{RBp})$ to thereby update the auto-correlation function $C(\theta_{RBp}, \theta_{RBp})$. The updated value is stored in the "auto-correlation" memory.

Step S25 is then implemented to determine whether the integer "i" has become equal to or larger than a reference value "M" or not. Initially, a negative decision (NO) is obtained in step S25, and step S26 is implemented to increment the integer "i", to repeat steps S22, S23 and S24.

An affirmative decision (YES) is obtained in step S25 when steps S22–S24 have been repeated the predetermined number of times "M". Thus, one cycle of execution of the routine of FIG. 11 is terminated.

While the above reference value "M" may be a predetermined or fixed integer value according to the present invention, this value "M" is variable in the present embodiment, as described later, to assure improved accuracy with which the tire pressure is estimated.

After the cross-correlation function $C(w_{2p}, \theta_{RBp})$ and the auto-correlation function $C(\theta_{RBp}, \theta_{RBp})$ have been obtained by the correlation calculator 56, the normalizer 58 obtains a normalized value $L_K$ according to the following equation (14), and the obtained normalized value $L_K$ is stored in an $L_K$ memory of the RAM 50.

$$L_K = C(w_{2p}, \theta_{RBp})/C(\theta_{RBp}, \theta_{RBp}) \qquad (14)$$

The value $L_K$ obtained according to the above equation (14) may be expressed by the following equation (15), on the basis of the above equation (8):

$$L_K = (-1/J_B)C_0 + \Delta K/J_B \qquad (15)$$

Since the value $C_0$ is represented by $C(T_{dp}, \theta_{RBp})/C(\theta_{RBp}, \theta_{RBp})$ and is independent of a change of the spring constant K, the value $C_0$ may be obtained when the air pressure of the tire 26 is normal. It is noted that the value $C(T_{dp}, \theta_{RBp})$ is a function of cross-correlation between the estimated value $T_{dp}$ of the disturbance torque $T_d$ and the estimated value $\theta_{RBp}$ of the torsion angle $\theta_{RB}$.

The determining processor 62 is adapted to compare the normalized value $L_K = C(w_{2p}, \theta_{RBp})/C(\theta_{RBp}, \theta_{RBp})$ stored in the $L_K$ memory of the RAM 50, with a predetermined reference value $L_{K0}$ stored in the ROM 49. The reference value $L_{K0}$ is a negative value. If the value $L_K$ is smaller than the reference value $L_{K0}$, this means that the air pressure of the tire 26 is abnormally low, and the display device 66 provides an indication informing the vehicle operator of this fact. In this respect, it is noted that the ROM 49 stores a data table representative of a relationship between the value $L_K$ and an amount of change $\Delta P$ of the air pressure P of the tire 26, so that the amount of change $\Delta P$ of the air pressure P can be determined on the basis of the value $L_K$ and according to the $L_K$–$\Delta P$ relationship.

It will be understood that the correlation calculator 56, normalizer 58 and determining processor 62 constitute means for estimating an amount of change from a basic value indicative of a certain kind of wheel information, such as an air pressure of the tire 26, to a current value indicative of the current state of the wheel information.

While respective functions of the disturbance observer 52, correlation calculator 56, normalizer 58 and determining processor 62 have been separately described, there will be hereinafter described an operation of these elements 52, 56, 58 and 62 of the computer 47, which cooperate with each other to execute a routine as illustrated in the flow chart of FIG. 10.

Figure 10:
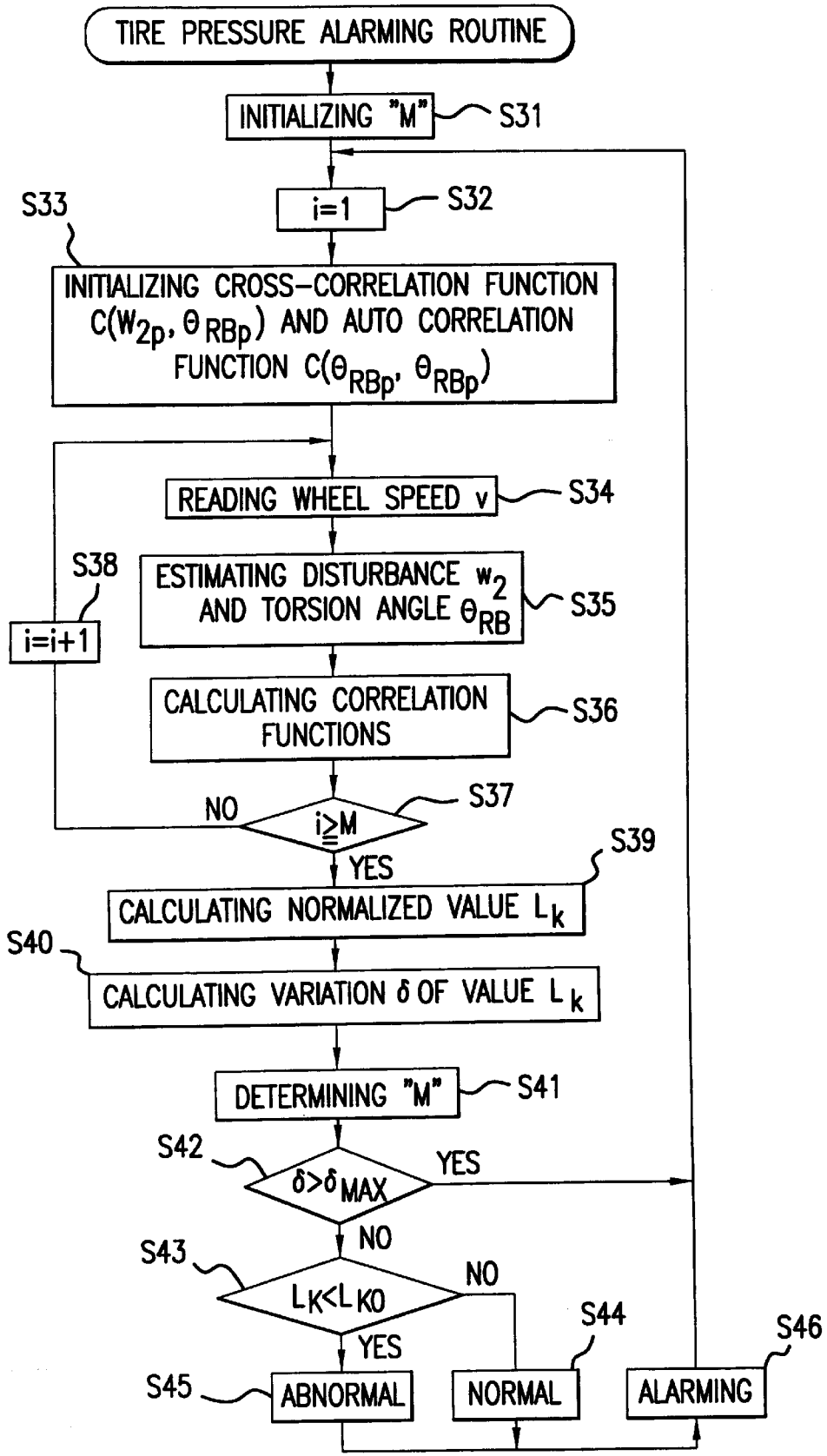
FIG. 10 is a flow chart illustrating a tire pressure alarming routine according to a control program stored in a read-only memory of another computer used by the apparatus of FIG. 1.

The routine of FIG. 10 is initiated with step S31 to initialize the above-indicated reference value "M", that is, to set the value "M" to a predetermined value stored in the ROM 49. Step S32 is then implemented to reset the integer "i" to "1". In the next step S33, the cross-correlation function $C(w_{2p}, \theta_{RBp})$ between the estimated value $w_{2p}$ of the disturbance $w_2$ expressed by the above equation (8) and the estimated torsion angle value $\theta_{RBp}$, and the auto-correlation function $C(\theta_{RBp}, \theta_{RBp})$ of the estimated torsion angle value $\theta_{RBp}$ are both reset to "0". In other words, the contents of "cross-correlation" and "auto-correlation" memories of the RAM 50 are cleared in step S33. It will be understood that steps S32 and S33 correspond to step S21 of the flow chart of FIG. 11.

The control flow then goes to step S34 to read the wheel speed v obtained from the computer 20 through the pre-processing filter 64.

There will be hereinafter described the operation of the pre-processing filter 64.

Figure 12:
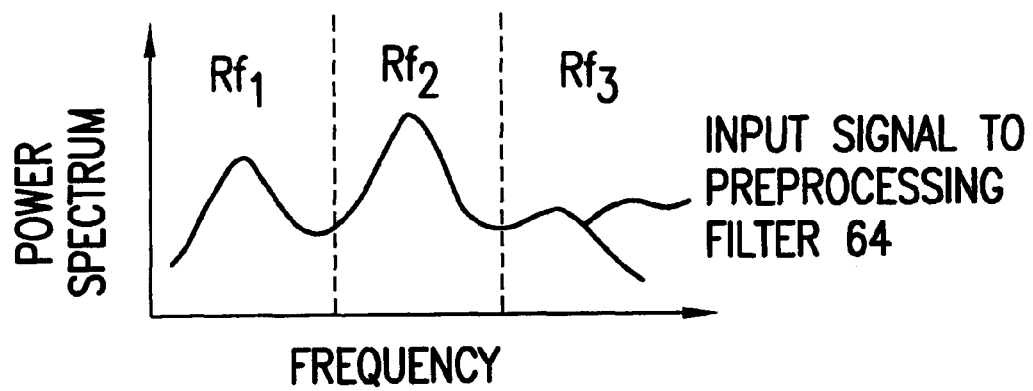
FIG. 12 is a graph illustrating a frequency characteristic of a wheel speed signal received by a pre-processing filter of the apparatus of FIG. 1.

The pre-processing filter 64 receives an input signal indicative of the wheel speed v, from the rim speed calculator/compensator 45 of the computer 20. The signal indicative of the wheel speed v, which has not been processed by the pre-processing filter 64, generally has a frequency characteristic as indicated in the graph of FIG. 12. To enable the disturbance observer 52 to estimate the disturbance $w_2$ and the torsion angle $\theta_{RB}$ with sufficiently high accuracy, using the simple system of the tired wheel 14 as illustrated in FIG. 3, the wheel speed signal to be received by the disturbance observer 52 must be substantially held in a predetermined frequency range. To this end, in the present embodiment, the pre-processing filter 64 is provided between the rim speed calculator/compensator 45 and the disturbance observer 52.

Figure 13:
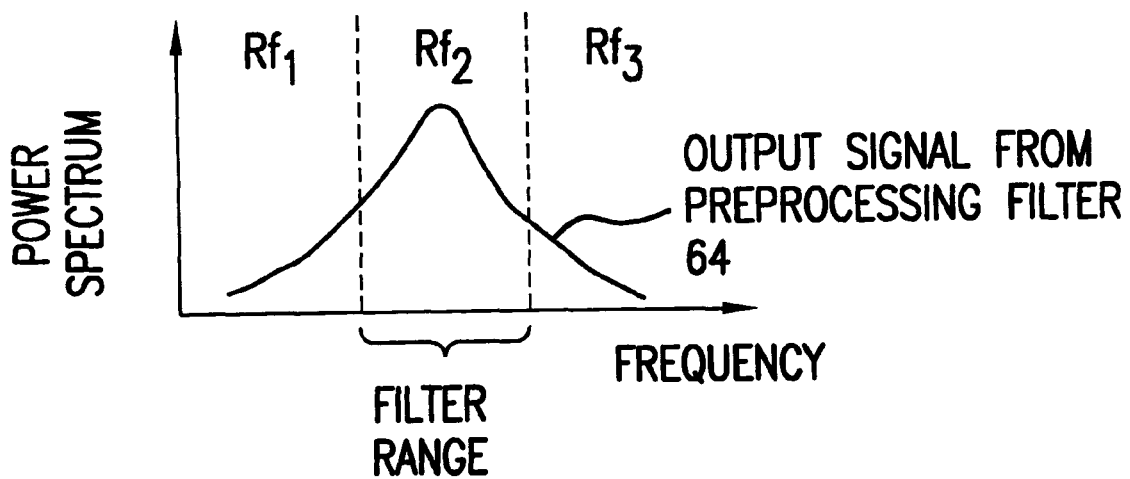
FIG. 13 is a graph illustrating a frequency characteristic of a wheel speed signal generated as an output from the pre-processing filter.
Figure 14:
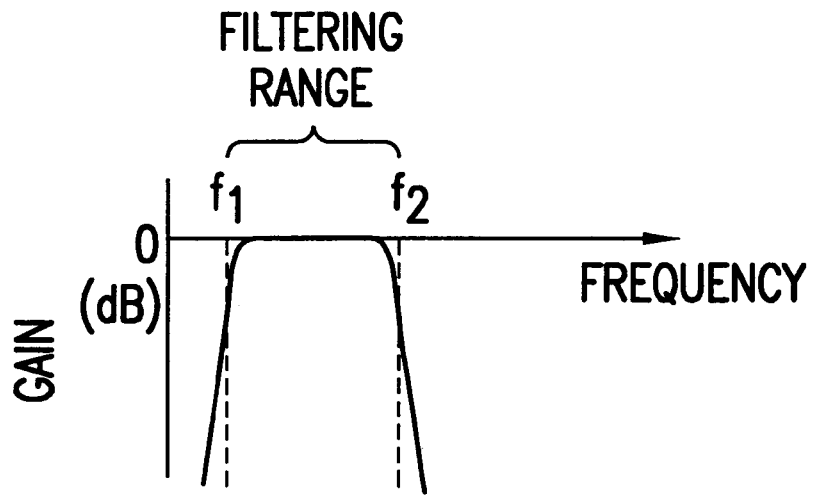
FIG. 14 is a graph illustrating a filtering characteristic of the pre-processing filter.

The pre-processing filter 64 has a filtering characteristic as indicated in the graph of FIG. 14, in which the gain (a unit indicating the strength of the signal) of the signal which is in the predetermined frequency range (between f1 and f2) is equal to 0, while the gain of the signal outside the predetermined frequency range becomes negative. Through this pre-processing filter 64, only a component of the wheel speed signal which is in the predetermined frequency range is transmitted from the rim speed calculator/compensator 45 to the disturbance observer 52. If the wheel speed signal received by the pre-processing filter 64 has a frequency characteristic over three frequency ranges $Rf_1$, $Rf_2$ and $Rf_3$, as indicated in the graph of FIG. 12, only a component of the signal which is within the middle frequency range $Rf_2$ is extracted or picked up, and converted into an output signal having a frequency characteristic as indicated in the graph of FIG. 13. This output signal generated by the pre-processing filter 64 is suitably used by the disturbance observer 52 for estimating the disturbance $w_2$ and the torsion angle $\theta_{RB}$.

Once the wheel speed v is read from the pre-processing filter 64, the control flow goes to step S35 in the flow chart of FIG. 10, in which step the disturbance observer 52 is adapted to estimate the disturbance $w_2$ and the torsion angle $\theta_{RB}$. Step S36 is then implemented to calculate the cross-correlation function $C(W_{2p}, \theta_{RBp})$ and the auto-correlation function $C(\theta_{RBp}, \theta_{RBp})$, respectively. Namely, this step S36 corresponds to step S22 through step S24 in the flow chart of FIG. 11. Step S37 is then implemented to determine whether the integer "i" is equal to or larger than the reference value "M" or not. In the first cycle of execution of the routine of FIG. 10, the integer "i" is equal to "1", and a negative decision (NO) is obtained in step S37. Then, the integer "i" is incremented in the next step S38, and the control flow goes back to step S34.

If the integer "i" becomes equal to or larger than the reference value "M" after repeatedly implementing steps S34–S36, an affirmative decision (YES) is obtained in step S37, and step S39 is then implemented to calculate the normalized value or correlation ratio $L_K$ which is obtained by dividing the cross-correlation function $C(w_{2p}, \theta_{RBp})$ by the auto-correlation function $C(\theta_{RBp}, \theta_{RBp})$. In the next step S40, a variation $\delta$ of the correlation ratio $L_K$ is calculated.

In the normal situation, the correlation ratio $L_K$ is supposed to vary by small degrees or to be kept at a constant value. However, this ratio $L_K$ tends to vary to a large extent, in other words, the variation $\delta$ tends to be large when the initial or preset reference value "M" is not sufficiently large in view of the current running condition of the vehicle. As indicated above, the reference value "M" indicates the number of the wheel speed values v to be used to calculate the cross-correlation and auto-correlation functions $C(w_{2p}, \theta_{RBp})$ and $C(\theta_{RBp}, \theta_{RBp})$. Since the variation δ is decreased with an increase in the reference value "M", the reference value "M" is suitably determined in this embodiment, depending upon the variation δ obtained in step S40, so that the determined value "M" can be used for obtaining the correlation ratio $L_K$ in the next cycle of execution of the routine of FIG. 10.

Figure 15:
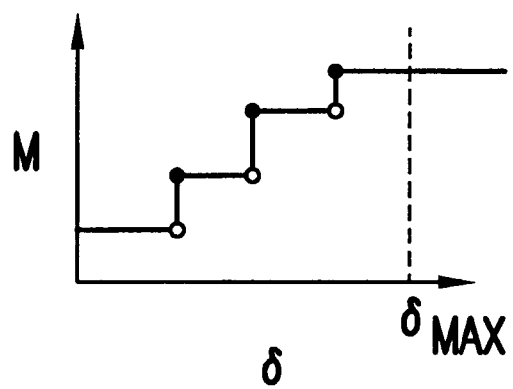
FIG. 15 is a graph illustrating a relationship between a variation $\delta$ as calculated in step S40 of the routine of FIG. 10, and the reference value "M"

Described in more detail, ROM 49 stores a predetermined relationship between the variation δ and the reference value "M" as represented by the graph of FIG. 15, in which the reference value "M" increases by steps from its initial value or nominal value, with an increase in the variation δ of the correlation ratio $L_K$. It will be understood from the graph of FIG. 15 that the variation δ is fixed or does not change once the value δ exceeds a predetermined maximum value $\delta_{MAX}$. The reference value "M" to be used upon the next execution of step S37 is determined according to this relationship indicated in the graph of FIG. 15.

The present embodiment is also adapted such that the judgement as to whether the tire pressure is abnormally low or not is inhibited when the variation δ exceeds the above-indicated maximum value $\delta_{MAX}$. In other words, the judgement as described above is allowed to be made only when the variation δ is equal to or smaller than the maximum value $\delta_{MAX}$. This is because the correlation ratio $L_K$ is not reliable when the variation δ exceeds the maximum value $\delta_{MAX}$, and the judgement on the tire pressure may involve an error if it is made on the basis of the unreliable value $L_K$. The variation δ may be calculated as a difference between the correlation ratio $L_K$ obtained in the current cycle of execution of the routine of FIG. 10 and that obtained in the previous cycle. It will be understood that the variation δ is one example of an amount on the basis of which the number of values, such as correlation ratios, used for estimating a desired wheel information, such as a tire air pressure, is determined.

After the variation δ of the correlation ratio $L_K$ is calculated in step S40, step S41 is implemented to determine the reference value "M" to be used in the next cycle, depending upon the variation δ. Step S42 is then implemented to determine whether or not the variation δ exceeds the predetermined maximum value $\delta_{MAX}$. If a negative decision (NO) is obtained in this cycle, the control flow goes to step S43 to determine whether the correlation ratio $L_K$ is smaller than the negative reference value $L_{K0}$ or not. If a negative decision (NO) is obtained in this cycle, that is, if the correlation ratio $L_K$ is not smaller than the value $L_{K0}$, step S44 is implemented to determine that the air pressure P of the tire 26 is normal. In this case, a command is generated in step S46 for inhibiting the display device 66 from providing an indication relating to the air pressure of the tire 26. The control flow then goes back to step S32. If an affirmative decision (YES) is obtained in step S43, that is, if the correlation ratio $L_K$ is smaller than the reference value $L_{K0}$, step S45 is implemented to determine that the air pressure P of the tire 26 is abnormally low. In this case, a command is generated in step S46 for activating the display device 66 to provide an indication informing the vehicle operator of an abnormally low level of the air pressure P. The control flow then goes back to step S32.

If the variation δ exceeds the maximum value $\delta_{MAX}$, an affirmative decision (YES) is obtained in step S42 and the control flow goes back to step S32. In this case, steps S43–46 are skipped, and the determination on the abnormality of the air pressure P is not made.

It will be understood from the description of the present embodiment that the rotor 10, magnetic pickup 12 and waveform shaper 18 cooperates with a portion of the rim speed calculator/compensator 45 assigned to calculate the wheel speed v to constitute a detecting device, while the disturbance observer 52 and the parameter calculator 53 constitute estimating means for estimating the air pressure of the tired wheel 14 as wheel information. It will also be understood that the pre-processing filter 64 serves as frequency characteristic modifying means for providing an optimum frequency characteristic of the wheel speed signal as a wheel motion state or parameter to be supplied to the estimating means.

Referring next to FIGS. 16–19, there will be described a second embodiment of the present invention in the form of a tire pressure alarming apparatus. In these figures, the same reference numerals as used in the first embodiment are used for identifying structurally and/or functionally corresponding elements, of which detailed explanation will not be provided.

Figure 16:
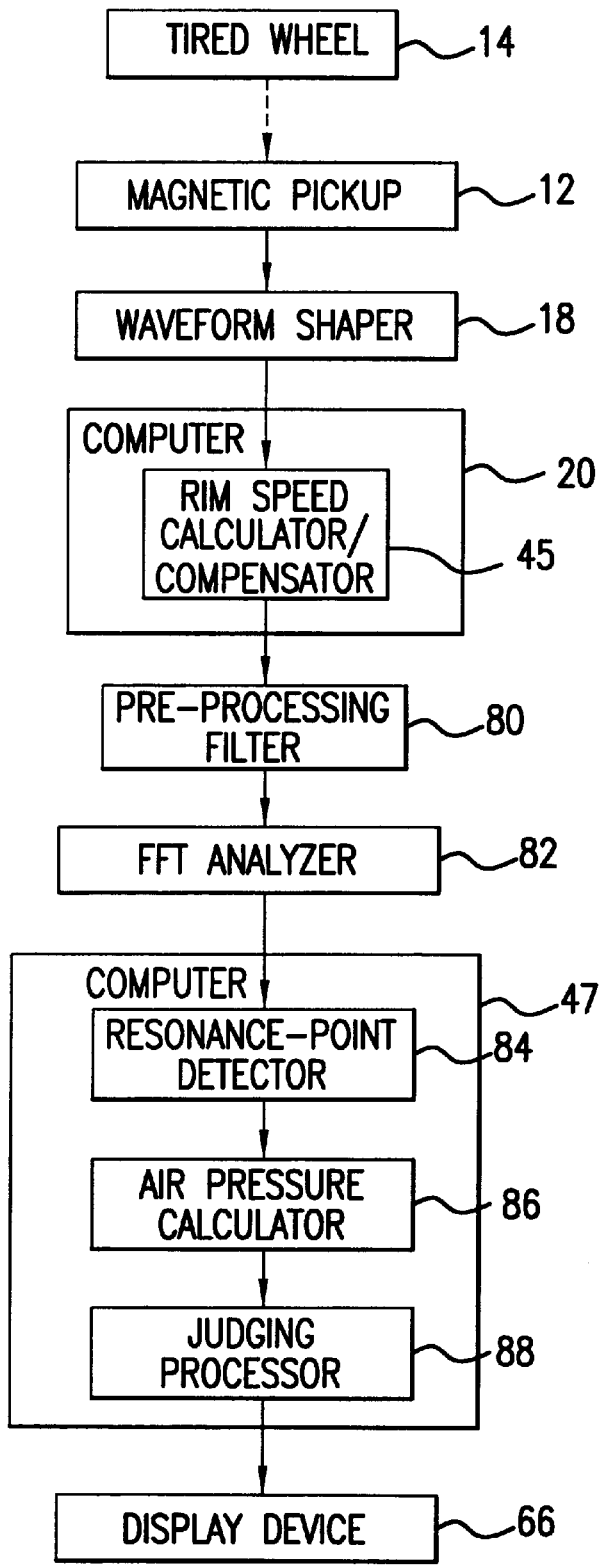
FIG. 16 is a block diagram illustrating the functional elements of a wheel information estimating apparatus constructed according to a second embodiment of the invention.
Figure 17:
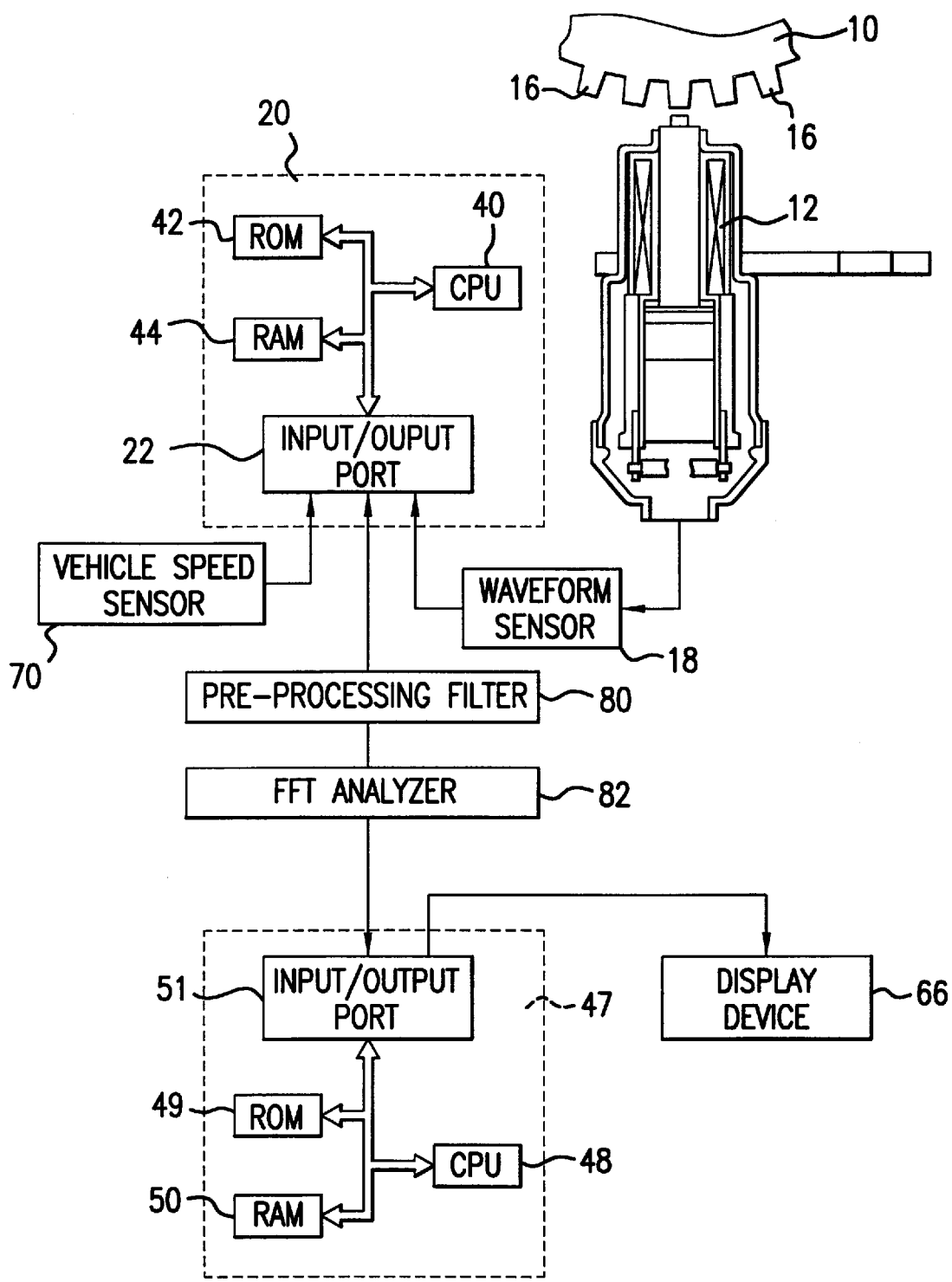
FIG. 17 is a block diagram illustrating the construction of the wheel information estimating apparatus of FIG. 16.

In the present embodiment, the computers 20 and 47 are connected to each other, through the pre-processing filter 80 and a FFT (high-speed Fourier transform) analyzer 82, as shown in FIG. 17. Like the first embodiment, the computer 20 includes the rim speed calculator/compensator 45, as shown in FIG. 16. The computer 47 stores in the ROM 49 various control programs including a tire pressure alarming routine as illustrated in FIG. 18, and thus constitute a resonance-point detector 84, air pressure calculator 86 and determining processor 88, as shown in FIG. 16.

The computer 47 is adapted to estimate the air pressure P of the tired wheel 26 from resonance frequencies, on the basis of the fact that the resonance frequency of the wheel speed signal which is in a predetermined frequency range is reduced with a decrease in the tire pressure P.

Since the computer 47 estimates the air pressure P on the basis of the frequency characteristic of the wheel speed signal, as described above, the FFT analyzer 82 is provided between the computers 20 and 47, such that the frequency characteristic of the wheel speed signal is analyzed by the FFT analyzer 82 and then supplied to the computer 47. The wheel speed signal may be transmitted from the rim speed calculator/compensator 45 directly to the FFT analyzer 82 for analysis of the frequency characteristic thereof. In this case, however, a component of the signal which is outside the predetermined frequency range is also supplied to the FFT analyzer 82, resulting in reduced analyzing accuracy. In the present embodiment, therefore, the pre-processing filter 80 is provided between the computer 20 and the FFT analyzer 82, such that only a component of the wheel speed signal which is in the predetermined frequency range is transmitted from the computer 20 to the FFT analyzer 82, through the pre-processing filter 80.

Figure 18:
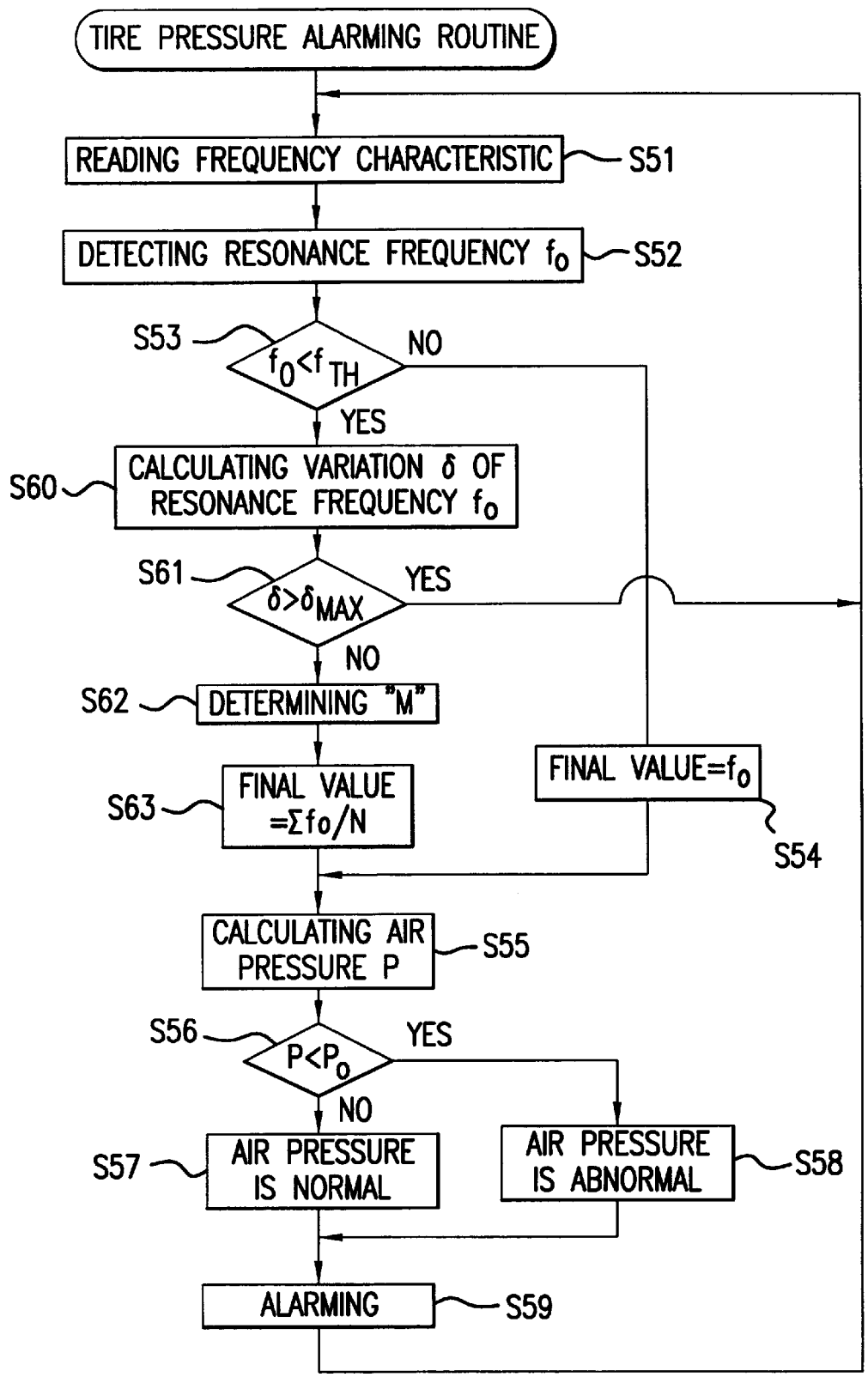
FIG. 18 is a flow chart illustrating a tire pressure alarming routine according to a control program stored in a read-only memory of a computer used by the apparatus of FIG. 16.

The computer 47 operates to execute the tire pressure alarming routine as illustrated in FIG. 18, in the manner as described below.

Initially, step S51 is implemented to read the frequency characteristic of the wheel speed signal from the FFT analyzer 82. Step S51 is followed by step S52 to detect the resonance frequency $f_0$ of the signal that is in the predetermined frequency range, on the basis of the frequency characteristic read in step S51. Namely, a portion of the computer 47 assigned to execute step S52 constitutes the resonance-point detector 84 as shown in FIG. 16. The control flow then goes to step S53 to determine whether the detected resonance frequency is smaller than a threshold value $f_{th}$ or not. Although this determination is similar to that made in step S56 (which will be described later) for determining whether the air pressure P is smaller than a reference value $P_0$ or not, the reason why these two steps are provided will be described later.

The resonance frequency $f_0$ detected in step S52 is referred to as a provisional value, to distinguish it from a final value which will be obtained in later steps. If the provisional value of the resonance frequency $f_0$ is equal to or larger than the threshold value $f_{th}$ in this cycle of execution of the routine, a negative decision (NO) is obtained in step S53, and step S54 is then implemented to determine that the detected resonance frequency $f_0$ is a final value. Step S54 is followed by step S55 to determine the air pressure P of the tired wheel 14, depending upon the final value of resonance frequency $f_0$. That is, the air pressure P is determined on the basis of the determined resonance frequency $f_0$, according to the relationship between the resonance frequency $f_0$ and the air pressure P, which is stored in the ROM 49 of the computer 47. Step S56 is then implemented to determine whether the determined air pressure P is smaller than the reference value $P_0$ or not. In this cycle of execution of the routine of FIG. 18, the final value of the resonance frequency $f_0$ is derived from the provisional value, and the provisional value is determined to be equal to or larger than the threshold value $f_{th}$ in step S53. This means that the air pressure P is equal to or larger than the reference value $P_0$. Accordingly, a negative decision (NO) is obtained this time in step S56, and it is determined in the next step S57 that the air pressure P is normal. Step S59 is then implemented to inform the vehicle operator of the normality of the air pressure P by means of the display device 66. Then, the control flow goes back to step S51.

If an affirmative decision (YES) is obtained in step S53, that is, if the provisional value of the resonance frequency $f_0$ detected in the current cycle is smaller than the threshold value $f_{th}$, steps S60–S63 are executed for the following reason.

When the provisional detected value of the resonance frequency $f_0$ is smaller than the threshold value $f_{th}$, there is a possibility that the air pressure P is abnormally low. However, the provisional value of the resonance frequency $f_0$ may suddenly or unexpectedly change even while the air pressure P is normal. In this case, if the tire pressure P is determined to be abnormally low and the vehicle operator is informed of the abnormality each time the provisional value $f_0$ is determined to be smaller than the threshold value $f_{th}$, an error may arise in informing the abnormality of the air pressure P, thus reducing the reliability of the computer 47. In the present embodiment, therefore, the air pressure P is not determined to be abnormally low immediately after the provisional resonance frequency value $f_0$ is determined to be smaller than the threshold value $f_{th}$. Rather, the final value of the resonance frequency $f_0$ is obtained by averaging the last several values of the resonance frequency $f_0$ stored in the RAM 50, which include the detected value obtained in step S52 of the current cycle. The number of these values thus averaged is referred to as a reference value "N". The determination as to whether or not the air pressure P is abnormally low is finally made in step S56, based on the thus obtained final value of the resonance frequency.

While the above reference value "N" may be a fixed or predetermined value, the value "N" may be varied in the present embodiment, depending upon a variation $\delta$ of the provisional detected value of the resonance frequency $f_0$. More specifically described referring to the graph of FIG. 19, the reference value "N" is increased with an increase in the variation $\delta$ until it reaches its maximum value $\delta_{MAX}$, and is fixed after the variation $\delta$ reaches the maximum value $\delta_{MAX}$. In this embodiment, the variation $\delta$ is another example of an amount on the basis of which the number of values, such as resonance frequency values, used for estimating a desired wheel information, such as a tire air pressure, is determined.

It will be understood from the above description that step S53 is a step for provisionally determining whether the air pressure P is abnormally low, on the basis of the provisional detected value of the resonance frequency $f_0$. On the other hand, step S56 is a step for finally determining whether the air pressure P is abnormally low, on the basis of the final value of the resonance frequency $f_0$. Thus, these steps S53 and S56 are seemingly similar to each other, but are in substance different from each other.

While the variation $\delta$ exceeds the maximum value $\delta_{MAX}$ in the present embodiment, the provisional value of the resonance frequency $f_0$ is obtained in step S53, but the determination of the final value of the resonance frequency $f_0$ (S63) is inhibited, and the determination as to the abnormality of the air pressure P (S56) is accordingly inhibited. While the variation $\delta$ that is larger than the maximum value $\delta_{MAX}$ is interpreted to indicate a sudden change of the provisional value of the resonance frequency $f_0$, it is generally known that the resonance frequency $f_0$ does not suddenly change with a change of the air pressure P of the tired wheel 14. Therefore, the final value of the resonance frequency $f_0$ is not obtained and the abnormality of the air pressure is not determined, when the variation $\delta$ exceeds the maximum value $\delta_{MAX}$.

Step S60 through step S63 of the routine of FIG. 18 are implemented in the manner as described below.

Figure 19:
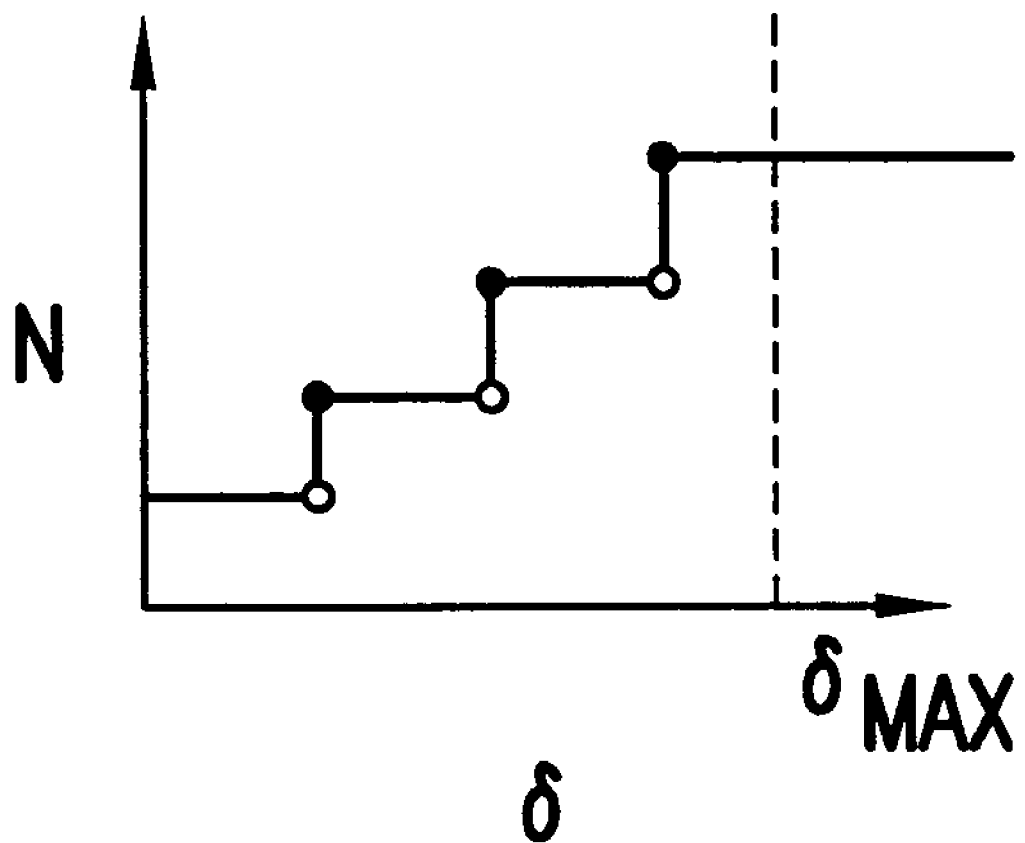
FIG. 19 is a graph showing a relationship between a variation $\delta$ as calculated in step S60 of the routine of FIG. 18, and the reference value N.

Initially, step S60 is implemented to calculate the variation $\delta$ based on the provisional detected values of the resonance frequency $f_0$. More specifically, the variation $\delta$ is calculated as an amount of variation of the provisional value obtained in step S52 in the current cycle of execution of the routine, from the provisional value obtained in the last cycle. Step S60 is followed by step S61 to determine whether the calculated variation $\delta$ exceeds the maximum value $\delta_{MAX}$ or not. If the variation $\delta$ does not exceed the maximum value $\delta_{MAX}$, a negative decision (NO) is obtained in step S61, and step S62 is then implemented to determine the reference value "N" on the basis of the calculated variation $\delta$. Namely, the reference value "N" corresponding to the current variation $\delta$ is determined according to the relationship between the variation $\delta$ and the reference value N, as indicated in the graph of FIG. 19, which relationship is stored in the ROM 49 of the computer 47. The control flow then goes to step S63 to read the last several values (=N) from a plurality of provisional values of the resonance frequency $f_0$ that have been stored in the RAM 50, and obtain an average value by dividing the sum of these values by the reference value "N". This average value is determined to be the current final value of the resonance frequency. The control flow then proceeds to step S55 and the following steps. If the currently obtained variation $\delta$ exceeds the maximum value $\delta_{MAX}$, an affirmative decision (YES) is obtained in step S61, and the control flow goes back to step S51. Thus, the estimation of the air pressure P is inhibited in this cycle of execution of the routine of FIG. 18.

It will be understood from the above description of the present embodiment that the rotor 10, magnetic pickup 12, waveform shaper 18, and a portion of the rim speed calculator/compensator 45 assigned to calculate the wheel speed constitute a detecting device, and that the FFT analyzer 82, resonance-point detector 84 and air pressure calculator 86 constitute estimating means for estimating the air pressure on the basis of the frequency characteristic of the wheel speed signal. It will also be understood that the pre-processing filter 80 constitutes frequency characteristic modifying means for providing an optimum frequency characteristic of the wheel speed signal as a wheel motion state supplied to the estimating means.

Figure 20:
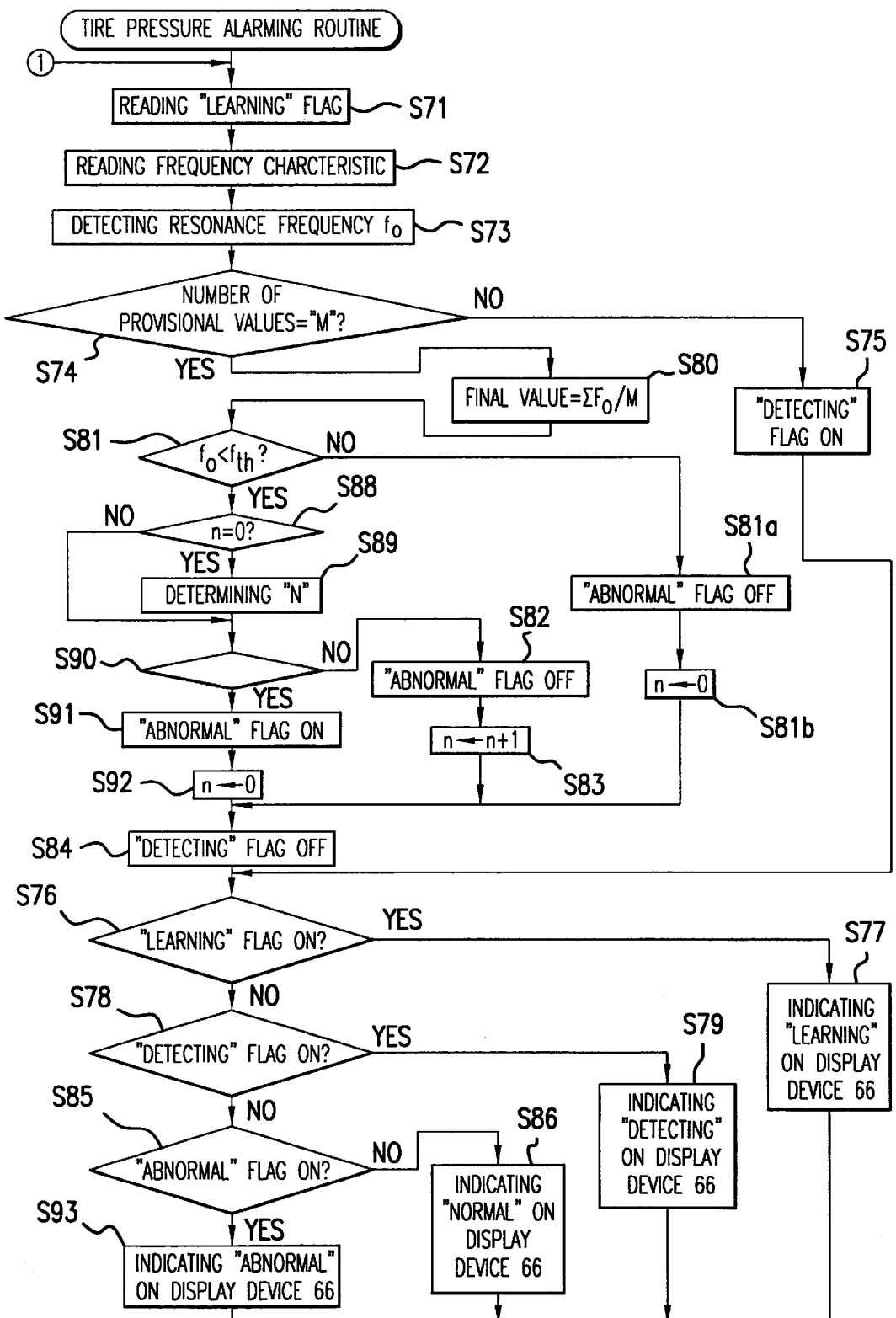
FIG. 20 is a flow chart illustrating another tire pressure alarming routine according to a control program stored in a read-only memory of a computer, which is used by a third embodiment of a wheel information estimating apparatus of the present invention.
Figure 21:
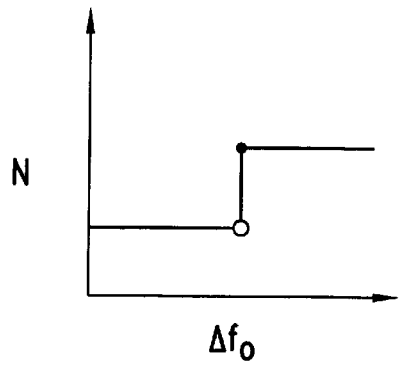
FIG. 21 is a graph showing a relationship between an amount of change $\Delta f_0$ of the resonance frequency and the number "N" of final values to be obtained in the routine of FIG. 20.

Referring next to FIGS. 20 and 21, there will be described a third embodiment of the present invention, which is similar to the embodiment shown in FIG. 16, except a portion of the computer 47 assigned to execute a tire pressure alarming routine which will be described. In the following description, the same reference numerals as used in the second embodiment are used for identifying corresponding elements, of which detailed explanation is not provided.

The computer 47 of the present embodiment operates to execute the tire pressure alarming routine as illustrated in FIG. 20, which is different in the following aspects from the control routine of FIG. 18 of the second embodiment.

The present embodiment is different from the second embodiment in that the final value of the resonance frequency $f_0$ is always obtained by averaging a predetermined number (=M) of the last provisional values of the resonance frequency $f_0$ obtained in the current and last several cycles of execution of this routine. In this case, the number M is a fixed or predetermined value. Even with the number M being a fixed value, the present embodiment takes the following measure, so as to avoid an error in informing the abnormality of the air pressure P, which error may be otherwise incurred by a sudden change of the detected value of the resonance frequency $f_0$.

Namely, the air pressure P is determined to be normal each time the final value of the reference frequency $f_0$ is equal to or larger than the threshold value $f_{th}$. However, the air pressure P is not always determined to be abnormally low when the final resonance frequency value is smaller than the threshold value $f_{th}$. After the computer 47 determines for the first time that the final resonance frequency value is smaller than the threshold value $f_{th}$, a number (=N) of final values of the resonance frequency are obtained, and the air pressure P is determined to be abnormally low only when each and every one of the thus obtained final resonance frequency values is determined to be smaller than the threshold value $f_{th}$. The number "N" of the final values to be obtained is determined depending upon an amount of change $\Delta f_0$ that is a difference between the final value obtained in the current cycle of execution of the routine, and the final value obtained last time. That is, when the final value becomes smaller than the threshold value $f_{th}$, it is assumed that the amount of change $\Delta f_0$ is due to a sudden or unexpected change of the resonance frequency $f_0$, and the computer 47 continues to determine that the air pressure P is normal, for a period of time in which the sudden change is expected to be eliminated. If the final values obtained in this period of time are continuously determined to be smaller than the threshold value $f_{th}$, the computer 47 determines that the amount of change $\Delta f_0$ is truly derived from a change of the air pressure P. In this manner, a false alarming due to the sudden change of the detected resonance frequency $f_0$ can be avoided. It is noted that the number "N" is increased in steps with an increase in the amount of change $\Delta f_0$, as indicated in the graph of FIG. 21.

As in the first embodiment, the present embodiment is adapted such that the wheel speed variation obtaining routine of FIG. 5 is executed each time a power-on switch of the vehicle has been turned on. During a certain period of time needed to finish execution of this routine, however, the resonance frequency $f_0$ cannot be detected with high accuracy, and the determination as to whether the air pressure is abnormally low is unreliable. Accordingly, the determination on the air pressure is inhibited during the execution of the wheel speed variation obtaining routine, even though the resonance frequency $f_0$ is detected.

Even after the periodic wheel speed variation is obtained, the determination on the air pressure cannot be made until the predetermined number (=M) of provisional values of the resonance frequency are obtained to determine the first final value. However, the vehicle operator is normally ignorant that the tire pressure alarming device is currently in this state of operation and thus not able to accurately determine whether the tire pressure is abnormally low. In the present embodiment, therefore, the vehicle operator is informed through the display device 66 that the alarming device is in the process of obtaining the periodic wheel speed variation, that is, the device is now in its "LEARNING" mode, or that the alarming device is in the process of obtaining the first final value of the resonance frequency $f_0$, that is, the device is now in its "DETECTING" mode.

The tire pressure alarming routine will be hereinafter described in detail, referring to the flow chart of FIG. 20.

The routine is started with step S71 to read a "LEARNING" flag from the computer 20. The "LEARNING" flag is in its "ON" state while the periodic wheel speed variation is being obtained, that is, while the routine of FIG. 5 is being executed, and the same flag is in its "OFF" state while the wheel speed variation is not obtained. Step S71 is followed by step S72 to read the frequency characteristic of the wheel speed signal which is analyzed by the FFT analyzer 82. Step S73 is then implemented to detect the current resonance frequency $f_0$ of the wheel speed signal which is in the predetermined frequency range, on the basis of the frequency characteristic read in step S72. The detected resonance frequency $f_0$ is stored in RAM 50, and is used in the following steps as a provisional value. The control flow then goes to step S74 to determine whether the number of provisional values which have been obtained is equal to "M" or not. If the number "M" of the provisional values have not been obtained, a negative decision "NO" is obtained in step S74, and step S75 is implemented to place a "DETECTING" flag provided in the RAM 50 in its "ON" state. The "DETECTING" flag is placed in the "ON" state while the number of the provisional values which have been obtained has not reached the predetermined value "M", and is placed in its "OFF" state when the number of the obtained provisional values has reached "M".

The control flow then goes to step S76 to determine whether the "LEARNING" flag is in the "ON" state or not. If the flag is in the "ON" state, an affirmative decision (YES) is obtained in step S76, and the control flow goes to step S77 to activate the display device 66 to inform the vehicle operator that the periodic wheel speed variation is being obtained, that is, the routine of FIG. 5 is being executed. Thus, one cycle of execution of the routine of FIG. 20 is terminated. If the "LEARNING" flag is in the "OFF" state, on the other hand, a negative decision (NO) is obtained in step S76, and step S78 is then implemented to determine whether the "DETECTING" flag is in the "ON" state or not. Since the "DETECTING" flag is in the "ON" state in this cycle of execution of the routine, an affirmative decision (YES) is obtained in step S78, and step S79 is implemented to activate the display device 66 to inform the vehicle operator that the first final value of the resonance frequency $f_0$ is being detected.

An affirmative decision (YES) is obtained in step S74 after repeatedly executing steps S71–S73 until the predetermined number (=M) of the provisional values of the resonance frequency $f_0$ are detected. Step S80 is then implemented to calculate the first final value of the resonance frequency $f_0$ by averaging the provisional values obtained in the first to M-th cycles of execution of the routine of FIG. 20. Step S80 is followed by step S81 to determine whether the thus obtained final value is smaller than the threshold value $f_{th}$ or not. If the final value is equal to or larger than the threshold value $f_{th}$, a negative decision (NO) is obtained in step S81, and step S81a is implemented to place an "ABNORMAL" flag in its "OFF" state. The "ABNORMAL" flag provided in the RAM 50 is in the "OFF" state to indicate that the air pressure P is normal, and is in the "ON" state to indicate that the air pressure P is abnormally low. Step S81a is followed by step S81b to set the integer "n" to 0. The integer "n" represents the number of the final values which have been obtained since a certain point of time, in other words, the number of times an affirmative decision (YES) is obtained in step S81 consecutively before the integer "n" reaches "N", as described later. Step S84 is then implemented to place the "DETECTING" flag in the "OFF" state since the final value is obtained in step S80 in this cycle of execution of the routine. Step S84 is followed by step S76 and the following steps.

Since the "LEARNING" flag and the "DETECTING" flag are both in the "OFF" state in the current cycle, negative decisions (NO) are obtained in steps S76 and S78. Step S85 is then implemented to determine whether the "ABNORMAL" flag is in the "ON" state or not. Since the "ABNORMAL" flag is in the "OFF" state in this cycle, a negative decision (NO) is obtained in step S85, and the control flow goes to step S86 to inform the vehicle operator via the display device 66 that the air pressure P is currently normal. Thus, one cycle of execution of the routine of FIG. 20 is terminated.

If the final value of the resonance frequency $f_0$ obtained in step S80 is smaller than the threshold value $f_{th}$, an affirmative decision (YES) is obtained in step S81, and step S88 is then implemented to determine whether the integer "n" is equal to 0 or not. Since the integer "n" is 0 when step S88 is implemented for the first time, an affirmative decision (YES) is obtained in step S88, and step S89 is then implemented to calculate an amount of change $\Delta f_0$ of the current resonance frequency $f_0$ from the last obtained value, and determine the reference value "N" on the basis of the calculated amount of change $\Delta f_0$, as described above. Step S90 is then implemented to determine whether the integer "n" is larger than the reference value "N" or not. If a negative decision (NO) is obtained in step S90, step S82 is then implemented to place the "ABNORMAL" flag in the "OFF" state. Then, the integer "n" is incremented in step S83. The control flow then goes to step S84 and the following steps, and a negative decision (NO) is obtained in step S85 since the "ABNORMAL" flag is currently placed in the "OFF" state. Then, step S86 is implemented to activate the display device 66 to inform the vehicle operator that the air pressure P is currently normal.

If the integer "n" becomes larger than the reference value "N" after repeatedly executing the routine of FIG. 20, an affirmative decision (YES) is obtained in step S90, and step S92 is then implemented to place the "ABNORMAL" flag in the "ON" state. In the next step S92, the integer "n" is set to 0 for the next cycle of execution of this routine. The control flow then goes to step S84 and the following steps. Since an affirmative decision (YES) is obtained in step S85 this time, step S93 is implemented to activate the display device 66 to inform the vehicle operator that the air pressure P is now abnormally low.

In the present embodiment, the resonance frequency $f_0$ is detected irrespective of whether it is difficult for the magnetic pickup 12 to detect the wheel speed v with sufficiently high accuracy, in the cases where the tired wheels 14 are about to stop rotating, or where the vehicle is running on a rough road, such as a graveled road, for example. However, the detection of the resonance frequency $f_0$, and the determination on the tire pressure P may be inhibited under such conditions. In this case, the tire pressure alarming device will not inform the vehicle operator of the abnormality of the air pressure, even if the air pressure is actually abnormally low. To avoid misunderstanding of the vehicle operator, it is desirable to indicate on the display device 66 that the vehicle is now in the "PREPARING" mode, to inform the vehicle operator that the determination on the air pressure P is currently inhibited since the resonance frequency $f_0$ cannot be accurately detected.

It will be understood from the above description of the present embodiment that the rotor 10, magnetic pickup 12, waveform shaper 18, and a portion of the rim speed calculator/compensator 45 assigned to calculate the wheel speed v constitute a detecting device, and the FFT analyzer 82, resonance-point detector 84 and air pressure calculator 86 constitute estimating means for estimating the air pressure on the basis of the frequency characteristic of the wheel speed signal. It will also be understood that the pre-processing filter 80 constitutes frequency characteristic modifying means for providing an optimum frequency characteristic of the wheel speed signal as a wheel motion state supplied to the estimating means.

Figure 22:
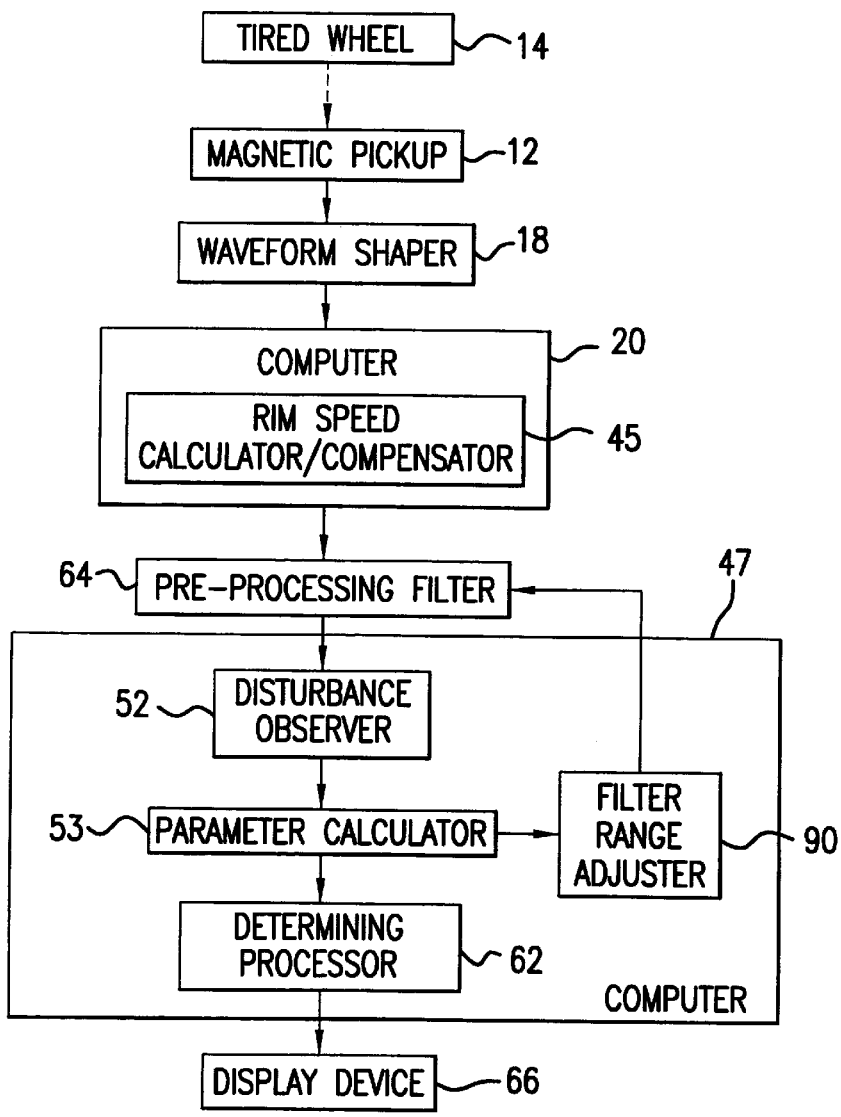
FIG. 22 is a block diagram illustrating the functional elements of a wheel information estimating apparatus constructed according to a fourth embodiment of the invention.

Referring next to FIGS. 22–26, there will be described a fourth embodiment of the present invention in the form of a tire pressure alarming apparatus. As shown in FIG. 22, the present apparatus includes the magnetic pickup 12, waveform shaper 18, computer 20, vehicle speed sensor 70 (which is not shown in FIG. 22), pre-processing filter 64, computer 47, torque detector 68 (which is not shown in FIG. 22) and display device 66. In this embodiment, the filtering characteristics of the pre-processing filter 64 may be varied. That is, a filter range of the filter 64, i.e., a frequency range of a wheel speed signal which passes through the pre-processing filter 64, is variable. Further, the computer 47 includes a filter range adjuster 90, in addition to the disturbance observer 52, parameter calculator 53 and the determining processor 62.

Figure 23:
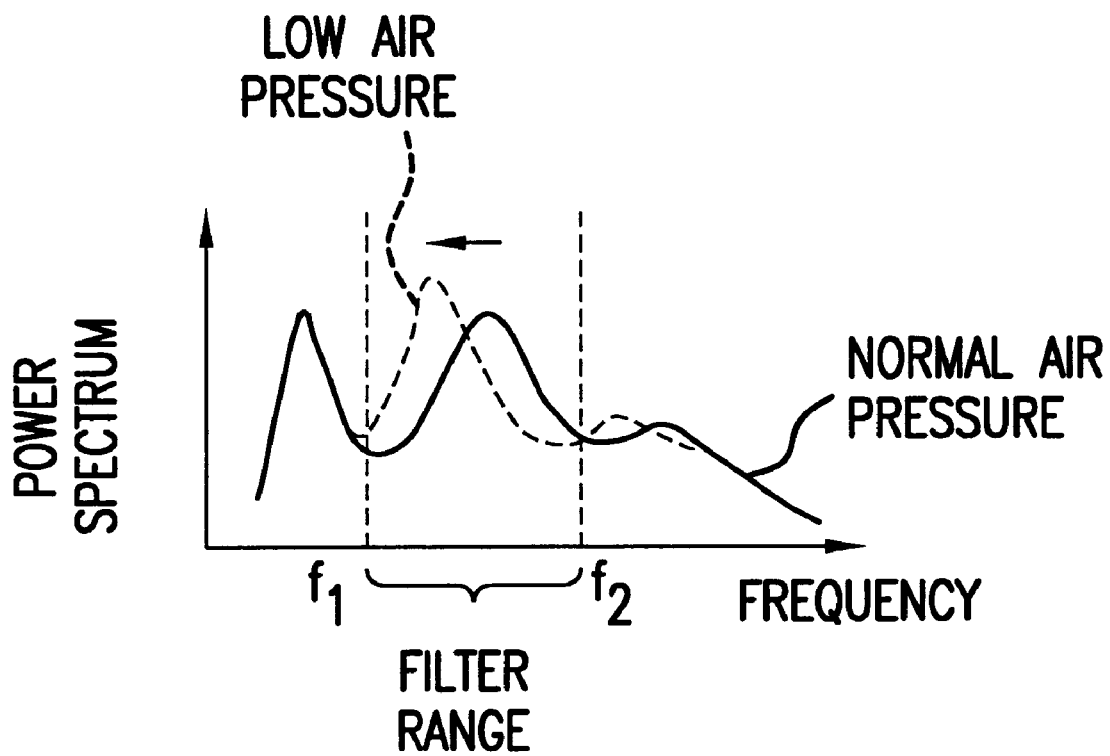
FIG. 23 is a graph explaining the function of a preprocessing filter of the apparatus of FIG. 22.

The graph of FIG. 23 schematically shows a frequency characteristic of a wheel speed signal generated by the rim speed calculator/compensator 45, as observed when the air pressure P of the tired wheel 26 is kept at a normal level, and a frequency characteristic of the same signal observed when the air pressure P is lowered from the normal level. A frequency component of the wheel speed signal which corresponds to the middle one of three peaks of each frequency curve shown in FIG. 23 is suitably used by the disturbance observer 52 for estimating the air pressure. As is understood from the graph of FIG. 23, an optimum frequency range which covers this frequency component varies with the level of the air pressure P, and shifts to the lower range as the air pressure P is reduced. Therefore, the optimum frequency range, or the filter range of the filter 64, tends to be undesirably broad, if the range is fixed or predetermined, irrespective of changes of the air pressure P. As a result, unnecessary frequency components may be picked up by the pre-processing filter 64 to pass therethrough, resulting in reduced estimating accuracy of the disturbance observer 52, and reduced reliability in determining whether the tire pressure is abnormally low. In this embodiment, therefore, the filter range of the filter 64 can be precisely changed in accordance with a change in the air pressure P, thus permitting a considerably narrow frequency range of the signal to pass through the filter 64. In the present embodiment, the filter range is changed depending upon an amount of change $\Delta K$ of the spring constant K, which amount is estimated by the disturbance observer 52.

Figure 24:
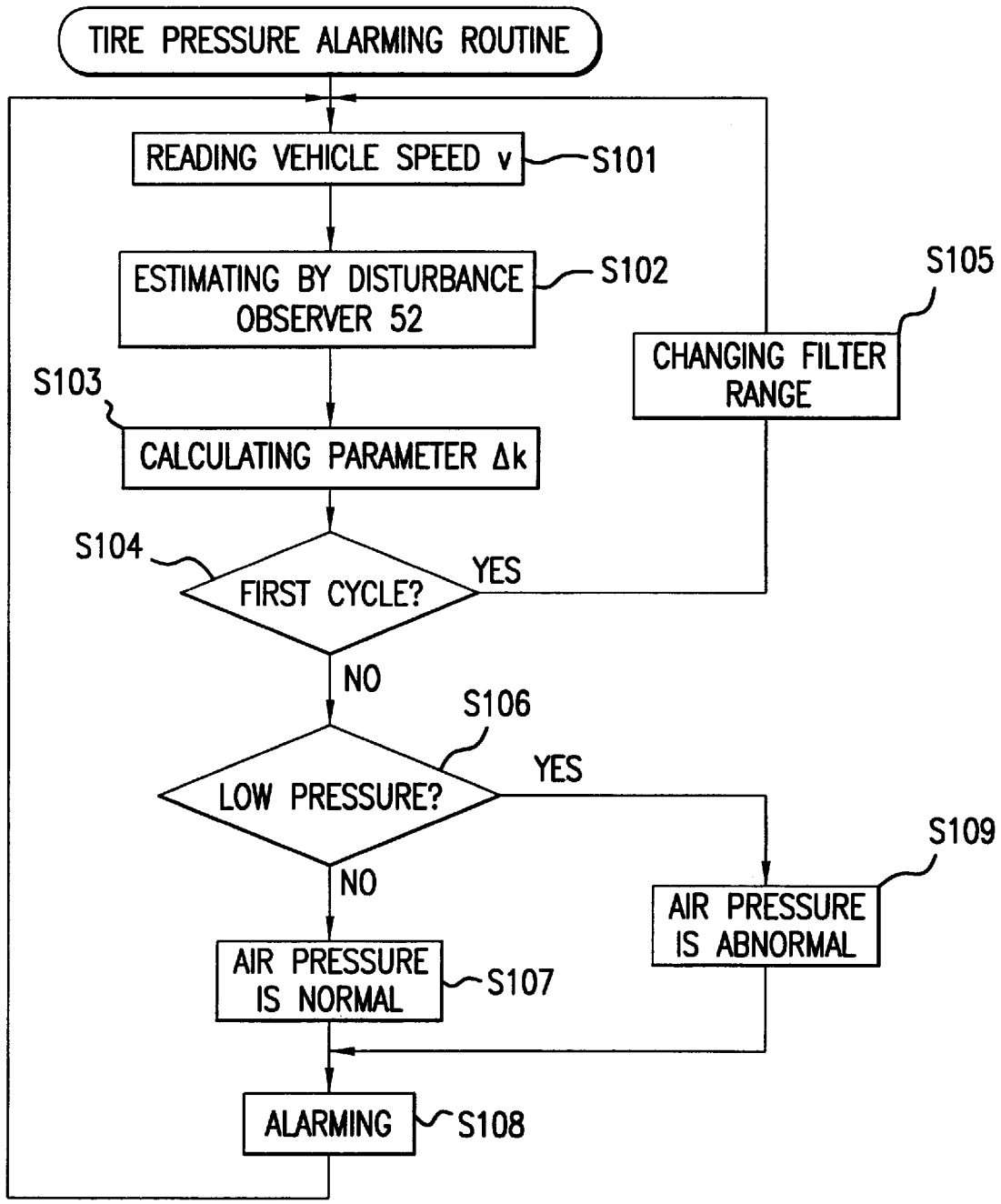
FIG. 24 is a flow chart illustrating a tire pressure alarming routine according to a control program stored in a read-only memory of a computer used by the apparatus of FIG. 22.

A control program for executing a tire pressure alarming routine as illustrated in FIG. 24 is stored in the ROM 49 of the computer 47. This program is adapted to change the filter range or optimum frequency range of the wheel speed signal, in the manner as described below.

The routine of FIG. 24 is started with step S101 to read the wheel speed v from the pre-processing filter 64. Initially, the filter range of the pre-processing filter 64 is provisionally set to a range suitable for the case where the air pressure P of the tired wheel 14 is at a normal level. In the first cycle of execution of the routine of FIG. 24, therefore, the signal indicative of the wheel speed v read in step S101 is in the predetermined frequency range corresponding to the provisional filter range.

Step S101 is followed by step S102 to activate the disturbance observer 52 to estimate the disturbance $w_2$ and the torsion angle $\theta_{RB}$, on the basis of the wheel speed read in step S101. Step S103 is then implemented to estimate an amount of change $\Delta K$ of the spring constant of the torsion spring 32. This parameter $\Delta K$ may be obtained by calculating correlation functions and normalizing, or by a method of least squares, for example.

The control flow then goes to step S104 to determine whether the current cycle of execution of the routine of FIG. 24 is the first cycle after the computer 47 is turned on. Since the routine is executed for the first time, an affirmative decision (YES) is obtained in step S104, and step S105 is then implemented to change the filter range of the pre-processing filter 64. More specifically, the filter range is set to an optimum range suitable for the frequency characteristic of the wheel speed signal, on the basis of the amount of change AK estimated in step S103. For example, the filter range is determined according to a data table stored in the ROM 49, which represents a relationship between the amount of change $\Delta K$ and the filter range. It will be understood from the above description that a portion of the computer 47 assigned to execute steps S104 and S105 constitutes the filter range adjuster 90, which in turn constitutes means for changing the optimum frequency range used for providing an optimum frequency characteristic of the wheel speed signal as the wheel motion state. The control flow then goes back to step S101 to read again the wheel speed v.

In the second cycle of execution of the routine of FIG. 24, a negative decision (NO) is obtained in step S104, and step S106 is then implemented to determine whether the air pressure P is lower than the reference value $P_0$ or not, on the basis of the estimated value of the amount of change $\Delta P$. If a negative decision (NO) is obtained in step S106, namely, if the air pressure P is not lower than the value $P_0$, step S107 is implemented to determine that the tire pressure is normal. Then, step S108 is implemented to inform the vehicle operator of this fact through the display device 66. If an affirmative decision (YES) is obtained in step S106, namely, if the air pressure P is lower than the reference value $P_0$, step S109 is implemented to determine that the tire pressure is abnormally low. Step S108 is then implemented to inform the vehicle operator of this fact via the display device 66. In either case, the control flow then goes back to step S101.

It will be understood from the above description that steps S107–S109 for determining the abnormality of the air pressure P is inhibited when the instant routine is executed for the first time, and is first allowed in the second cycle. This is because the wheel speed v supplied to the disturbance observer 52 is obtained through the pre-processing filter 64 having the provisional filter range, and the amount of change $\Delta K$ estimated on the basis of this wheel speed v may not be sufficiently reliable, and thus cannot be relied upon for determining the abnormality of the air pressure.

In the above-described routine of FIG. 24, the filter range or optimum frequency range is always adjusted in the first cycle of execution, while inhibiting the determination as to whether the air pressure is abnormally low. However, the determination need not be inhibited even in the first cycle where the air pressure can be estimated with high accuracy. Accordingly, the illustrated routine may be modified such that the determination on the air pressure is made without changing the filter range even in the first cycle of execution of the routine, where it is determined that the air pressure P can be estimated with high accuracy. The thus modified routine is illustrated in the flow chart of FIG. 25, and will be hereinafter described in detail.

In the present routine, steps S111–S114 are equivalent to steps S101–S104 of the previous routine of FIG. 24. If this routine is executed for the first time, an affirmative decision (YES) is obtained in step S114, and step S115 is then implemented to determine whether an absolute value of the amount of change $\Delta K$ (an amount of deviation from the nominal value K) is equal to or smaller than the reference value $\Delta K_0$. When the absolute value of the amount of change $\Delta K$ is equal to or smaller than the reference value $\Delta K_0$, the disturbance observer 52, which receives the wheel speed signal in the provisional frequency range from the pre-processing filter 64, generally assures sufficiently high estimating accuracy. If an affirmative decision (YES) is obtained in step S115, step S117 and the following steps are then implemented to determine whether the air pressure P is abnormally low. Thus, the determination on the air pressure may be made even in the first cycle of execution of the routine. Since the absolute value of the amount of change $\Delta K$ is equal to or smaller than the reference value $\Delta K_0$ as determined in step S115, an amount of change of the tire pressure P from the nominal pressure is accordingly small, and a negative decision (NO) is obtained in step S117. Step S118 is then implemented to determine that the tire pressure is normal, and this determination is displayed in the next step S119. If the absolute value of the amount of change $\Delta K$ obtained in this cycle is larger than the reference value $\Delta K_0$, a negative decision (NO) is obtained in step S115, and the control flow then goes to step S116 to change the filter range as in step S105 of the routine of FIG. 24, while inhibiting in the first cycle the determination as to whether the air pressure P is abnormally low.

It will be understood that a portion of the computer 47 assigned to execute steps S114–S116 of this routine constitute the filter range adjuster 90, which in turn constitutes means for changing the optimum frequency range used for providing an optimum frequency characteristic of the wheel speed signal as the wheel motion state, which is to be supplied to the estimating means.

Figure 25:
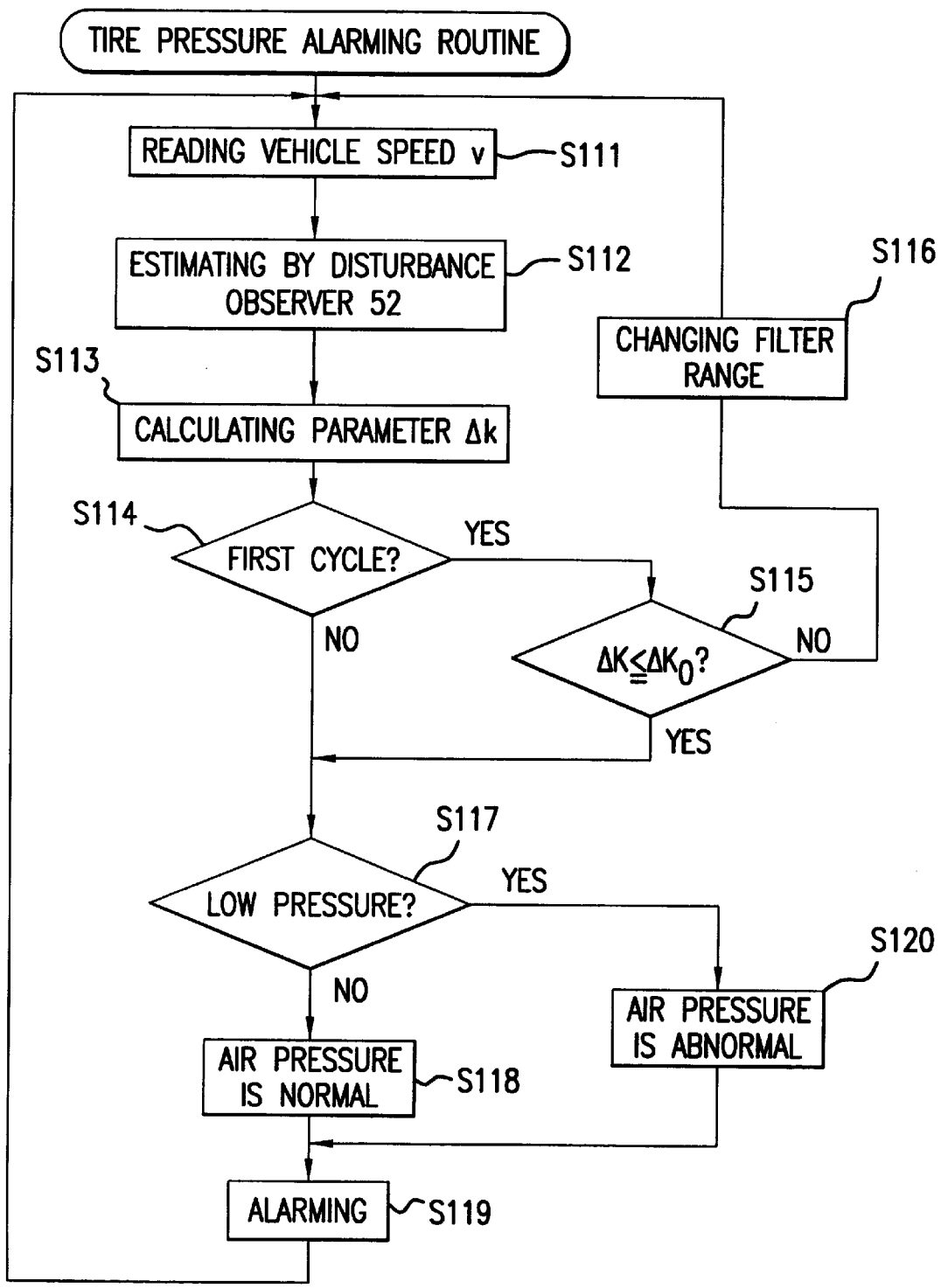
FIG. 25 is a flow chart illustrating a tire pressure alarming routine according to another control program stored in the read-only memory.
Figure 26:
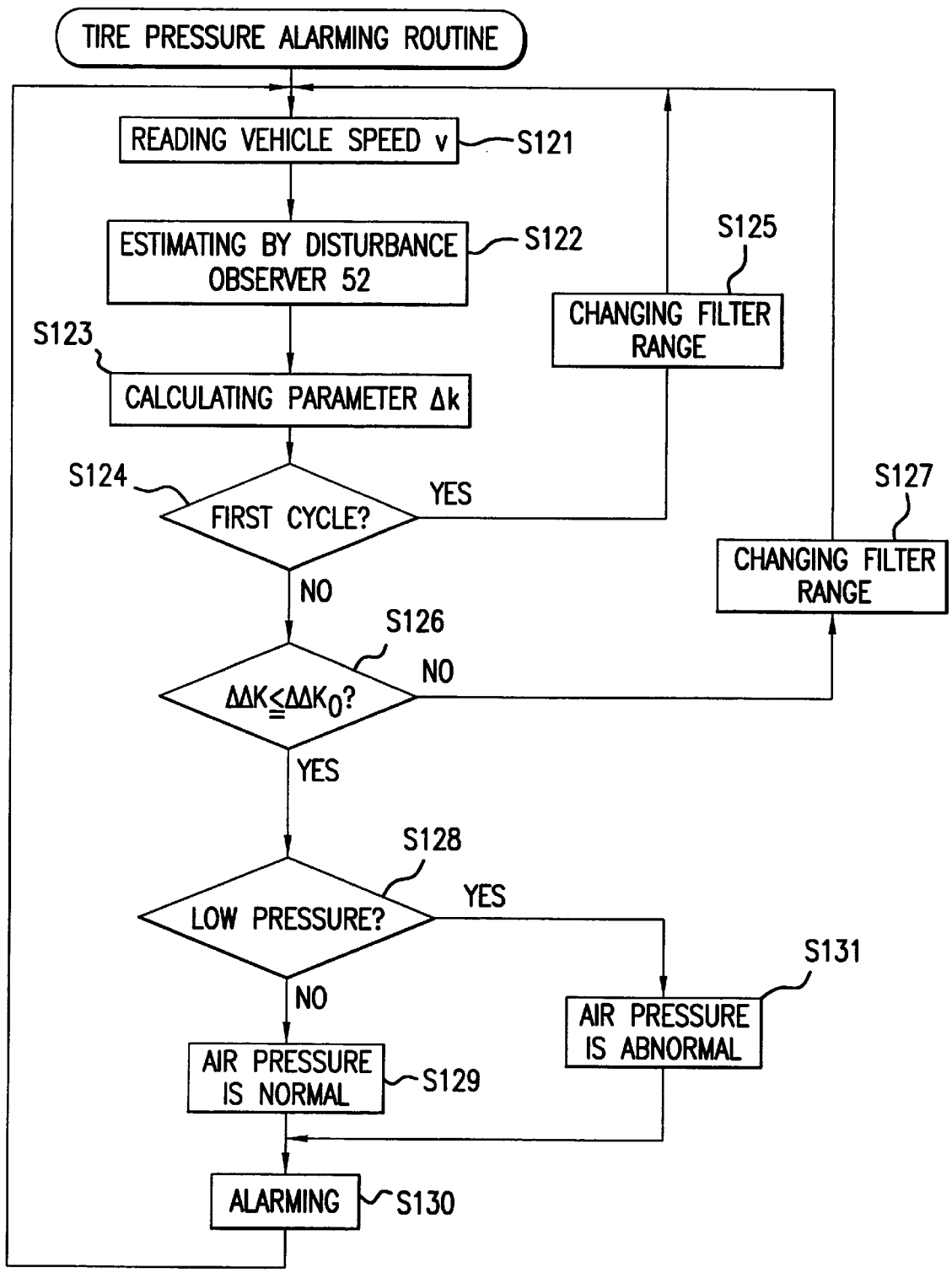
FIG. 26 is a flow chart illustrating a tire pressure alarming routine according to a further control program stored in the read-only memory.

The filter range or optimum frequency range is not changed in the second and subsequent cycles of execution of each of the above-described two routines of FIG. 24 and FIG. 25. However, the control routine may be modified as illustrated in the flow chart of FIG. 26, such that the filter range is changed in each of the second and subsequent cycles as well as the first cycle.

In the present routine, steps S121–S124 are equivalent to steps S101–S104 or steps S111–S114 of the routines of FIGS. 24 and 25. If this routine is executed for the first time, an affirmative decision (YES) is obtained in step S124, and step S125 is then implemented to change the filter range of the pre-processing filter 64, while inhibiting the determination as to whether the air pressure P is abnormally low.

In the second and subsequent cycles of execution of the present routine, a negative decision (NO) is obtained in step S124. Step S126 is then implemented to calculate a deviation $\Delta\Delta K$ of the estimated amount of change $\Delta K$ obtained in the current cycle, from the estimated amount of change $\Delta K$ obtained in the previous cycle, and determine whether an absolute value of the deviation $\Delta\Delta K$ is equal to or smaller than a positive reference value $\Delta\Delta K_0$ or not. Namely, the stability of the estimated value $\Delta K$ obtained in the current cycle is evaluated in this step S126. If an affirmative decision (YES) is obtained in step S126, that is, if the absolute value of the deviation $\Delta\Delta K$ is equal to or smaller than the reference value $\Delta\Delta K_0$, this means that the estimated value $\Delta K$ currently obtained is sufficiently stable and reliable, and the current filter range corresponds to an optimum frequency range suitable for the frequency characteristic of the wheel speed signal. Then, steps S128–S130 are implemented to determine whether the air pressure P is abnormally low.

If the absolute value of the deviation $\Delta\Delta K$ obtained in this cycle is larger than the reference value $\Delta\Delta K_0$, a negative decision (NO) is obtained in step S126, and the filter range is changed in step S127. More specifically, if the deviation $\Delta\Delta K$ is a negative value, which indicates that the air pressure P is lowered, the whole filter range is shifted by a predetermined amount $\Delta f$ to a lower frequency range. If the deviation $\Delta\Delta K$ is a positive value, which indicates that the air pressure P is increased, the whole filter range is shifted by a predetermined amount $\Delta f$ to a higher frequency range. As a result of repeatedly executing steps S126, S127 and S121–124, therefore, the absolute value of the deviation $\Delta\Delta K$ becomes equal to or smaller than the reference value $\Delta\Delta K_0$, and an affirmative decision (YES) is eventually obtained in step S126. At this point of time, the filter range corresponds to an optimum frequency range suitable for the frequency characteristic of the wheel speed signal.

It will be understood from the above description that a portion of the computer 47 assigned to execute steps S126 and S127 constitutes the filter range adjuster 90, which in turn constitutes means for changing the optimum frequency range so that an amount of variation of the spring constant K is not greater than a predetermined value.

Referring next to FIGS. 27–35, there will be described a fifth embodiment of the present invention.

A frequency characteristic of the wheel speed signal generated by the rim speed calculator/compensator 45 is represented by a curve having a plurality of peaks, as shown in the graph of FIG. 12. The frequency range ($Rf_1$) to which the peak having the lowest frequency belongs involves information relating to an amount of change $\Delta J$ of the moment of inertia J, and the frequency range ($Rf_2$) to which the peak having the second lowest frequency belongs involves information relating to an amount of change $\Delta K$ of the spring constant K. Accordingly, the accuracy of the disturbance observer 52 of estimating the amount of change $\Delta J$ of the moment of inertia J is improved with an increase in the strength of a frequency component that is represented by the peak having the lowest frequency. Similarly, the accuracy of the disturbance observer 52 of estimating the amount of change $\Delta K$ of the spring constant K is improved with an increase in the strength of a frequency component that is represented by the peak having the second lowest frequency.

The tired wheels 14 are connected to a vehicle body through a suspension system, such that the wheels 14 are displaceable relative to the vehicle body. Where the motion of each wheel 14 relative to the vehicle body through the suspension is observed in a transverse direction of the vehicle, the motion locus of the center of the wheel 14 is generally an arc, rather than a straight line which extends in the vertical direction of the vehicle.

Figure 27:
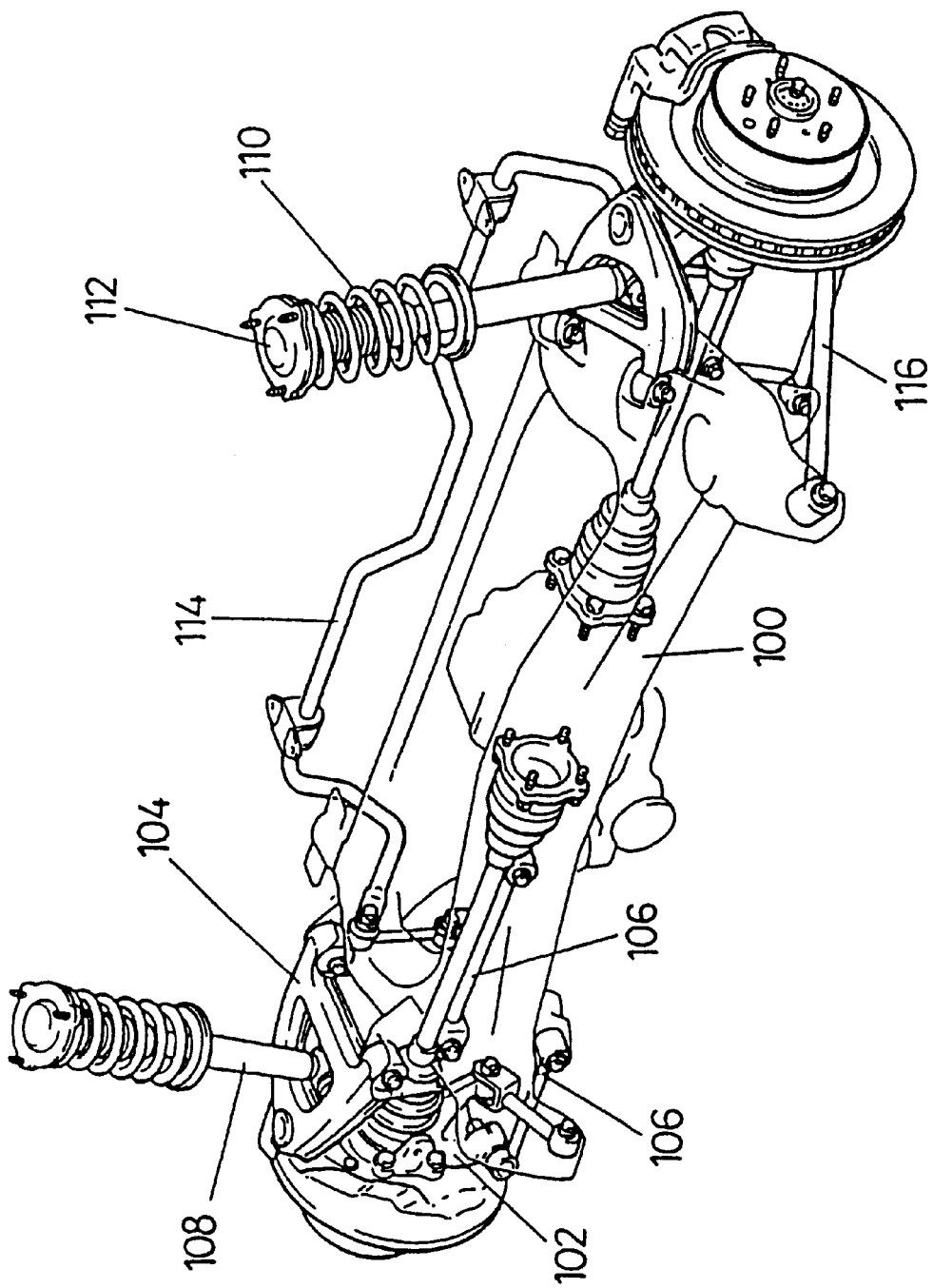
FIG. 27 is a perspective view showing a rear suspension system of an automotive vehicle.

FIG. 27 shows an example of a double wishbone type rear suspension system, in which a vehicle frame 100 is connected to a carrier 102 which rotatably supports each of the wheels 14, through an A-shaped upper arm 104 and a pair of lower arms 106, such that the wheel 14 is displaceable relative to the vehicle frame 100. In this case, the center of the wheel 14 has a motion locus as illustrated in FIG. 28(b), for example. The suspension system shown in FIG. 27 further includes a shock absorber 108, a coil spring 110, an upper support 112, and a strut bar 116, with respect to each wheel 14, and a stabilizer 114.

The motion locus of the point which connects the carrier 102 and the upper arm 104 is supposed to lie on the same circle on which the motion locus of the point which connects the carrier 102 and lower arms 106 lies. In this case, the instantaneous center O, which is the center of the above circle, is positioned apart from the wheel 14 toward the front side of the vehicle. As a result, the wheel 14 vibrates relative to the vehicle body not only in the vertical direction but also in a front-to-rear direction, in other words, in a running or longitudinal direction of the vehicle. Therefore, the wheel 14 moves relative to a road surface in the front-to-rear direction at a point of contact between the wheel 14 and the road surface. Since the wheel speed signal, which is hardly influenced by the vertical vibrations of the wheel 14, is strongly influenced by the vibrations applied in the front-to-rear direction, the front-to-rear vibrations appear in the wheel speed signal as vibrations occurring at an unsprung resonance point. On the other hand, a frequency range which substantially coincides with the unsprung resonance point includes a frequency component of the wheel speed signal as represented by the peak having the lowest frequency in the graph of FIG. 12. The strength of this frequency component influences the accuracy of estimating the moment of inertia J. In sum, there is a predetermined relationship between the motion locus of the center of the wheel and the frequency characteristic of the wheel speed signal, in particular, the frequency characteristic at the unsprung resonance point. Thus, an optimum or appropriate motion locus can be obtained by utilizing this relationship, so as to obtain an optimum frequency characteristic of the wheel speed signal, thus eliminating a need to provide the pre-processing filter as used in the preceding embodiments.

Figure 28A:
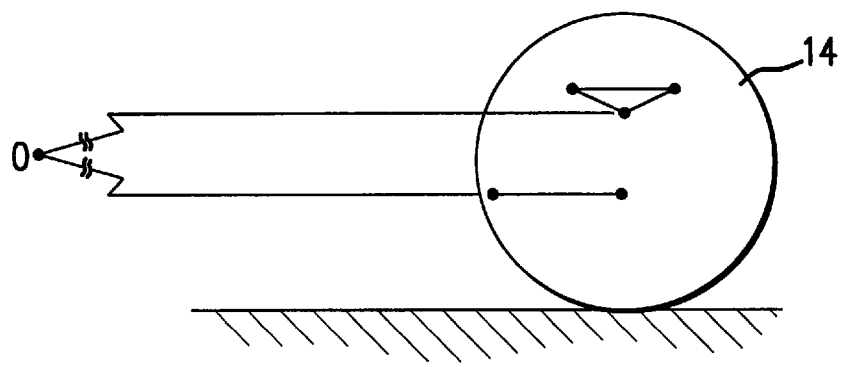
FIG. 28A is a view showing an instantaneous center O located far from the center of a vehicle wheel, and a locus of the center of the wheel, FIG. 28B showing an instantaneous center O located in a normal position, and a locus of the center of the wheel, FIG. 28C showing an instantaneous center O located closer to the center of the wheel, and a locus of the center of the wheel.
Figure 28B:
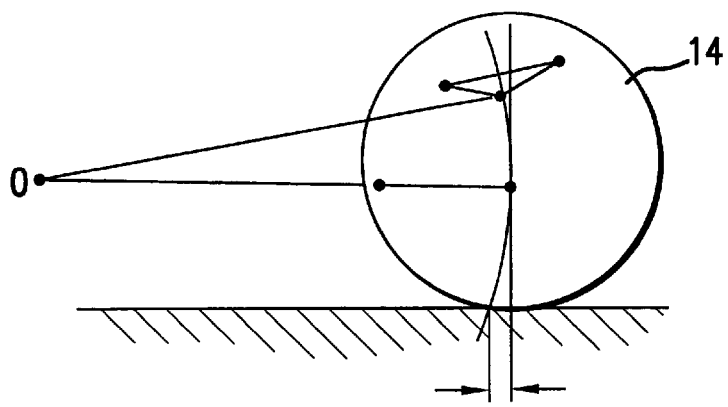
Figure 28C:
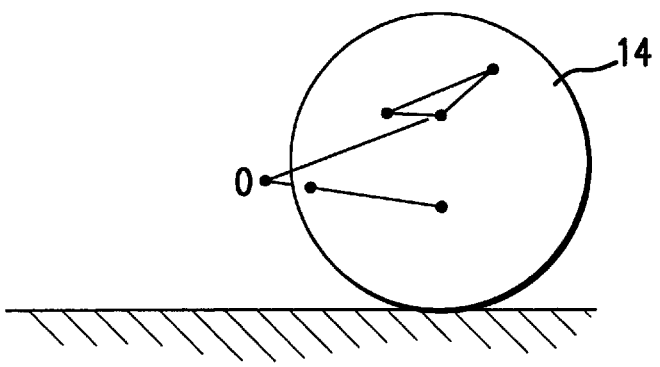

In view of the above, the inventors of the present invention designed three kinds of suspensions having different geometries, which include: a suspension as shown in FIG. 28B, in which the instantaneous center O is spaced from the center of the wheel by a generally known distance; a suspension as shown in FIG. 28A, in which the instantaneous center O is shifted toward the front side of the vehicle and located almost indefinitely far from the position shown in FIG. 28B; and a suspension as shown in FIG. 28C, in which the instantaneous center O is located nearer to the wheel 14, as compared with the position shown in FIG. 28B.

Figure 29:
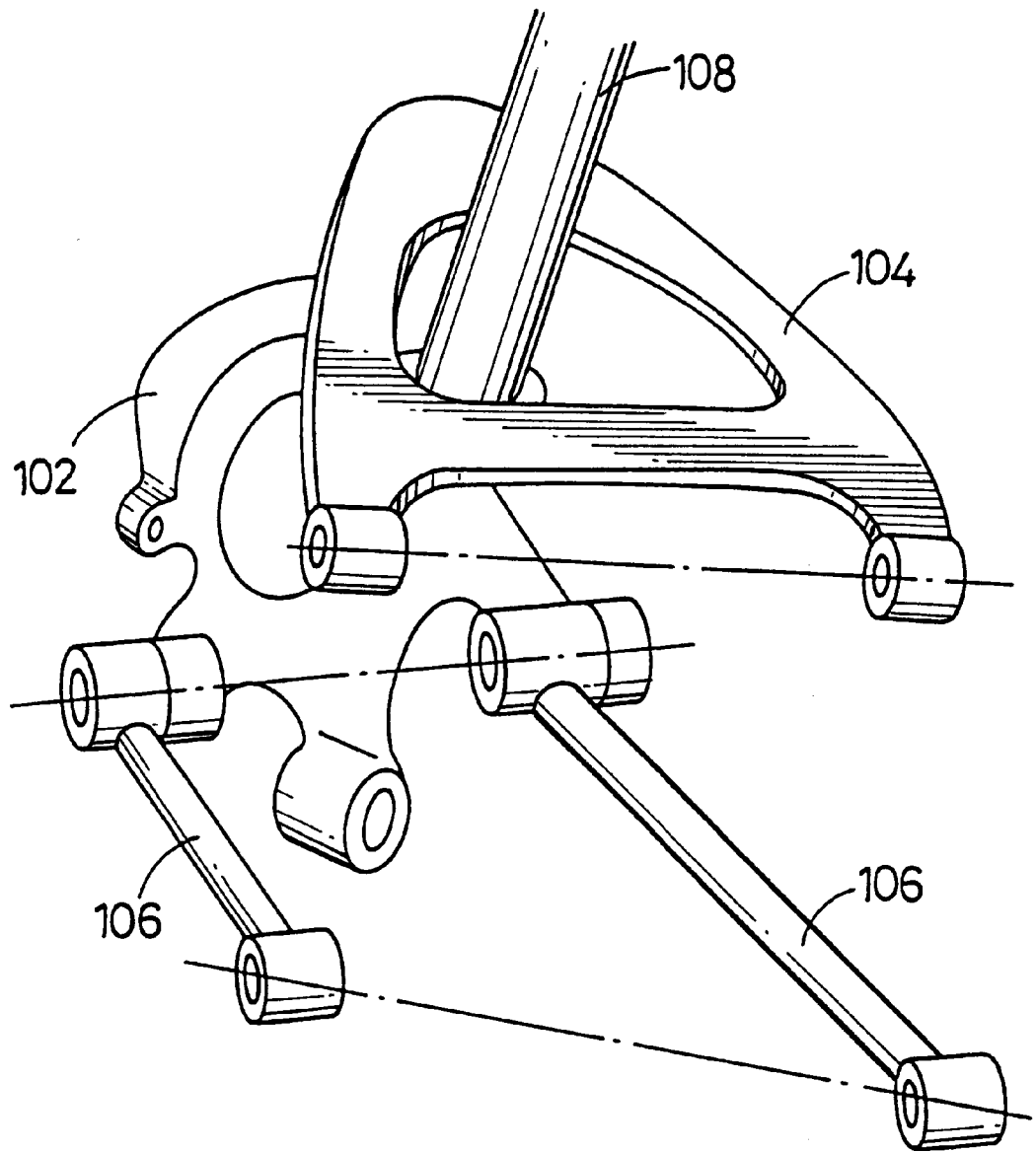
FIG. 29 is a perspective view showing an upper arm and lower arms of a suspension which provides a substantially straight locus of the center of the wheel.
Figure 30:
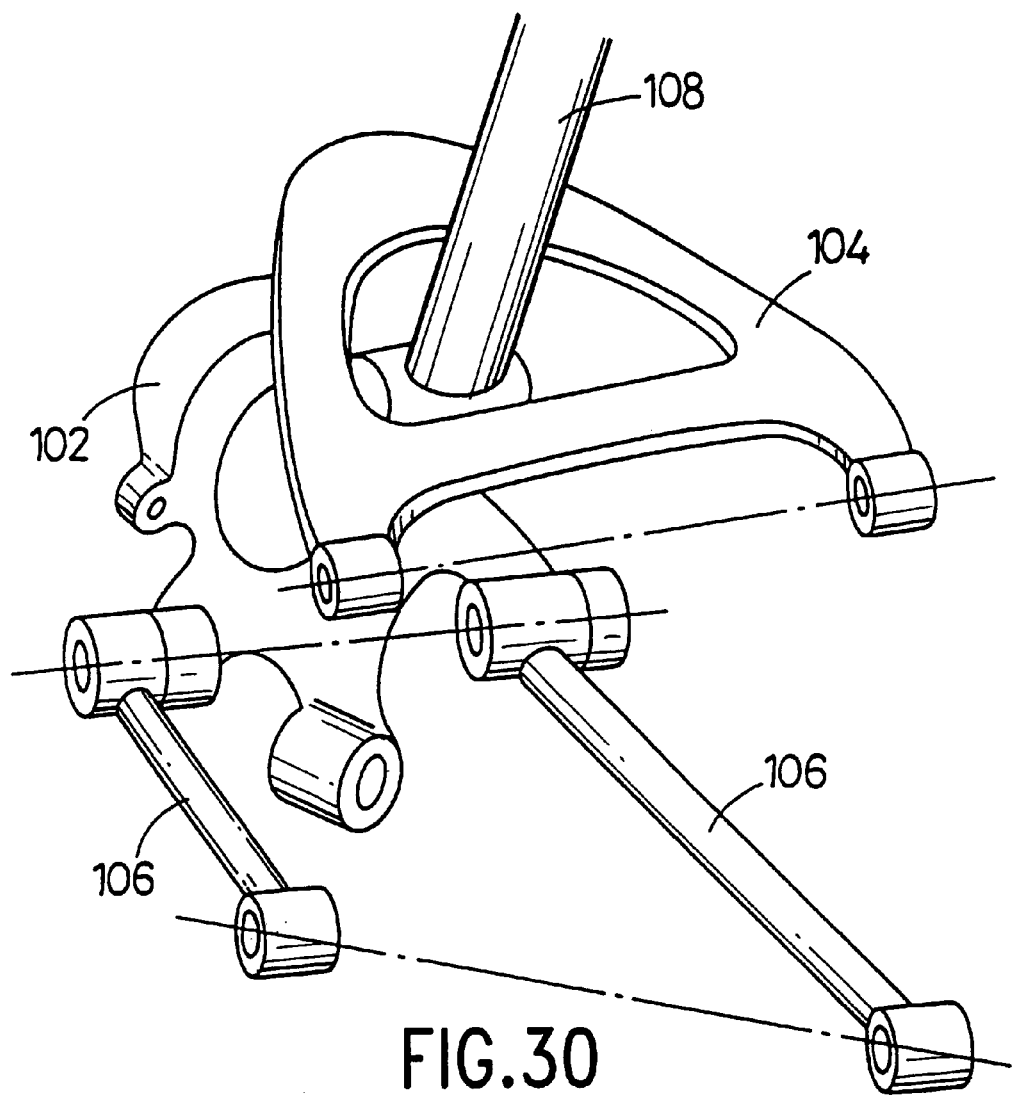
FIG. 30 is a perspective view showing an upper arm and lower arms of a suspension which provides a normally curved locus of the center of the wheel.
Figure 31:
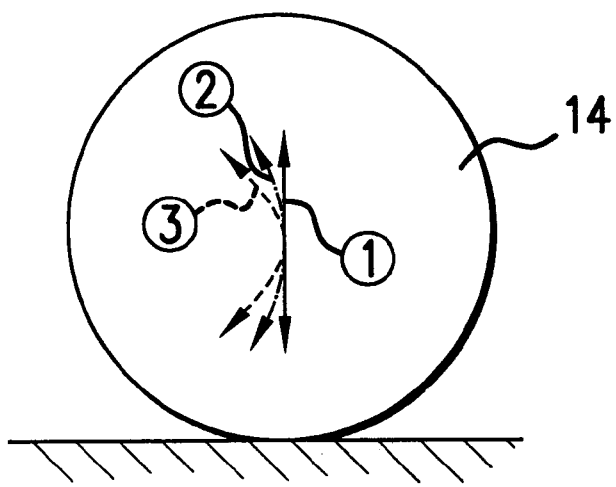
FIG. 31 is a view showing three kinds of locuses of the center of the wheel, which correspond to those of FIGS. 28A, 28B and 28C.

The geometry of the suspension as shown in FIG. 28A may be achieved by positioning the upper arm 104 and the lower arms 106 relative to each other, as shown in FIG. 29, for example. In this case, the center of the wheel has a motion locus as indicated in FIG. 31 by the solid line ①. The geometry of the suspension as shown in FIG. 28B may be achieved by positioning the upper arm 104 and the lower arms 106 relative to each other, as shown in FIG. 30, for example. In this case, the center of the wheel has a motion locus as indicated in FIG. 31 by the one-dot chain line ②. With the geometry of the suspension as shown in FIG. 28C, the center of the wheel has a motion locus as indicated in FIG. 31 by the broken line ③.

Figure 32:
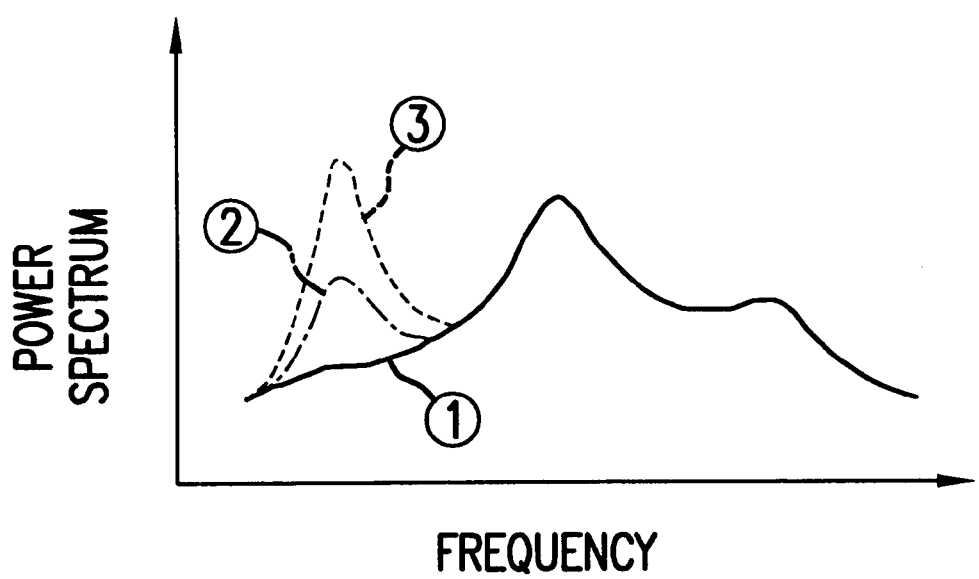
FIG. 32 is a graph illustrating a relationship between each locus of the center of the wheel as shown in FIG. 31, and a frequency characteristic of a wheel speed signal for each wheel.

With each of the above three suspensions installed on a motor vehicle, the present inventors obtained frequency characteristics of wheel speed signals generated by the respective vehicles. As is apparent from the results as shown in the graph of FIG. 32, the power spectrum (strength) of the frequency component of the wheel speed signal, which substantially corresponds to the unsprung resonance point, increases as the instantaneous center O is located closer to the center of the wheel and the motion locus has a reduced radius of curvature, with a result of increased wheel vibrations in the front-to-rear direction. Since the power spectrum at the unsprung resonance point influences the accuracy of estimating the moment of inertia J, as described above, the accuracy for estimating the moment of inertia J is improved by locating the instantaneous center O as close as possible to the center of the wheel.

On the other hand, the power spectrum (strength) of the frequency component of the wheel speed signal, which substantially corresponds to the unsprung resonance point, decreases with increases in the distance between the instantaneous center O and the wheel center, and the radius of curvature of the motion locus, which lead to reduced wheel vibrations in the front-to-rear direction. This results in an increased power spectrum of a frequency component located next to the above frequency component whose power spectrum is reduced. As described above, the accuracy of estimating the spring constant K is influenced by the power spectrum of the frequency component as represented by the peak having the second lowest frequency in the graph of FIG. 12. Thus, the accuracy of estimating the spring constant K and eventually the air pressure is improved by locating the instantaneous center O as far as possible from the wheel center.

Figure 33:
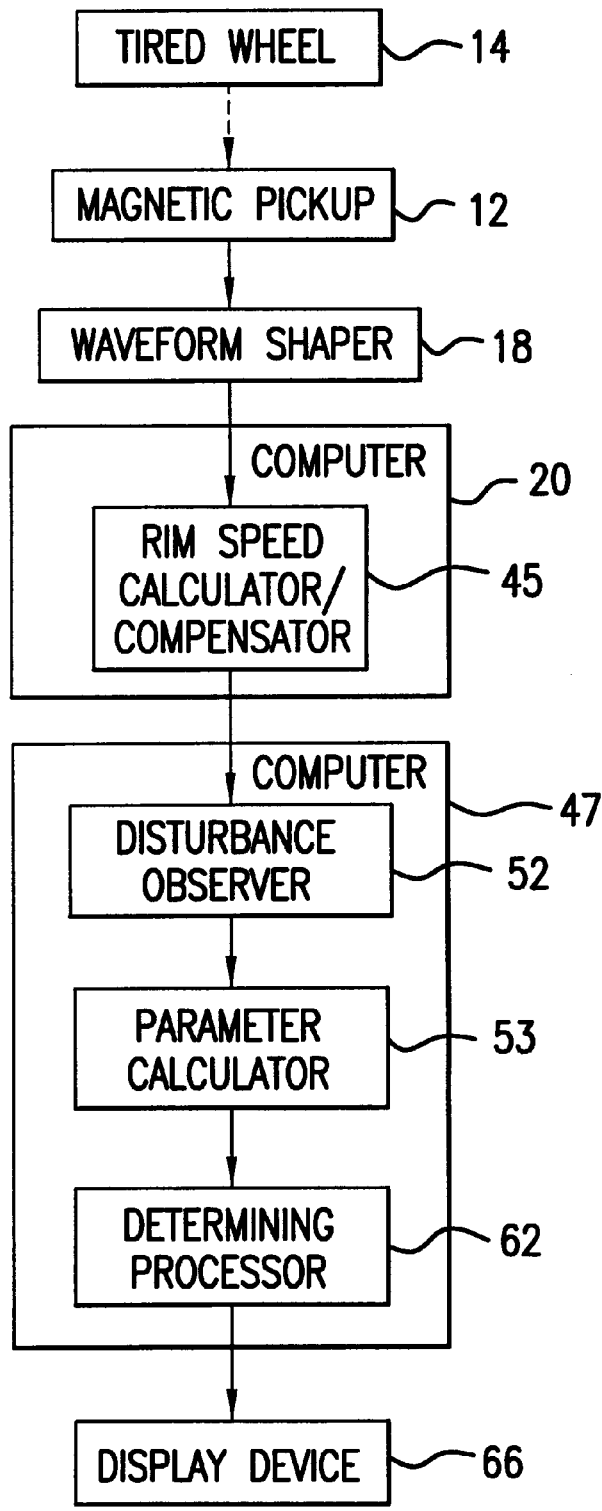
FIG. 33 is a block diagram illustrating the functional elements of a wheel information estimating apparatus constructed according to a fifth embodiment of the invention.

Then, the wheel information estimating apparatus of the present embodiment as illustrated in FIG. 33 was installed in both the vehicle having the suspension of FIG. 29 with the quasi-straight locus indicated by the solid line ① in FIG. 31, and the vehicle having the suspension of FIG. 30 with the curved locus indicated by the one-dot chain line ② in FIG. 31. In the vehicle having the suspension with the quasi-straight locus, the disturbance observer 52 operates to estimate an amount of change $\Delta K$ of the spring constant, as a wheel information or parameter of the tired wheel 14. In the vehicle having the suspension with the curved locus, on the other hand, the disturbance observer 52 operates to estimate an amount of change $\Delta J$ of the moment of inertia, as a wheel information or parameter of the wheel 14.

One example of the disturbance observer 52 adapted to estimate the amount of change $\Delta K$ of the spring constant has been described with respect to the first embodiment. There will be hereinafter described another example of the disturbance observer 52 adapted to estimate the amount of change $\Delta J$ of the moment of inertia of the tired wheel 14. The moment of inertia of the wheel 14 may be either a moment of inertia $J_R$ of the rim 28 or a moment of inertia $J_B$ of the belt 30.

There will be first described in detail the manner of estimating an amount of change $\Delta J_B$ of the moment of inertia $J_B$ of the belt 30, by the disturbance observer 52.

The motion of the tired wheel 14 when the moment of inertia $J_B$ has changed by $\Delta J_B$ is expressed by the following equation (16):

$$\begin{bmatrix} \omega'_R \\ \omega'_B \\ \theta'_{RB} \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ -T_d/J_B - (\Delta J_B/J_B)\omega'_B \\ 0 \end{bmatrix} \quad (16)$$

The disturbance to be estimated is the second element of the last term of the right member of the above equation (16). If the disturbance $w_2$ is defined by the following equation (17), an expanded system as represented by the above equation (11) is obtained from the following state equation (18):

$$w_2 = (-1/J_B)T_d - (\Delta J_B/J_B)\omega'_B \quad (17)$$

$$\begin{bmatrix} \omega'_R \\ \omega'_B \\ \theta'_{RB} \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ 1 \\ 0 \end{bmatrix} w_2 \quad (18)$$

Thus, the disturbance observer 52 operates to estimate the disturbance due to the change $\Delta J_B$ of the moment of inertia $J_B$ of the belt 30.

Figure 34:
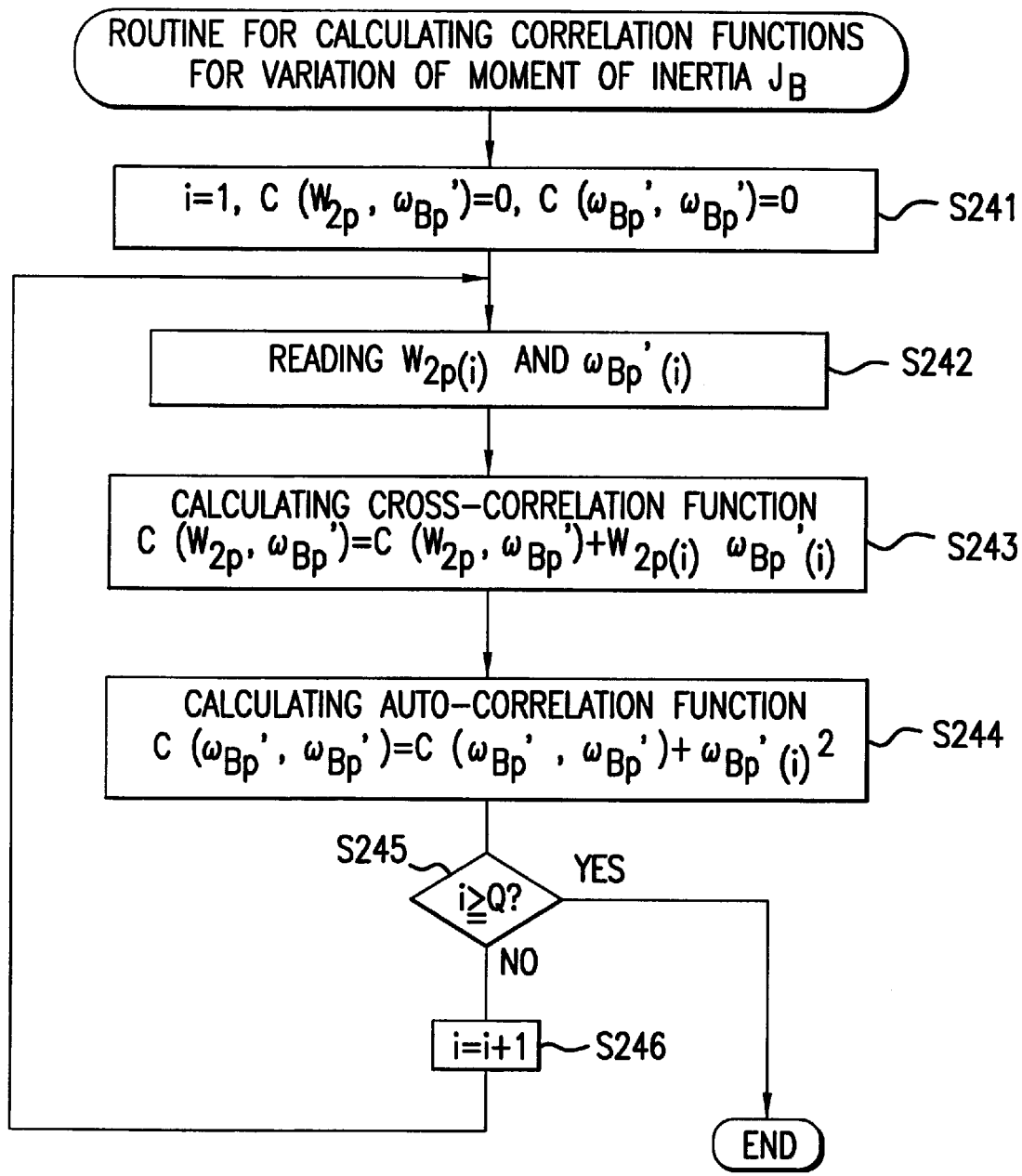
FIG. 34 is a flow chart illustrating a routine for calculating correlation functions for obtaining variation of a moment of inertia of a belt of a tired wheel, according to a control program stored in a read-only memory of the apparatus of FIG. 33.

The change $\Delta J_B$ of the moment of inertia of the belt 30 is then obtained by executing a routine for calculating correlation functions for variation of the moment of inertia $J_B$, as illustrated in the flow chart of FIG. 34.

In sum, a cross-correlation $C(w_{2p}, \omega_{Bp}')$ and an auto-correlation function $C(\omega_{Bp}', \omega_{Bp}')$ are obtained from the estimated value $w_{2p}$ of the disturbance $w_2$ expressed by the above equation (17) and the estimated angular acceleration $\omega_{Bp}'$ of the belt 30. Then, a normalized value $L_{JB}$ is calculated by the following equation (19) by the normalizer 58, and the calculated normalized value $L_{JB}$ is stored in an $L_{JB}$ memory of the RAM 50.

$$L_{JB} = C(w_{2p}, \omega_{Bp}')/C(\omega_{Bp}', \omega_{Bp}') \quad (19)$$

The value $L_{JB}$ obtained according to the above equation (19) may be expressed by the following equation (20), on the basis of the above equation (17):

$$L_{JB} = (-1/J_B)C_1 - \Delta J_B/J_B \quad (20)$$

The value $C_1$ means $C(T_{dp}, \omega_{Bp}')/C(\omega_{Bp}', \omega_{Bp}')$.

The amount of change $\Delta J_B$ corresponding to the thus calculated value $L_{JB}$ is obtained according to a relationship between the value $L_{JB}$ and the amount of change $\Delta J_B$, which is stored in the ROM 49.

Then, the manner of estimating the amount of change $\Delta J_R$ of the moment of inertia $J_R$ of the rim 28 by the disturbance observer 52 will be explained.

Normally, the moment of inertia $J_R$ of the rim 28 will not change. If the currently used metal wheel member 24 is replaced by a new one, the moment of inertia $J_R$ changes from one value to another. If the same moment of inertia $J_R$ were used even after the new wheel member 24 is used, there would be an error in the estimation of the overall disturbance acting on the tired wheel 14. In the present embodiment, therefore, the disturbance observer 52 is arranged to also estimate the disturbance due to a change of the moment of inertia $J_R$ of the rim 28.

The motion of the tired wheel 14 when the moment of inertia $J_R$ has changed by $\Delta J_R$ is expressed by the following equation (21):

$$\begin{bmatrix} \omega'_R \\ \omega'_B \\ \theta'_{RB} \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} -(\Delta J_R/J_R)\omega'_R \\ -T_d/J_B \\ 0 \end{bmatrix} \quad (21)$$

The disturbance to be estimated is the first element of the last term of the right member of the above equation (21). If the disturbance $w_1$ is defined by the following equation (22), an expanded system as represented by the following equation (24) is obtained from the following state equation (23):

$$w_1 = -(\Delta J_R/J_R)\omega_R' \quad (22)$$

$$\begin{bmatrix} \omega'_R \\ \omega'_B \\ \theta'_{RB} \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 1 \\ 0 \\ 0 \end{bmatrix} w_1 \quad (23)$$

$$\begin{bmatrix} \omega'_R \\ \omega'_B \\ \theta'_{RB} \\ w'_1 \end{bmatrix} = \begin{bmatrix} 0 & 0 & -K/J_R & 0 \\ 0 & 0 & K/J_B & 1 \\ 1 & -1 & 0 & 0 \\ 0 & 0 & 0 & 0 \end{bmatrix} \begin{bmatrix} \omega_R \\ \omega_B \\ \theta_{RB} \\ w_1 \end{bmatrix} + \begin{bmatrix} 1/J_R \\ 0 \\ 0 \\ 0 \end{bmatrix} T_1 \quad (24)$$

Thus, the disturbance observer 52 operates to estimate the disturbance due to the change $\Delta J_R$ of the moment of inertia $J_R$ of the rim 28.

Figure 35:
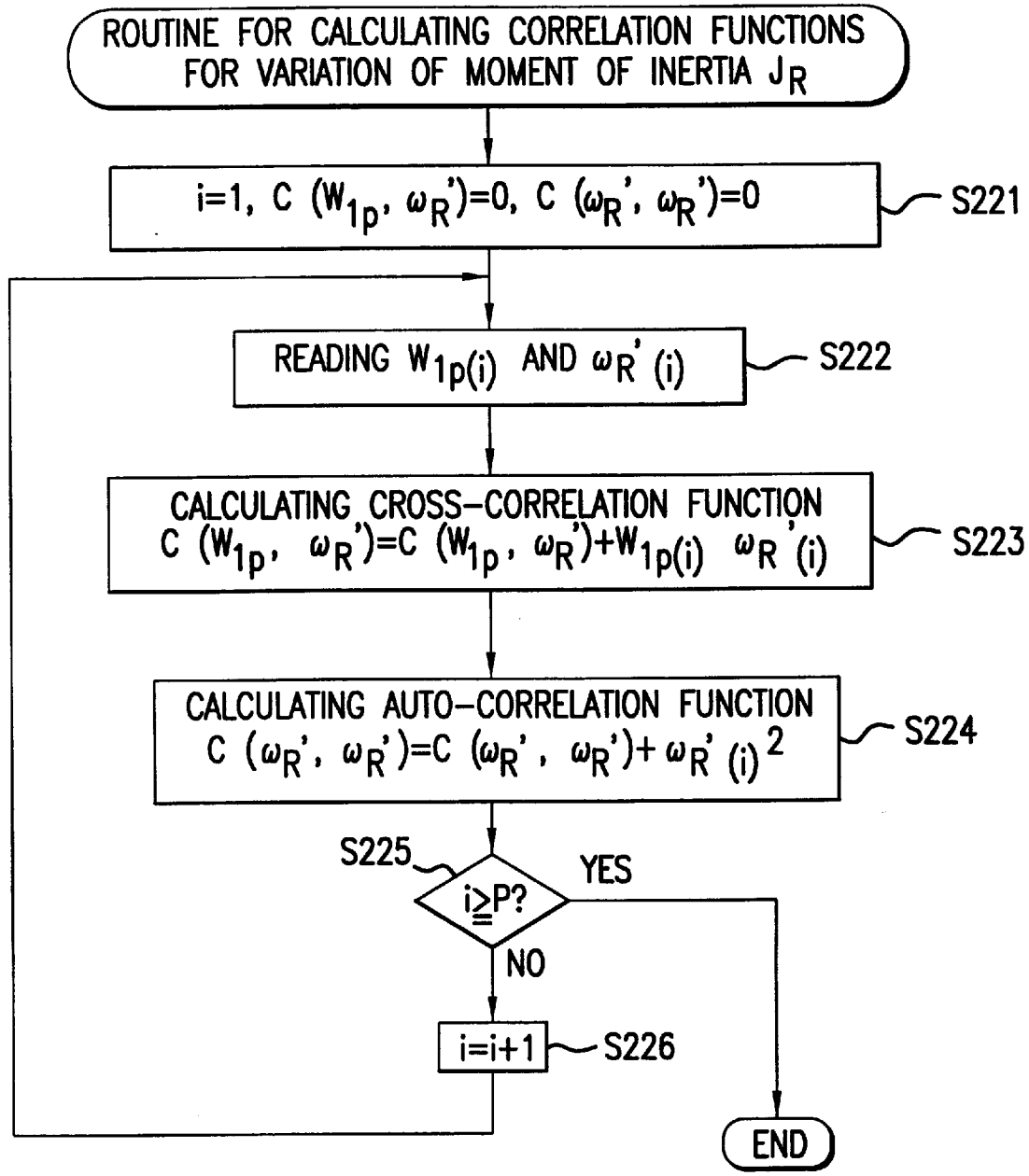
FIG. 35 is a flow chart illustrating a routine for calculating correlation functions for obtaining variation of a moment of inertia of a rim of the wheel, according to another control program also stored in the read-only memory.

The change $\Delta J_R$ of the moment of inertia of the rim 28 is then obtained by executing a routine for calculating correlation functions for variation of the moment of inertia $J_R$, as illustrated in the flow chart of FIG. 35.

In sum, a cross-correlation $C(w_{1p}, \omega_R')$ and an auto-correlation function $C(\omega_R', \omega_R')$ are obtained from the estimated value $w_{1p}$ of the disturbance $w_1$ expressed by the above equation (22) and the estimated angular acceleration $\omega_R'$ of the rim 28. Then, a normalized value $L_{JR}$ is calculated by the following equation (25) by the normalizer 58, and the calculated normalized value $L_{JR}$ is stored in an $L_{JR}$ memory of the RAM 50.

$$L_{JR} = C(w_{1p}, \omega_R')/C(\omega_R', \omega_R') \quad (25)$$

The value $L_{JR}$ obtained according to the above equation (25) may be expressed by the following equation (26), on the basis of the above equation (22):

$$L_{JR} = -\Delta J_R/J_R \quad (26)$$

The amount of change $\Delta J_R$ corresponding to the thus calculated value $L_{JR}$ is obtained according to a relationship between the value $L_{JR}$ and the amount of change $\Delta J_R$, which is stored in the ROM 49.

When the disturbance observer 52 estimates the moment of inertia $J_B$ of the belt 30, the determining processor 62 of the computer 47 determines whether the estimated amount of change $\Delta J_B$ is larger than a predetermined positive reference value $\Delta J_{B0}$. If an affirmative decision (YES) is obtained, a suitable indication is provided on the display device 66 to inform the vehicle operator that a foreign matter is inserted or stuck in the tire 26, or a chain is attached to the tire 26. The determining processor 62 also determines whether the estimated amount of change $\Delta J_B$ is smaller than a predetermined negative reference value $\Delta J_{B1}$. If an affirmative decision (YES) is obtained, a suitable indication is provided on the display device 66 to inform the vehicle operator that the amount of wear of the tire 26 exceeds a tolerable upper limit.

When the disturbance observer 52 estimates the moment of inertia $J_R$ of the rim 28, on the other hand, the determining processor 62 of the computer 47 determines whether the absolute value of the estimated amount of change $\Delta J_R$ is larger than a predetermined positive reference value $\Delta J_{R0}$. If an affirmative decision (YES) is obtained, a suitable indication is provided on the display device 66 to inform the vehicle operator that the wheel metal member 24 was replaced by a wrong or inappropriate one.

Thus, when the disturbance observer 52 is adapted to estimate the spring constant K and the air pressure P of the tired wheel 14, the suspension is designed by suspension adjusting means, such that the upper arm 104 and the lower arms 106 are disposed parallel to each other as seen in the transverse direction of the vehicle, whereby the instantaneous center O is located further away from the wheel 14 than the nominal position of the center O.

When the disturbance observer 52 is adapted to estimate the moment of inertia J of the tired wheel 14, on the other hand, the suspension is designed by suspension adjusting means, such that the upper arm 104 and the lower arms 106 form an acute angle as seen in the transverse direction of the vehicle, whereby the instantaneous center O is located nearer to the wheel 14 than the nominal position of the center O.

Figure 36:
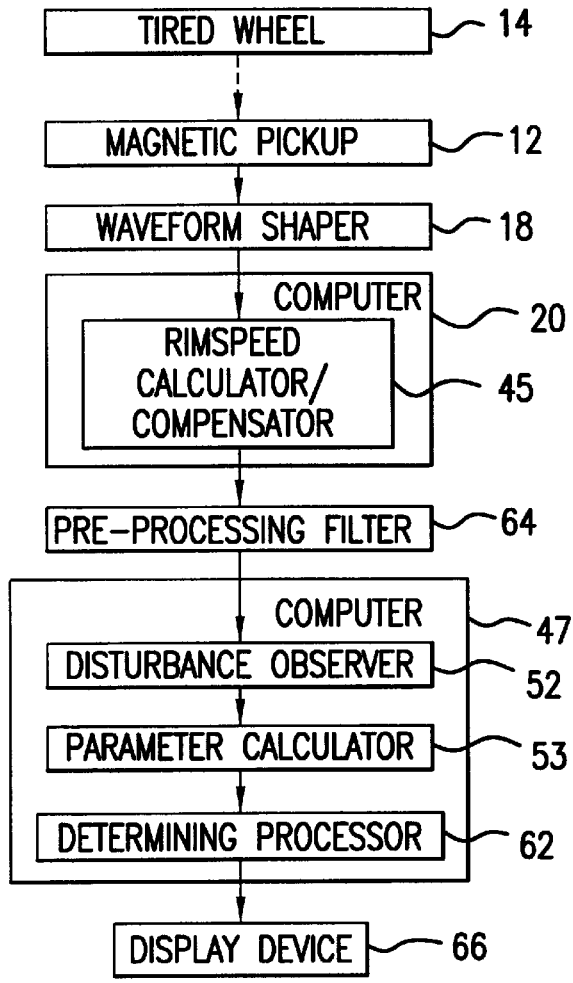
FIG. 36 is a block diagram illustrating the functional elements of a wheel information estimating apparatus constructed according to a sixth embodiment of the invention.

Referring next to FIG. 36, there will be described a sixth embodiment of the present invention, which includes the magnetic pickup 12, waveform shaper 18, computer 20, vehicle speed sensor 70 (which is not shown in FIG. 36), pre-processing filter 64, computer 47 and display device 66, as in the embodiment shown in FIG. 2. However, the respective functions of the disturbance observer 52, parameter calculator 53 and determining processor 62 of the computer 47 shown in FIG. 35 are different from those of the embodiment of FIG. 2, as described below.

Figure 37:
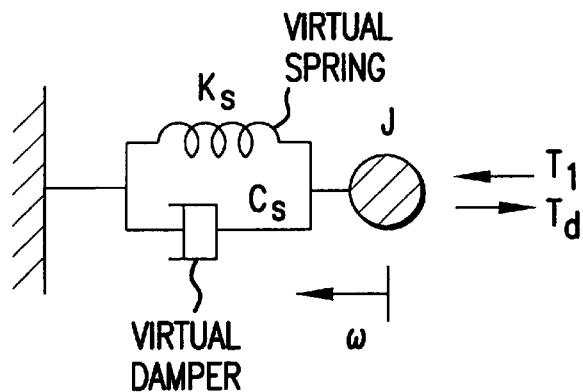
FIG. 37 is a view showing a tire-suspension model used by a disturbance observer of the apparatus of FIG. 36.

The present embodiment is adapted for a tire model which is a simple body of rotation having the moment of inertia J, as shown in FIG. 37. This tire model represents a tire-suspension model as well as a suspension model. In FIG. 37, it is to be noted that $T_d$: disturbance torque received from the road surface $T_1$: driving or braking torque acting on the wheel 14

$\omega$: angular velocity of the wheel 14 (which is equal to the angular velocity of the rim 28)

$K_s$: equivalent spring constant of the suspension $D_s$: equivalent damping coefficient of the suspension It is generally known that a locus indicative of the motion of the tired wheel 14 connected to the vehicle body through the suspension, as seen in the transverse direction of the vehicle, includes a component which extends in the front-to-rear direction or longitudinal direction of the vehicle, as well as a vertical component. Accordingly, the tire-suspension model shown in FIG. 37 is designed as a combination of vibrations of the wheel 14 due to the suspension, and the rotary motion of the wheel 14 itself.

The equation of motion of the above model is as follows:

$$J\omega' = -K_s \int \omega dt - D_s \omega + T_1 - T_d \quad (27)$$

where, $\omega'$: angular acceleration of the wheel 14.

If only vibrations among various motions of the wheel 14 and the suspension are taken into consideration, the driving or braking torque $T_1$ may be considered as a fixed value. Thus, the above equation (27) may be converted into the following equation (28):

$$J\omega' = -K_s \int \omega dt - D_s \omega - T_d \tag{28}$$

The following equation (29) is then obtained by differentiating both the right and left members of the equation (28) by time "t":

$$J\omega'' = -K_s \omega - D_s \omega' - T_d' \tag{29}$$

where, $\omega''$: differentiated value of angular acceleration $\omega'$

Td': differentiated value of disturbance torque.

The above equation (29) is converted into the following state equation (30):

$$\begin{bmatrix} \omega' \\ \omega'' \end{bmatrix} = \begin{bmatrix} 0 & 1 \\ -K_s/J & -D_s/J \end{bmatrix} \begin{bmatrix} \omega \\ \omega' \end{bmatrix} + \begin{bmatrix} 0 \\ -T_d'/J \end{bmatrix} \tag{30}$$

The spring constant $K_s$ depends on the rigidity of the suspension, and is thus considered not to substantially change. It is therefore assumed that the moment of inertia J changes due to a change of the air pressure P, and the damping coefficient $D_s$ changes depending upon the rate of change of the angular velocity $\omega$, which changes due to a change of the moment of inertia J.

The above equation (30) is converted into the following equation (31) when the moment of inertia J and the damping coefficient $D_s$ have changed by $\Delta J$ and $\Delta Ds$, respectively:

$$\begin{bmatrix} \omega' \\ \omega'' \end{bmatrix} = \begin{bmatrix} 0 & 1 \\ -K_s/J & -D_s/J \end{bmatrix} \begin{bmatrix} \omega \\ \omega' \end{bmatrix} + \begin{bmatrix} 0 \\ w \end{bmatrix} \tag{31}$$

where, $$w = \frac{\Delta J K_s}{J(J + \Delta J)} \omega + \frac{\Delta J D_s - J \Delta D_s}{J(J + \Delta J)} \omega' - \frac{1}{J + \Delta J} T_d'$$

That is, changes of the moment of inertia J by $\Delta J$ and the damping coefficient $D_s$ by $\Delta D_s$ are equivalent to the disturbance w applied to the tired wheel 14 in its normal state, which disturbance w is represented by the last term of the equation (31). The disturbance observer 52 then estimates the disturbance w and the angular acceleration $\omega'$, on the basis of the angular velocity $\omega$ as an output signal of the pre-processing filter 64, which consists only of a varying component of the angular velocity $\omega$ as an input signal of the pre-processing filter 64. A delay of the disturbance observer 52 in estimating the above parameters can be reduced to infinitesimal. If the delay is ignored at present, an estimated value of the disturbance w is represented by the following equation (32):

$$w_p = \frac{\Delta J K_s}{J(J + \Delta J)} \omega + \frac{\Delta J D_s - J \Delta D_s}{J(J + \Delta J)} \omega' - \frac{1}{J + \Delta J} T_d' \tag{32}$$

The parameter calculator 53 calculates the amount of change $\Delta J$ of the moment of inertia J, on the basis of the above equation (32), using the estimated value of the disturbance w, estimated value of the angular acceleration $\omega'$, and detected value of the angular velocity $\omega$, in the manner as described below.

The above equation (32) can be converted into the following equation (33):

$$w_p = \begin{bmatrix} \frac{\Delta J K_s}{J(J + \Delta J)} & \frac{\Delta J K_s - J \Delta D s}{J(J + \Delta J)} \end{bmatrix} \begin{bmatrix} \omega \\ \omega' \end{bmatrix} - \frac{1}{J + \Delta J} T_d' \tag{33}$$

$$= [\Theta_1 \ \Theta_2] \begin{bmatrix} \omega \\ \omega' \end{bmatrix} - \frac{1}{J + \Delta J} T_d'$$

$$= \Theta^T \zeta - \frac{1}{J + \Delta J} T_d'$$

where, $$\Theta = \begin{bmatrix} \Theta_1 \\ \Theta_2 \end{bmatrix} = \begin{bmatrix} \frac{\Delta J K_s}{J(J + \Delta J)} \\ \frac{\Delta J K_s - J \Delta D_s}{J(J + \Delta J)} \end{bmatrix}$$

$$\zeta = \begin{bmatrix} w \\ w' \end{bmatrix}$$

On the basis of the above equation (33), a column vector $\Theta$ as an unknown parameter is estimated by a method of least squares. The column vector $\Theta$ is represented by the following equation (34), using the above definition of $\Theta$:

$$\Theta_p = \begin{bmatrix} \Theta_{1p} \\ \Theta_{2p} \end{bmatrix} = \begin{bmatrix} \frac{\Delta J K_s}{J(J + \Delta J)} \\ \frac{\Delta J K_s - J \Delta D_s}{J(J + \Delta J)} \end{bmatrix} \tag{34}$$

Thus, the amount of change $\Delta J$ of the moment of inertia J is represented by the following equation (35):

$$\Delta J = \frac{J^2 \Theta_{1p}}{K_s - J \Theta_{1p}} \tag{35}$$

The rate of change of the moment of inertia J is represented by the following equation (36):

$$\frac{\Delta J}{J} = \frac{J \Theta_{1p}}{K_s - J \Theta_{1p}} \tag{36}$$

The determining processor 62 determines whether anything is wrong with the tired wheel 14, on the basis of the amount of change $\Delta J$ of the moment of inertia received from the parameter calculator 53. When the determining processor 62 determines that the wheel 14 is not in the normal state, the display device 66 is activated to inform the vehicle operator of this fact.

Figure 38:
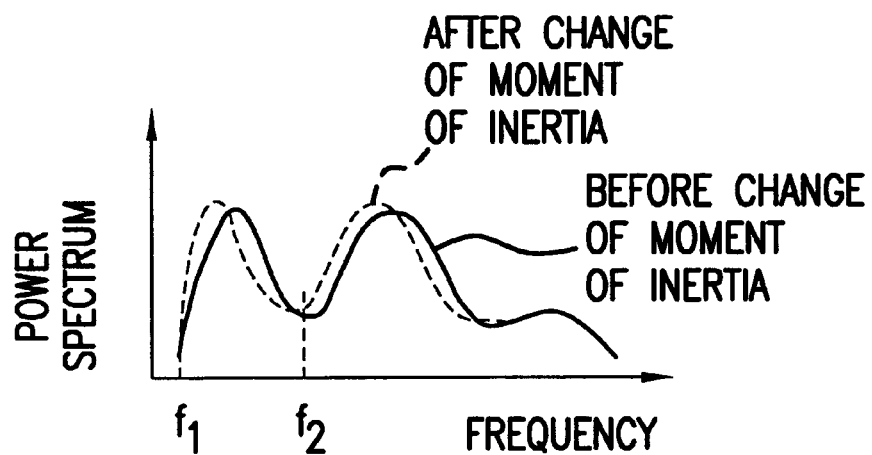
FIG. 38 is a graph showing frequency characteristics of wheel speed signals received by a pre-processing filter of FIG. 36 before and after a change in the moment of inertia, respectively.
Figure 39:
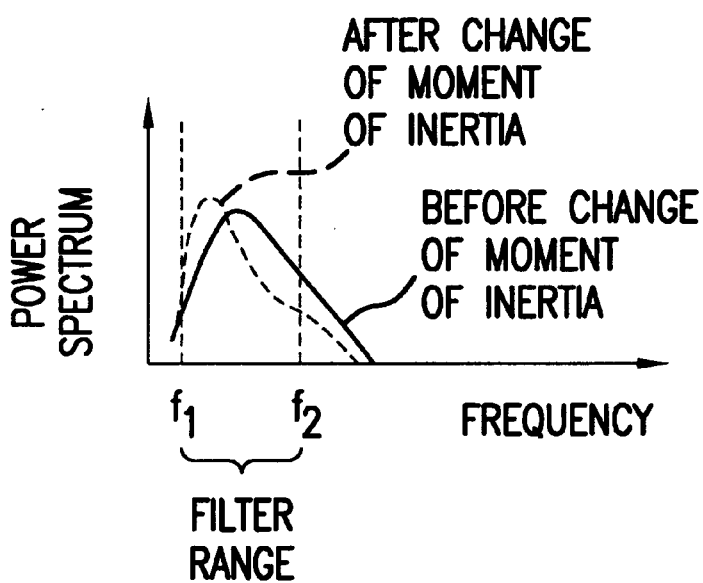
FIG. 39 is a graph illustrating frequency characteristics of the wheel speed signals generated as outputs from the pre-processing filter.

The wheel speed signal generated by the rim speed calculator/compensator 45 generally has a frequency characteristic as shown in the graph of FIG. 38. The disturbance observer 52 estimates the amount of change $\Delta J$ of the moment of inertia J with high accuracy, with respect to an optimum frequency range of the signal which is defined by $f_1$ and $f_2$ in the graph of FIG. 38, for example. In the present embodiment, the pre-processing filter 64 is adapted to pick up only a component of the wheel speed signal which is in the predetermined optimum frequency range, so that the wheel speed signal received by the disturbance observer 52 has a frequency characteristic as represented by the graph of FIG. 39, for example. Accordingly, the disturbance observer 52 of the present embodiment can adopt such a simple model for the tired wheel 14 as illustrated in FIG. 37, assuring sufficiently high estimating accuracy.

Figure 41:
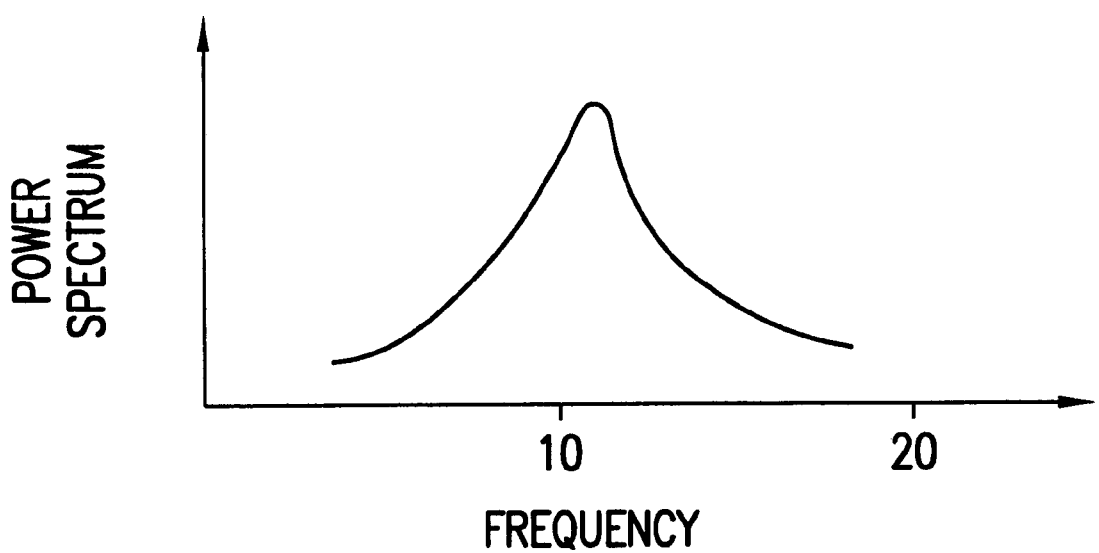
FIG. 41 is a graph illustrating a frequency characteristic of a wheel speed signal obtained when a tired wheel is not in a good contact with a road surface.
Figure 42:
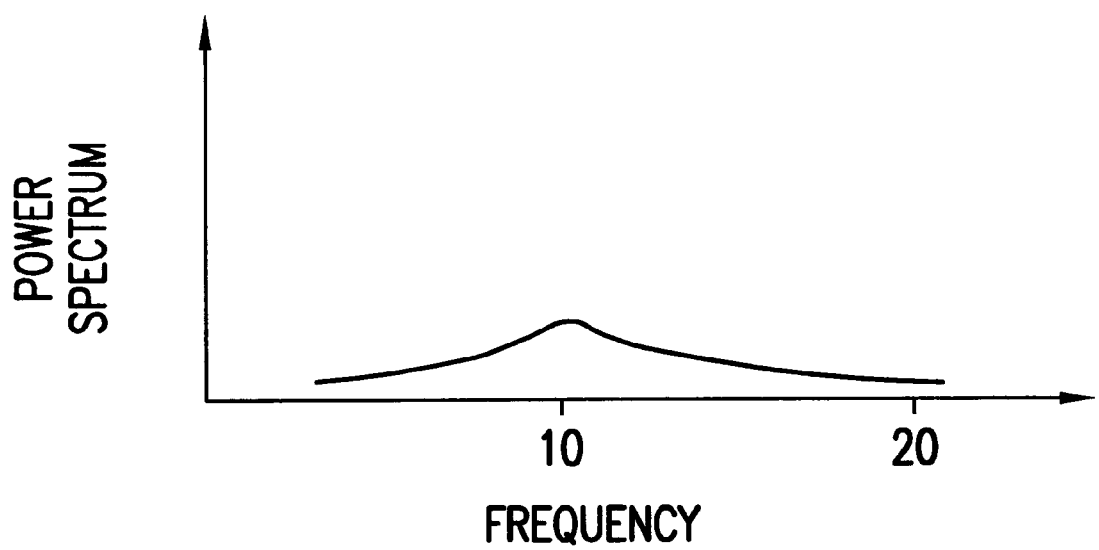
FIG. 42 is a graph illustrating a frequency characteristic of a wheel speed signal obtained when the tired wheel is in a good contact with the road surface.
Figure 43:
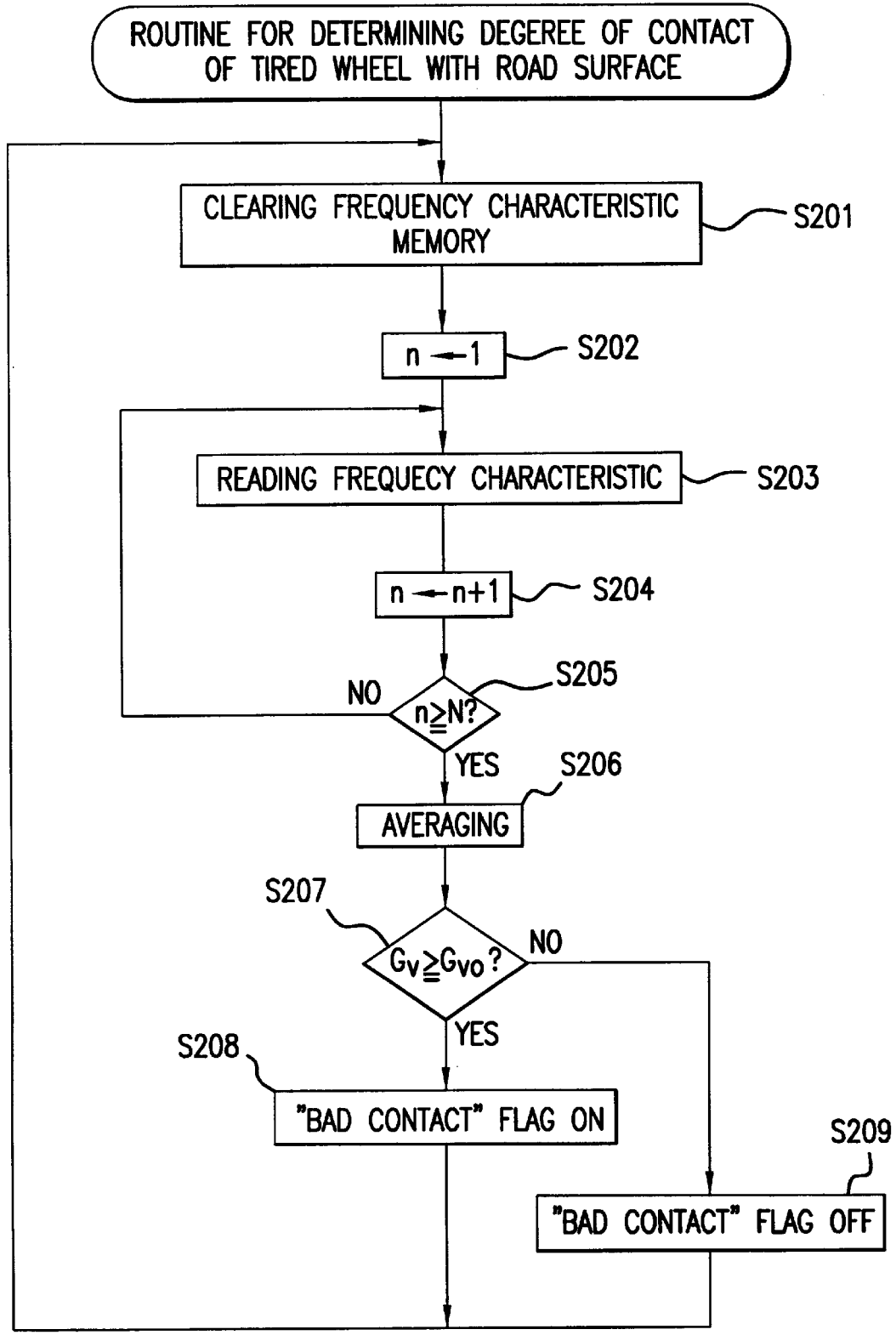
FIG. 43 is a flow chart illustrating a routine for determining a degree of contact of the tired wheel with the road surface, according to a control program stored in a read-only memory of a computer used by the apparatus of FIG. 40.

Referring next to FIGS. 41–43, there will be described a seventh embodiment of the present invention.

It is recognized that vibrations of the tired wheel 14 have a strong relation with a degree of contact between the wheel 14 and the road surface, in other words, a road holding characteristic of the wheel 14. That is, the wheel 14 is less likely to vibrate when it is in good contact with the road surface. It is also recognized that vibrations of the wheel 14 generally include those applied in the front-to-rear direction or running direction of the vehicle, as well as those applied in the vertical direction, as described above. Therefore, the wheel speed signal indicative of the rotating speed of the wheel 14 is influenced by the vibrations of the wheel 14. More specifically, the frequency component of the wheel speed signal which is in a range of the unsprung resonance frequency has a power spectrum (strength) which increases with an increase in the unsprung vibrations. The graph of FIG. 41 represents a frequency characteristic of the wheel speed signal obtained while the vehicle is running with the wheels 14 being in a bad contact with the road surface. The graph of FIG. 42 represents a frequency characteristic of the wheel speed signal obtained while the vehicle is running with the wheels 14 being in a good contact with the road surface.

Figure 40:
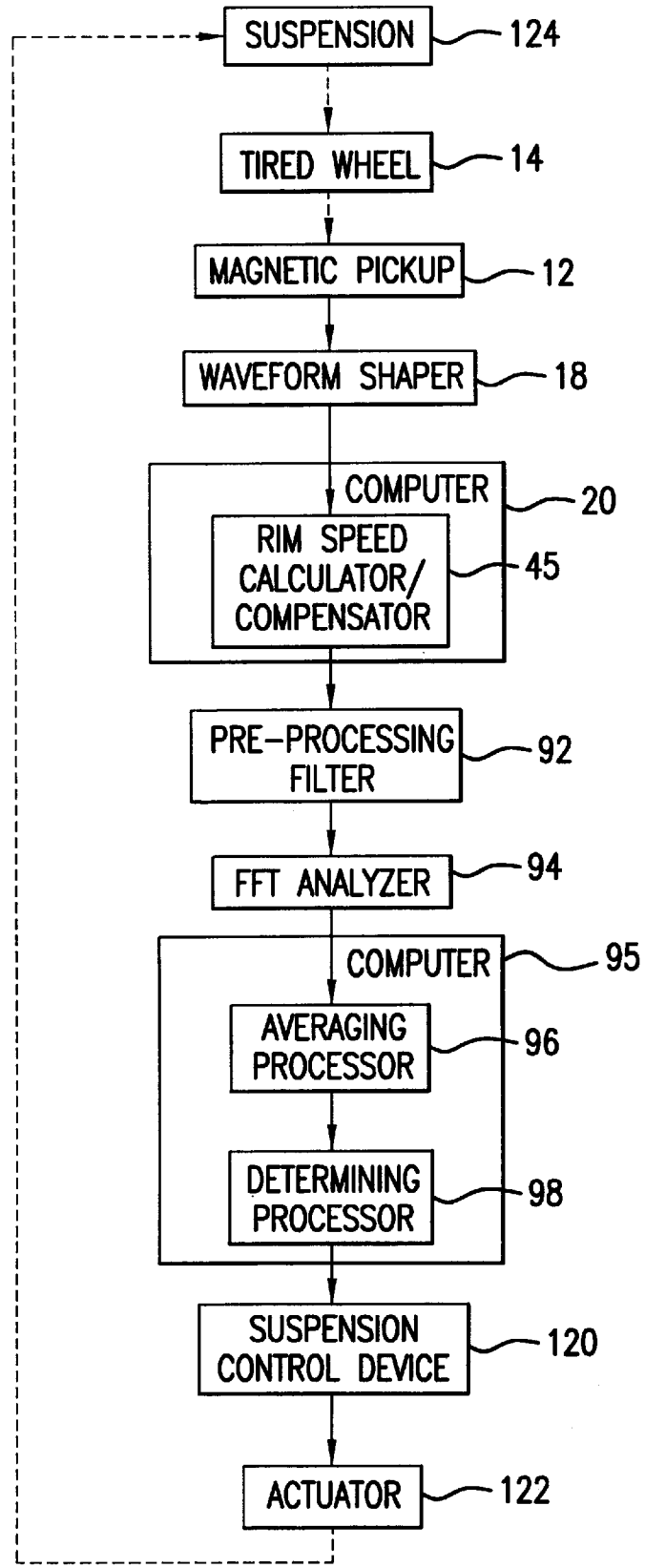
FIG. 40 is a block diagram illustrating the functional elements of a wheel information estimating apparatus constructed according to a seventh embodiment of the invention.

In view of the above recognitions, the wheel information estimating apparatus of the present embodiment is adapted to estimate the degree of contact of the wheel 14 with the road surface, on the basis of the wheel speed signal v. As shown in FIG. 40, the estimating apparatus includes the magnetic pickup 12, waveform shaper 18, computer 20, vehicle speed sensor 70 (not shown), and pre-processing filter 92, as in the embodiment of FIG. 17. The present apparatus further includes a FFT analyzer 94, and a computer 95 which replaces the computer 47 of the embodiment of FIG. 17. The computer 95 stores in the ROM 49 various control programs including a routine for determining a degree of contact between the wheel 14 and the road surface, or a road holding characteristic of the wheel 14, as illustrated in the flow chart of FIG. 43, and thus constitutes an averaging processor 96 and a determining processor 98 as shown in FIG. 40. A suspension control device 120 is connected to the computer 95, and receives therefrom the estimated degree of contact between the wheel 14 and the road surface. The suspension control device 120 utilizes the estimated degree of contact, to control a particular characteristic of a suspension 124 of the vehicle, by means of an actuator 122. Where the device 120 is adapted to control the damping characteristic of the shock absorber as the particular characteristic of the suspension 124, for example, the actuator 122 may take the form of a motor for changing the flow resistance in the shock absorber. There will be hereinafter described each of significant elements of the wheel information estimating apparatus of FIG. 40.

The pre-processing filter 92 functions to pick up only a frequency component of the wheel speed signal received from the rim speed calculator/compensator 45, which component is in a range of the unsprung resonance frequency. The thus selected frequency component is transmitted to the FFT analyzer 94 which calculates the frequency characteristic of the wheel speed signal received from the pre-processing filter 92. The thus calculated frequency characteristic is transmitted to the computer 95.

The averaging processor 96 averages a plurality of results of frequency analysis, which have been sequentially supplied from the FFT analyzer 94, so as to improve the accuracy of analyzing the frequency characteristic. The determining processor 98 utilizes the result of the frequency analysis finally obtained by the averaging processor 96, and thus determines, on the basis of the result, the maximum value $G_v$ of gain (which is a unit of the strength of the signal) in the frequency range of the unsprung resonance frequency. When the maximum gain $G_v$ is equal to or larger than a predetermined reference value $G_{v0}$, the determining processor 98 determines that the tired wheel 14 is in bad contact with the road surface. When the maximum gain $G_v$ is smaller than the reference value $G_{v0}$, the processor 98 determines that the wheel 14 is in good contact with the road surface. The suspension control device 120 keeps watching the determination of the determining processor 98, and makes the damping characteristic of the suspension 124 harder, through the actuator 122, when the wheel 14 is determined to be in a bad contact with the road surface. This assures improved stability of the vehicle, which might be otherwise deteriorated due to such a bad contact of the wheel 14 with the road surface.

The averaging processor 96 and determining processor 98 operate to execute the routine of determining a degree of contact between the wheel 14 and the road surface, as illustrated in the flow chart of FIG. 43 and described below.

The routine is started with step S201 to clear the content of a frequency characteristic memory of the RAM 50. The frequency characteristic memory stores the result of analysis of the frequency characteristic of the wheel speed signal supplied from the FFT analyzer 94. Step S202 is then implemented to set the integer "n" to 1. The integer "n" represents the number of frequency characteristics which are currently stored in the frequency characteristic memory. The control flow then goes to step S203 to read a frequency characteristic of the wheel speed v supplied in this cycle from the FFT analyzer 94, and stores it in the frequency characteristic memory. The integer "n" is incremented in the next step S204, and step S205 is then implemented to determine whether the integer "n" is equal to or larger than a predetermined reference value "N", i.e., whether all the frequency characteristics needed to effect the subsequent averaging processing in the step S206 have been obtained. If the integer "n" is smaller than the reference value "N", a negative decision (NO) is obtained in step S205, and the control flow goes back to step S202.

When the integer "n" becomes equal to or larger than the reference value "N" after repeatedly executing steps S202–S204, an affirmative decision (YES) is obtained in step S205, and the averaging processing is effected in step S206. Namely, the maximum gain Gv of the signal in the unsprung frequency range is calculated on the basis of the predetermined number of frequency characteristics which have been stored in the frequency characteristic memory. Then, step S207 is implemented to determine whether the calculated gain Gv is equal to or larger than the reference value $G_{v0}$. If an affirmative decision (YES) is obtained in step S207, step S208 is implemented to place a "BAD CONTACT" flag indicative of a bad contact of the wheel 14 with the road surface in its "ON" state, thereby to indicate that the wheel 14 is in a bad contact with the road surface. If the gain $G_v$ is smaller than the reference value $G_{v0}$, a negative decision (NO) is obtained in step S207, and step S209 is implemented to set the "BAD CONTACT" flag in its "OFF" state, thereby to indicate that the wheel 14 is in a good contact with the road surface. In either case, the control flow goes back to step S201.

While the FFT analyzer 94 is provided separately from the computer 95 in the present embodiment, the analyzer 94 may be incorporated in the computer 95.

In the present embodiment, the FFT analyzer 94 does not receive the wheel speed v directly from the rim speed calculator/compensator 45. Rather, the pre-processing filter 92 provided between the rim speed calculator/compensator 45 and the FFT analyzer 94 is adapted to pick up or select only the necessary frequency component of the wheel speed v, namely, the component in the unsprung resonance frequency range, which is to be transmitted to the FFT analyzer 94. In this arrangement, the FFT analyzer 94 bears a reduced burden, and assures improved analyzing accuracy.

It will be understood from the above description that the FFT analyzer 94 and the computer 95 constitute the estimating means for estimating a degree of contact of the tired vehicle wheel with a road surface, and that the pre-processing filter 64 constitutes frequency characteristic controlling for providing an optimum frequency characteristic of the wheel speed signal as the wheel motion state, which is to be supplied to the estimating means.

Figure 44:
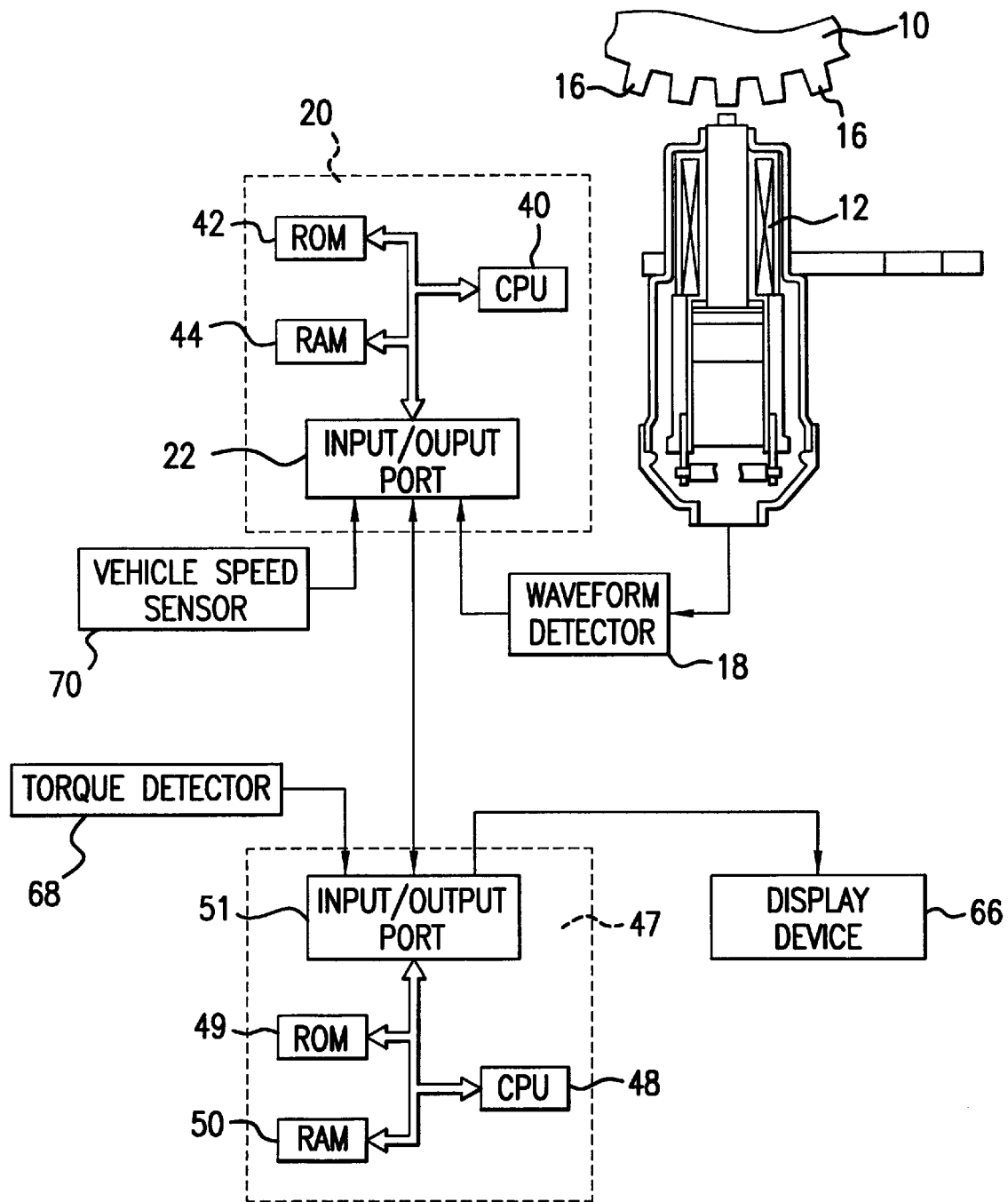
FIG. 44 is a schematic block diagram illustrating an eighth embodiment of a wheel information estimating apparatus of the present invention.
Figure 45:
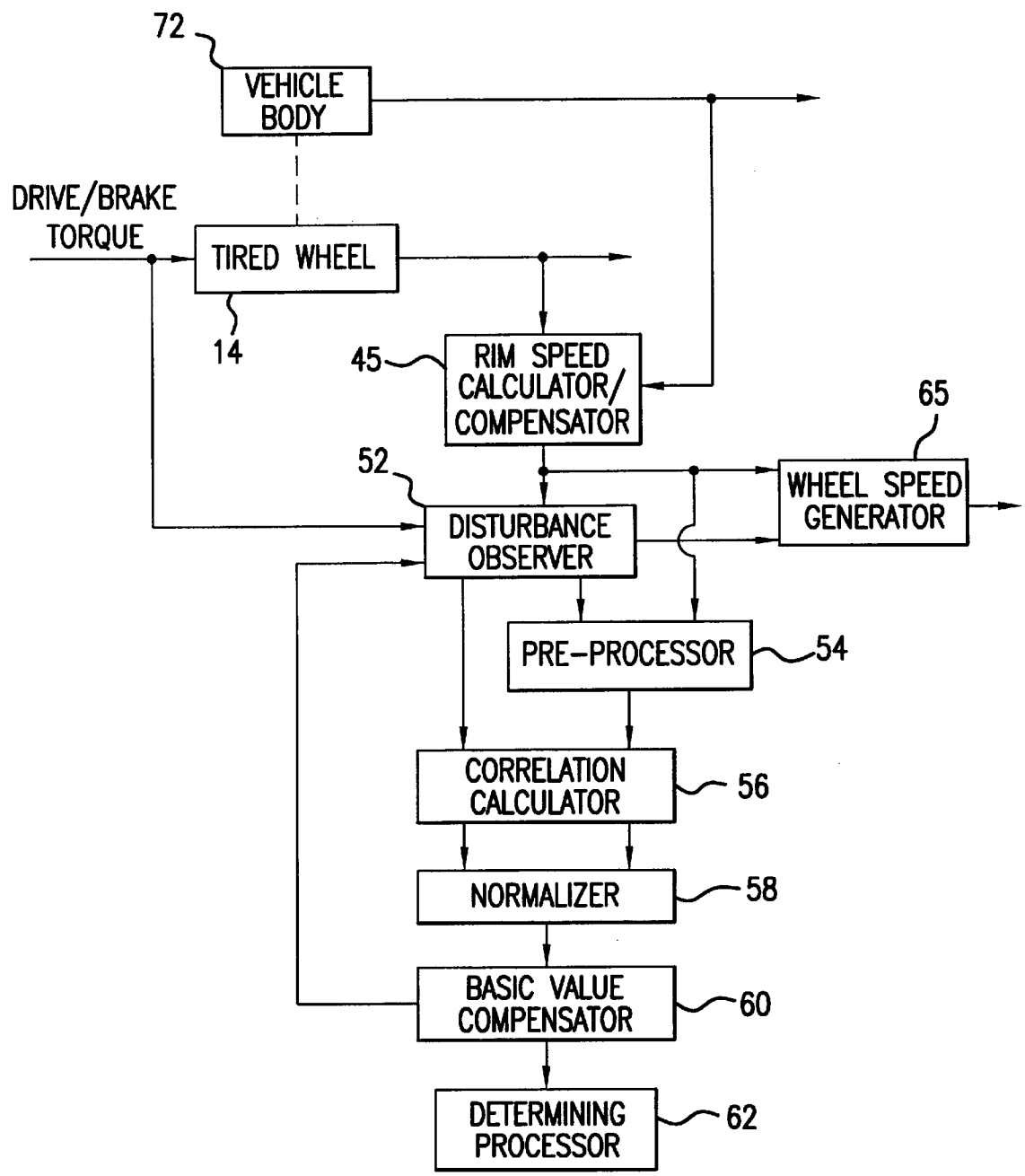
FIG. 45 is a block diagram illustrating the functional elements of the wheel information estimating apparatus of FIG. 44.
Figure 46:
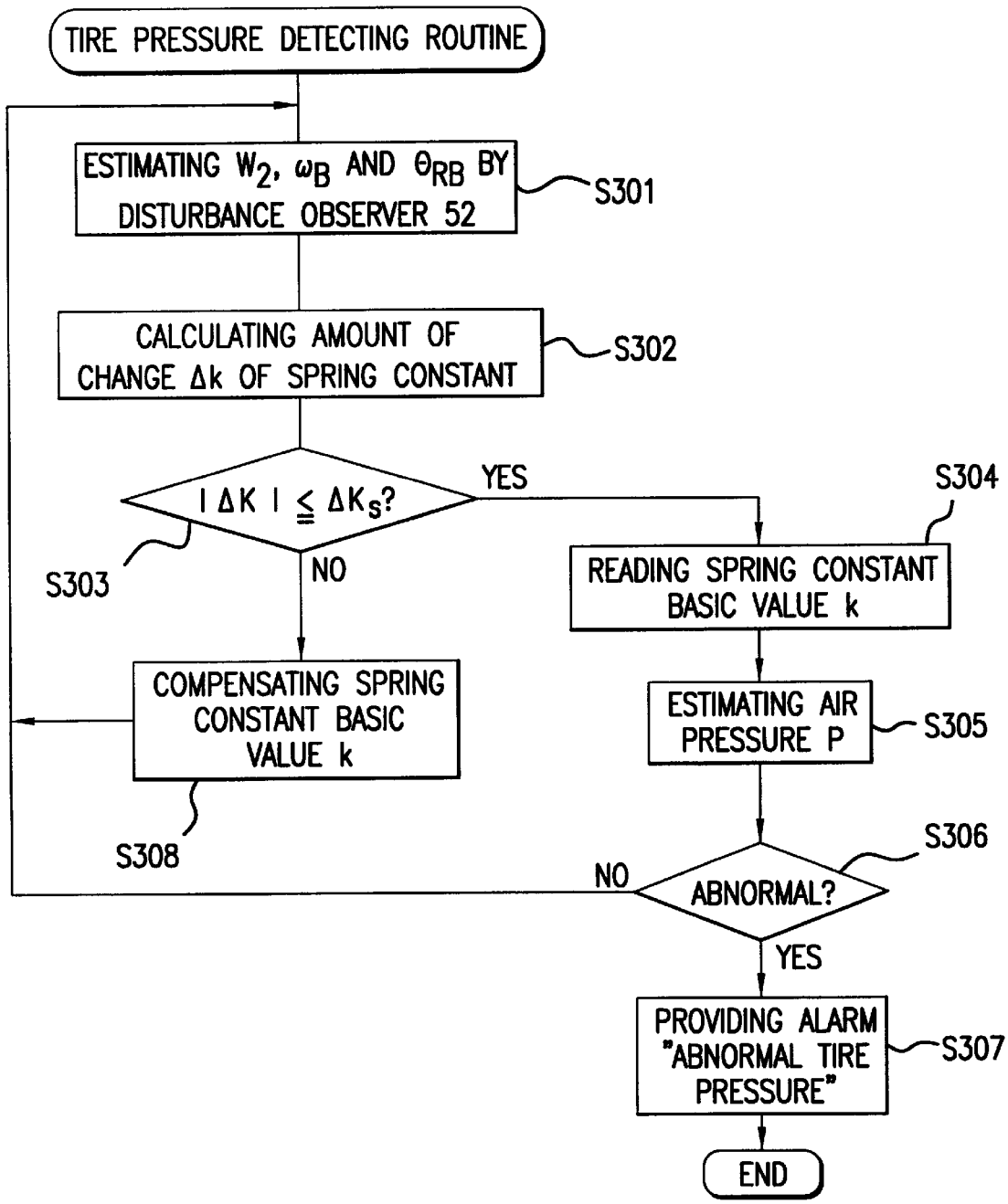
FIG. 46 is a flow chart illustrating a tire pressure detecting routine according to a control program stored in a read-only memory of a computer used by the apparatus of FIG. 44.

Referring next to FIGS. 44–46, there will be described an eighth embodiment of the present invention, which includes the rotor 10, magnetic pickup 12, teeth 16, waveform shaper 18, computers 20 and 47, display device 66, torque detector 68 and vehicle speed sensor 70, as in the first embodiment shown in FIG. 1. The functions of these elements are substantially the same as those of the elements of the first embodiment. The present embodiment is different from the first embodiment in that the pre-processing filter 64 is not provided between the computers 20, 47, and that the ROM 49 of the computer 47 stores various control programs including a tire air pressure detecting routine as illustrated in the flow chart of FIG. 46. Thus, the computer 47 constitutes a disturbance observer 52, pre-processor 54, correlation calculator 56, normalizer 58, basis value compensator 60, determining processor 62, and a wheel speed generator 65, as shown in FIG. 45.

The rim speed calculator/compensator 45 shown in FIG. 45 is adapted to calculate the wheel speed v of each of the tired wheels 14, and adjust the calculated speed of each wheel 14, on the basis of the vehicle running speed (speed of the vehicle body 72) detected by a suitable vehicle speed sensor 70 as indicated in FIG. 44, in the same manner as in the first embodiment. That is, the routines of FIGS. 5 and 6 are executed by the rim speed calculator/compensator 45.

The thus obtained wheel speed v is used by the disturbance observer 52 and the wheel speed generator 65 as shown in FIG. 45. In the same manner as in the first embodiment, the disturbance observer 52 operates to estimate the disturbance $w_2=(-1/J_B)T_d+(\Delta K/J_B)\theta_{RB}$, due to the amount of change $\Delta K$ of the spring constant K of the torsion spring 32. Similarly, the disturbance observer 52 operates to estimate the disturbance due to the change $\Delta J_B$ of the moment of inertia $J_B$ of the belt 30, and the disturbance due to the change $\Delta J_R$ of the moment of inertia $J_R$ of the rim 28.

The disturbance observer 52 receives an angular velocity $\omega_R$ as the wheel motion state indicative of an amount of the motion of the tired wheel. The angular velocity $\omega_R$ is calculated, taking the radius R of the tire 26 into account, from the wheel speed v of the wheel 14 that is calculated and compensated by the rim speed calculator/compensator 45. Then, the disturbance observer 52 estimates the disturbance $w_2$ as indicated above, due to the amount of change $\Delta K$ of the spring constant K of the torsion spring 32, on the basis of basic values of wheel information, including a basic value of the moment of inertia $J_R$ of the rim 28, a basic value of the moment of inertia $J_B$ of the belt 30, and a basic value of the spring constant K of the torsion spring 32 provided between the rim 28 and the belt 30. Thus, the estimated disturbance value $w_{2p}$ is obtained, and at the same time the angular velocity $\omega_B$ of the belt 30 and the torsion angle $\theta_{RB}$ between the rim 28 and the belt 30 are estimated, to provide respective estimated values $\omega_{Bp}$, $\theta_{RBp}$.

The pre-processor 54 operates to perform a preliminary processing operation necessary for the correlation calculator 56 to operate. That is, the pre-processor 54 is adapted to calculate an angular acceleration $\omega_R'$ of the rim 28 and an estimated value $\omega_{Bp}'$ of the angular acceleration $\omega_B'$, on the basis of the detected angular velocity $\omega_R$ of the rim 28 and the estimated angular velocity $\omega_{Bp}$ of the belt 30 obtained by the disturbance observer 52.

The correlation calculator 56 operates to calculate correlation functions, on the basis of the estimated disturbance $w_{2p}$ and torsion angle $\theta_{RBp}$, by executing the flow chart of FIG. 11 as used in the first embodiment. Using the calculated correlation functions, the normalizer 58 performs a normalizing operation and calculates the amount of change $\Delta K$ of the spring constant of the torsion spring 32, from the above-indicated basic value K of the spring constant, in the same manner as in the first embodiment. As a result, the value $L_K=C(w_{2p}, \theta_{RBp})/C(\theta_{RBp}, \theta_{RBp})$ is obtained by the normalizer 58.

The basic value compensator 60 operates to compensate the spring constant basic value K of the torsion spring 32, on the basis of the above value $L_K$ stored in the $L_K$ memory of the RAM 50. The value $L_K$ is also expressed by the following equation: $L_K=(-1/J_B)C_0+\Delta K/J_B$, and the amount of change $\Delta K$ of the spring constant is calculated according to a data table stored in the ROM 49, which represents a relationship between the value $L_K$ and the amount of change $\Delta K$. The basic value compensator 60 is adapted to compensate the spring constant basic value K of the disturbance observer 52, on the basis of the calculated amount of change $\Delta K$.

When the disturbance observer 52 is operated for the first time after a power-on switch of the vehicle is turned on, a nominal or predetermined value is used as the basic value K of the spring constant. Namely, the disturbance observer 52 uses the nominal value as the initial value of the spring constant basic value K. Once the initial value is compensated, however, the compensated value is used as the spring constant basic value K. The spring constant basic value K which has been compensated is stored in a "basic value" memory of the RAM 50.

The compensation of the spring constant basic value K is repeated until the absolute value of the amount of change $\Delta K$ of the spring constant becomes equal to or smaller than a predetermined reference value $\Delta K_s$ (which is 0 or approximately 0, for example). Namely, the compensation is repeated until the spring constant basic value K used by the disturbance observer 52 becomes sufficiently close to an actual or current spring constant of the torsion spring 32. Thus, the basic value K obtained as a result of the compensation is estimated as the current spring constant of the torsion spring 32.

In the present embodiment, the spring constant basic value K is compensated on the basis of the amount of change $\Delta K$, such that the amount and direction (negative or positive) of compensation of the basic value K are determined depending upon the amount of change $\Delta K$. However, the amount of compensation of the basic value K may be a fixed value irrespective of the amount of change $\Delta K$, while the direction of compensation of the basic value K is determined depending on whether the amount of change $\Delta K$ is positive or negative.

The determining processor 62 operates to read the spring constant basic value K stored in the "basic value" memory of the RAM 50 as the estimated spring constant of the torsion spring 32, and estimate the air pressure P of the tire 26 on the basis of the basic value K. When the thus estimated air pressure P is lower than a predetermined reference value $P_0$, this means that the air pressure P of the tire 26 is abnormally low, and the display device 66 provides an indication informing the vehicle operator of this fact.

While the respective operations of the disturbance observer 52, correlation calculator 56, normalizer 58, basic value compensator 60 and determining processor 62 have been described in detail, the functional relationship among these elements will be hereinafter described, referring to the tire air pressure detecting routine as illustrated in the flow chart of FIG. 46.

In the first step S301, the disturbance observer 52 estimates the disturbance $w_2$, the angular velocity $\omega_B$ of the belt 30 and the torsion angle $\theta_{RB}$, on the basis of the angular velocity $\omega_R$ of the rim 28 received from the rim speed calculator/compensator 45, and the driving or braking torque $T_1$ received from the torque detector 68.

Step S302 is then implemented to execute the routine for calculating correlation functions for variation of the spring constant K, as illustrated in the flow chart of FIG. 11. More specifically, a cross-correlation function $C(w_{2p}, \theta_{RBp})$ and an auto-correlation function $C(\theta_{RBp}, \theta_{RBp})$ are respectively calculated, and the value $L_K$ is obtained by dividing the cross-correlation function $C(w_{2p}, \theta_{RBp})$ by the auto-correlation function $C(\theta_{RBp}, \theta_{RBp})$. Then, the amount of change $\Delta K$ of the spring constant (an amount of change from the basic value K) is obtained on the basis of the thus obtained value $L_K$, using the data table representative of the $L_K$–$\Delta K$ relationship.

Step S302 is followed by step S303 to determine whether the absolute value of the amount of change $\Delta K$ of the spring constant is equal to or smaller than the reference value $\Delta K_s$. If an affirmative decision (YES) is obtained in this cycle in step S303, read step S304 is then implemented to read the current spring constant basic value K from the "basic value" memory, as the actual spring constant. Step S305 is then implemented to estimate the current level of the air pressure P of the tire 26, on the basis of the spring constant read in step S304, according to a data table representative of a predetermined relationship between the air pressure P and the spring constant. This data table is stored in the ROM 49 of the computer 47.

The control flow then goes to step S306 to determine whether the air pressure P is lower than the reference value $P_0$, that is, whether the tire air pressure P is abnormally low. If a negative decision (NO) is obtained in step S306, the control flow goes back to step S301. If an affirmative decision (YES) is obtained in step S306, step S307 is implemented to activate the display device 66 to provide an indication informing the vehicle operator that the air pressure P is abnormally low. In this manner, one cycle of execution of the routine of FIG. 46 is terminated.

If the absolute value of the amount of change $\Delta K$ of the spring constant is larger than the reference value $\Delta K_s$, a negative decision (NO) is obtained in step S303, and step S308 is implemented to compensate the spring constant basic value K used by the disturbance observer 52. The compensation may be effected by adding the amount of change $\Delta K$ calculated in the current cycle to the basic value K, or using a predetermined relationship among the basic value K, amount of change $\Delta K$ and amount of compensation for the basic value K. After the basic value K is compensated in step S308, the control flow goes back to step S301, and the disturbance observer 52 estimates the above values $w_2$, $\omega_B$ and $\theta_{RB}$, on the basis of the compensated spring constant basic value K. If the absolute value of the amount of change $\Delta K$ is still larger than the reference value $\Delta K_s$, in spite of the compensation effected in the previous cycle, a negative decision (NO) is obtained again in step S303, and the basic value K is compensated again in step S308. The compensation of step S308 is repeated until the absolute value of the amount of change $\Delta K$ becomes equal to or smaller than the reference value $\Delta K_s$, and an affirmative decision (YES) is obtained in step S303.

The wheel speed generator 65 compensates the wheel speed v received from the rim speed calculator/compensator 45, on the basis of the disturbance estimated by the disturbance observer 52, and provides an output representative of the compensated wheel speed v.

As described above, the disturbance $w_{2p}$ estimated by the disturbance observer 52 on the basis of the equation (11) is expressed by the equation (8): $w_{2p}=(-1/J_B)T_d+(\Delta K/J_B)\theta_{RB}$. The second term of the right member of the equation (8) is successively compensated by the basic value compensator 62, and therefore will not vary abruptly or at a high rate. This means that the second term of the right member is negligibly small as compared with the first term of the same member. Accordingly, the wheel speed generator 65 compensates the wheel speed v on the assumption that the estimated disturbance $w_{2p}$ obtained by the disturbance observer 52 according to the equation (11) is equal to $(-1/J_B)T_d$.

Described in detail, the disturbance torque $T_d$ is obtained by multiplying the estimated disturbance $w_{2p}=(-1/J_B)T_d$ by $-J_B$, and the angular velocity $\omega_{Rp}$ of the rim 28 which is caused solely by the disturbance torque $T_d$ is estimated according to the following equation (37):

$$\omega_{Rp}(s)=\{[D](s[I]-[E])^{-1}[F]\}T_d(s) \qquad (37)$$

where,

[I]: unit (identity) matrix, s: Laplace operator, $\omega_{Rp}(s)$: value obtained by Laplace transform from the estimated angular velocity $\omega_{Rp}$, $T_d(s)$: value obtained by Laplace transform from the disturbance torque $T_d$.

The [D], [E] and [F] are vectors and a matrix expressed by the following equations:

$$[D] = [1 \quad 0 \quad 0]$$

$$[E] = \begin{bmatrix} 0 & 0 & -K/J_R \\ 0 & 0 & K/J_B \\ 1 & -1 & 0 \end{bmatrix}$$

$$[F] = [0 \quad -1/J_B \quad 0]^T$$

The estimated angular velocity $\omega_{Rp}$ is one of the components causing the speed variation of the tired wheel 14, which one component is caused by the disturbance given to the wheel 14 from the road surface irregularity. The estimated angular velocity $\omega_{Rp}$ is converted into the corresponding peripheral speed of the wheel 14, and the wheel speed v received from the rim speed calculator/compensator 45 is compensated by the amount corresponding to the calculated peripheral speed, whereby the noise due to the disturbance from the road surface is eliminated from the wheel speed v.

It will be understood from the foregoing description of the present embodiment that the rotor 10, magnetic pickup 12, waveform shaper 18 and the calculator of the rim speed calculator/compensator 45 for calculating the wheel speed v cooperate to provide a detecting device for detecting the wheel motion state. It will also be understood that a portion of the computer 47 assigned to execute step S301 of the routine of FIG. 46 constitutes a disturbance observer, and a portion of the computer 47 assigned to execute step S302 of the same routine constitutes means for estimating an amount of change from the basic value to the current value of the wheel information. Further, portions of the computer 47 assigned to execute steps S303 and S308 of the same routine constitute basic value compensating means, while portions thereof assigned to execute steps S304 and S305 of the same routine constitute wheel information estimating means.

Figure 47:
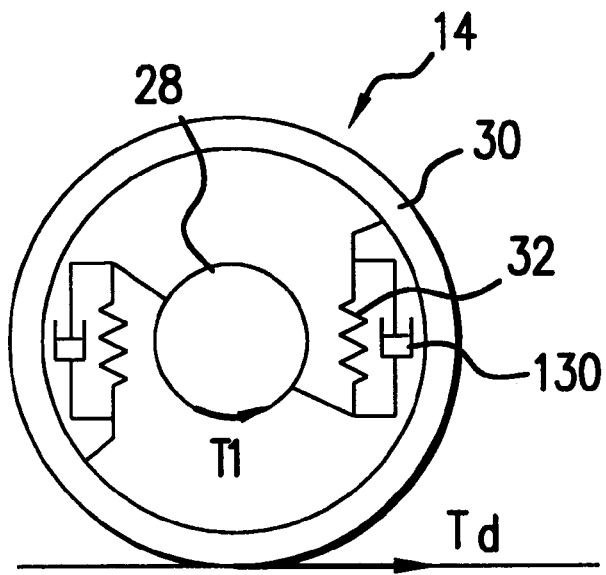
FIG. 47 is a view showing a dynamic model of a disturbance observer incorporated in a ninth embodiment of a wheel information estimating apparatus of the invention.

The tired wheel 14 is dynamically simulated as a system or model as illustrated in FIG. 47, taking account of a damper between the rim 28 and the belt 30. Namely, the dynamic model is designed such that the mutually rotatable rim 28 and the belt 30 are connected to each other, by the torsion spring 32 and a damper 130 which are disposed in parallel with each other.

Figure 48:
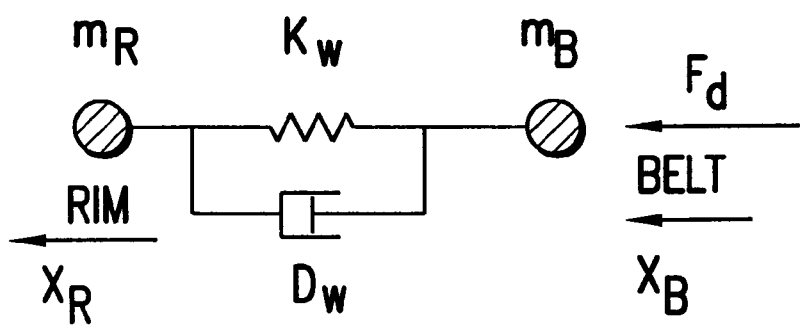
FIG. 48 is a simplified view of the dynamic model of FIG. 47.

The model of FIG. 47 may be simplified into a so-called "two-inertial model" as illustrated in FIG. 48.

The reference characters used in FIG. 47 represent the following:

$m_R$: equivalent inertial mass (weight) of the rim 28, $m_B$: equivalent inertial mass (weight) of the belt 30, $k_W$: spring constant of the torsion spring 32, $D_W$: damping coefficient of the damper 130, $x_R$: equivalent linear displacement of the rim 28, $x_B$: equivalent linear displacement of the belt 30, $x_{RB}$: equivalent relative linear displacement of the rim 28 and belt 30, $F_d$: equivalent disturbance received by the tire 26 from the road surface.

The equivalent inertial masses (weights) $m_R$, $m_B$ of the rim 28 and belt 30 in the model of FIG. 48 equivalently correspond to the moments of inertia $J_R$, $J_B$ in the model of FIG. 47, respectively, while the equivalent linear displacements $x_R$, $x_B$ of the rim 28 and belt 30 in the model of FIG. 48 equivalently correspond to the integrals of the angular velocities $\omega_R$, $\omega_B$ in the model of FIG. 47, respectively. The equivalent relative linear displacement $x_{RB}$ in the model of FIG. 48 equivalently corresponds to the torsion angle $\theta_{RB}$ in the model of FIG. 47. Further, the equivalent disturbance $F_d$ in the model of FIG. 48 equivalently corresponds to the disturbance torque $T_d$ in the model of FIG. 47. There will be described a ninth embodiment of the present invention according to the model of FIG. 48.

The dynamic model of FIG. 48 is represented by the following state equation (38):

$$\begin{bmatrix} x_R'' \\ x_B'' \\ x_{RB}' \end{bmatrix} = \begin{bmatrix} -D_W/m_R & D_W/m_R & -K_W/m_R \\ D_W/m_B & -D_W/m_B & K_W/m_B \\ 1 & -1 & 0 \end{bmatrix} \begin{bmatrix} x_R' \\ x_B' \\ x_{RB} \end{bmatrix} + \begin{bmatrix} 0 \\ 1/m_B \\ 0 \end{bmatrix} F_d \quad (38)$$

The above equation (38) does not include a parameter corresponding to the driving or braking torque $T_1$ which acts on the rim 28 based on an engine output or a braking force, because the equation (38) is formulated to include only variable parameters, with a particular attention drawn to vibrating movements of the model of FIG. 48. In this respect, the driving or braking torque $T_1$ can be considered a fixed value as distinguished from the variable parameters, such as the equivalent linear displacements $x_R$, $x_B$, first derivatives $x_R'$, $x_B'$ and second derivatives $x_R''$, $x_B''$ of those values $x_R$, $x_B$, spring constant $K_W$, and damping coefficient $D_W$.

If the spring constant $K_W$ and damping coefficient $D_W$ are changed to $(K_W+\Delta K_W)$ and $(D_W+\Delta D_W)$, respectively, due to a change of the air pressure P of the tire 26, the state equation (38) can be converted into the following equation (39), which represents an equivalent state of the model in which a disturbance acts on the model placed in its normal state:

$$\begin{bmatrix} x_R'' \\ x_B'' \\ x_{RB}' \end{bmatrix} = \begin{bmatrix} -D_W/m_R & D_W/m_R & -K_W/m_R \\ D_W/m_B & -D_W/m_B & K_W/m_B \\ 1 & -1 & 0 \end{bmatrix} \begin{bmatrix} x_R' \\ x_B' \\ x_{RB} \end{bmatrix} + \quad (39)$$

$$\begin{bmatrix} 0 \\ 1/m_B \\ 0 \end{bmatrix} F_d + \begin{bmatrix} -\Delta D_W/m_R \ (x_R' - x_B') - (\Delta K_W/m_R) x_{RB} \\ \Delta D_W/m_B \ (x_R' - x_B') + (\Delta K_W/m_B) x_{RB} \\ 0 \end{bmatrix}$$

If the equivalent disturbance $F_d$ is also treated as an unknown disturbance value that cannot be measured, the disturbance to be estimated is represented by the following equation (40):

$$[w] = \begin{bmatrix} 0 \\ 1/m_B \\ 0 \end{bmatrix} F_d + \begin{bmatrix} -\Delta D_W/m_R \ (x_R' - x_B') - (\Delta K_W/m_R) x_{RB} \\ \Delta D_W/m_B \ (x_R' - x_B') + (\Delta K_W/m_B) x_{RB} \\ 0 \end{bmatrix} \quad (40)$$

If the disturbance represented by the second elements of the right member of the above equation (40) is to be estimated, the disturbance $w_2$ is represented by the following equation (41):

$$w_2 = (\Delta D_W/m_B)(x_R' - x_B') + (\Delta K_W/m_B) x_{RB} + F_d/m_B + n \quad (41)$$

where, "n" represents a term representative of an error which arises because only the second elements are used to estimate the disturbance $w_2$.

Therefore, the following state equation (42) represents the model when the air pressure of the tire 26 is changed:

$$\begin{bmatrix} x_R'' \\ x_B'' \\ x_{RB}' \end{bmatrix} = \begin{bmatrix} -D_W/m_R & D_W/m_R & -K_W/m_R \\ D_W/m_B & -D_W/m_B & K_W/m_B \\ 1 & -1 & 0 \end{bmatrix} \begin{bmatrix} x_R' \\ x_B' \\ x_{RB} \end{bmatrix} + \begin{bmatrix} 0 \\ 1 \\ 0 \end{bmatrix} w_2 \quad (42)$$

The wheel information estimating apparatus according to the present embodiment is based on the above analysis, and includes a disturbance observer 160 to estimate the disturbance $w_2$ for obtaining the amount of change of the air pressure P of the tire 26. The present wheel information estimating apparatus is constructed as described below.

Figure 49:
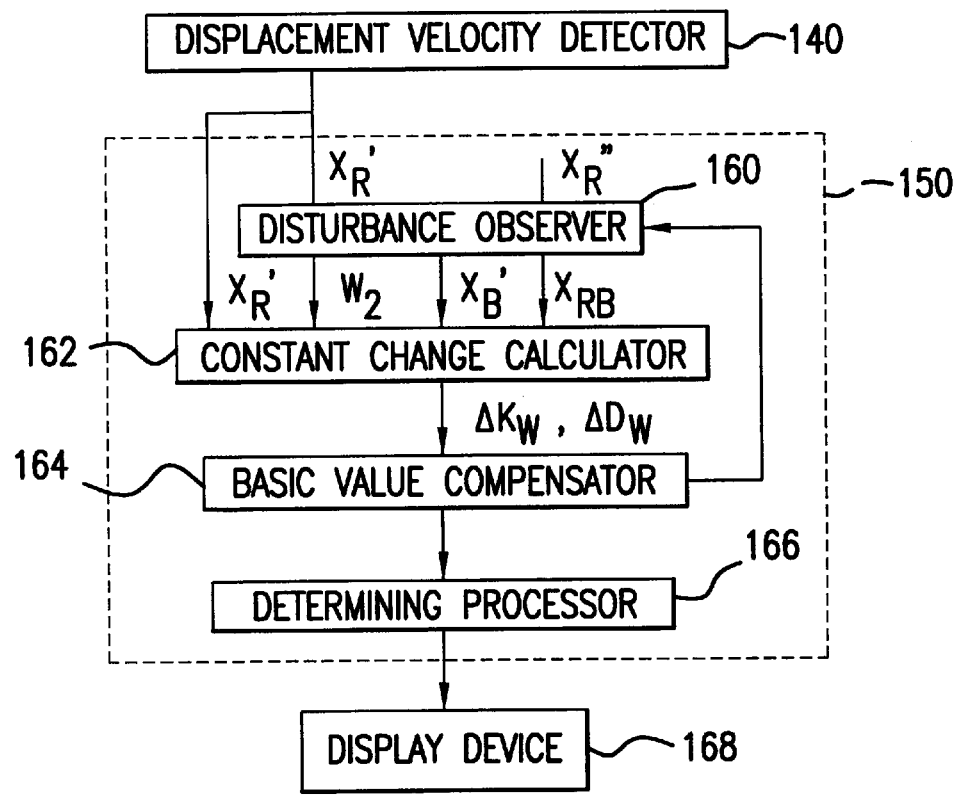
FIG. 49 is a block diagram showing the functional elements of the apparatus according to the embodiment of FIG. 47.
Figure 50:
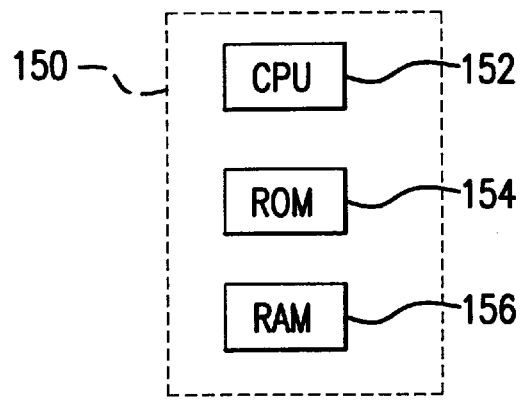
FIG. 50 is a block diagram depicting a computer used in the apparatus of FIG. 49.

The apparatus includes a displacement velocity detecting device 140 as illustrated in the functional block diaphragm of FIG. 49. The device 140 is adapted to detect an equivalent linear displacement velocity $x_R'$ of the rim 28, and is connected to a computer 150. The device 140 operates to determine the angular velocity $\omega_R$ of the rim 28 by magnetically detecting the passage of the teeth 16 formed along the outer periphery of the rotor 10. The equivalent linear displacement velocity $x_R'$ is calculated on the basis of the determined angular velocity $\omega_R$. As shown in FIG. 50, the computer 150 incorporates a CPU 152 as a central processing unit, a ROM 154 as a first memory device, and a RAM 156 as a second memory device. The computer 150 provides the above-indicated disturbance observer 160, a constant change calculator 162, a basic value compensator 164 and a determining processor 166, as indicated in FIG. 49.

The disturbance observer 160 is identical in construction with the disturbance observer 52 used in the previous embodiments, except for the following:

If the disturbance to be estimated is approximated as $w_2'=0$, the expanded system of the linear system represented by the above equation (42) is represented by the following equation (43):

$$\begin{bmatrix} x_R'' \\ x_B'' \\ x_{RB}' \\ w_2' \end{bmatrix} = \begin{bmatrix} -D_W/m_R & D_W/m_R & -K_W/m_R & 0 \\ D_W/m_B & -D_W/m_B & K_W/m_B & 1 \\ 1 & -1 & 0 & 0 \\ 0 & 0 & 0 & 0 \end{bmatrix} \begin{bmatrix} x_R' \\ x_B' \\ x_{RB} \\ w_2 \end{bmatrix} \quad (43)$$

Of the physical values in the above equation (43), only the equivalent linear displacement velocity $x_R'$ of the rim 28 can be detected.

The disturbance observer 160 can be formulated in the same manner as described above, by re-defining the matrices in the above equation (43) as follows:

$[x_a] = x_R'$ $[x_b] = [x_B' \ x_{RB} \ w_2]^T$ $[u] = 0$ $[A_{11}] = -D_W/m_R$ $[A_{12}] = [D_W/m_R \ -K_W/m_R \ 0]$ $[A_{21}] = [D_W/m_B \ 1 \ 0]^T$ $[A_{22}] = \begin{bmatrix} -D_W/m_B & K_W/m_B & 1 \\ -1 & 0 & 0 \\ 0 & 0 & 0 \end{bmatrix}$ $[B_1] = 0$ $[B_2] = [0 \ 0 \ 0]^T$ In essence, the present embodiment is adapted such that the disturbance observer 160 estimates the equivalent linear displacement velocity $x_B'$ and the equivalent relative linear displacement $x_{RB}$ of the linear system relating to the rotation of the tired wheel, on the basis of at least the equivalent linear displacement velocity $x_R'$ of the rim 28 detected by the displacement velocity detector 140, equivalent inertia mass $m_R$ of the rim 28, equivalent inertia mass $m_B$ of the belt 30, spring constant basic value $K_W$ of the torsion spring 32 between the rim 28 and the belt 30, and damping coefficient basic value $K_W$ of the damper 130 between the rim 28 and the belt 30. The disturbance observer 160 also estimates the disturbance $w_2$ in the linear system. It will be understood that the above-indicated equivalent linear displacement velocity $x_R'$ is the wheel motion state indicative of the motion of the tired wheel 14, and the equivalent inertia masses $m_R$, $m_B$, spring constant basic value $K_W$, and damper coefficient basic value $D_W$ are basic values indicative of wheel information relating to various conditions of the wheel 14.

The disturbance $w_2$ thus estimated by the disturbance observer 160 is applied to the constant change calculator 162, which is adapted to calculate an amount of change $\Delta K_W$ of the spring constant $K_W$ and an amount of change $\Delta D_W$ of the damping coefficient $D_W$, on the basis of the disturbance $w_2$.

As described above, $w_2$ is represented by the following equation: $w_2 = (\Delta D_W/m_B)(x_R'-x_B') + (\Delta K_W/m_B)x_{RB} + F_d/m_B + n$. This equation is used to calculate the amount of change $\Delta K_W$ and the amount of change $\Delta D_W$ by the least square method. Explained more specifically, the amounts of change $\Delta K_W$ and $\Delta D_W$ are determined such that a sum of the squares expressed by the following equation (44) is minimized, that is, such that values obtained by partial differentiation of the sum S by the respective amounts of change $\Delta K_W$ and $\Delta D_W$ are both zeroed.

$$S(\Delta K_W, \Delta D_W) = \sum_{i=1}^{N} \left( \frac{\Delta D_{W(i)}}{m_B}(x_{R(i)}' - x_{B(i)}') + \frac{\Delta K_{W(i)}}{m_B} x_{RB(i)} + \frac{F_d}{m_B} - w_{2(i)} \right)^2 \quad (44)$$

The amounts of change $\Delta K_W$ and $\Delta D_W$ are calculated using the following equation (45):

$$\begin{bmatrix} \frac{\Delta K_W}{m_B} \\ \frac{\Delta D_W}{m_B} \end{bmatrix} = \left\{ \sum_{i=1}^{N} \begin{bmatrix} R_{1(i)} \\ R_{2(i)} \end{bmatrix} [R_{1(i)} \ R_{2(i)}] \right\}^{-1} \times \left\{ \sum_{i=1}^{N} \begin{bmatrix} R_{1(i)} \\ R_{2(i)} \end{bmatrix} w_{2(i)} \right\} \quad (45)$$

where, $R_{1(i)} = x_{RB(i)}$ $R_{2(i)} = x_{R(i)}' - x_{B(i)}'$

The thus obtained amounts of change $\Delta K_W$ and $\Delta D_W$ are applied to the basic value compensator 164, which compensates or adjusts the spring constant basic value $K_W$ and the damping coefficient basic value $D_W$, according to the amounts of changes $\Delta K_W$ and $\Delta D_W$, respectively. As in the previous embodiment, the compensation is repeated until the absolute value of the amount of change $\Delta K_W$ of the spring constant becomes equal to or smaller than a predetermined reference value $\Delta K_{WS}$. The compensated basic values $K_W$ and $D_W$ are stored in a "basic value" memory of the RAM 156.

The compensated basic values $K_W$ and $D_W$ of the spring constant and damping coefficient are applied to the determining processor 166, assuming that the values KW and DW represent actual spring constant and damping coefficient. The determining processor 166 estimates the present or current value of the air pressure P, on the basis of the present values of the spring constant and the damping coefficient, according to a predetermined relationship between the spring constant and damping coefficient, and the air pressure P of the tire 26. This relationship is represented by a data table stored in the ROM 154 of the computer 150. Finally, the processor 166 determines whether the estimated air pressure P is lower than a predetermined reference value $P_0$, and activates a display device 168 to provide an indication that the air pressure P of the tire is abnormal, if the estimated air pressure P is lower than the reference value $P_0$.

The operation described above is performed according to a tire air pressure detecting routine stored in the ROM 154 of the computer 150. This routine will be described in detail by reference to the flow chart of FIG. 51.

The routine is initiated with step S311 to set the integer "i" to "1", and reset the amount of change $\Delta K_{W(i)}$ and $\Delta D_{W(i)}$ to "0". Then, step S312 is implemented to read the equivalent linear displacement velocity $x_{R(i)}'$ of the rim 28 from the displacement velocity detector 140, and store the velocity $x_{R(i)}'$ in the RAM 156.

Step S312 is followed by step S313 to calculate the equivalent linear displacement acceleration $x_{R(i)}''$ of the rim 28, which is a difference between the present velocity value $x_{R(i)}'$ and the last velocity value $x_{R(i-1)}'$ previously stored in the RAM 156. The calculated equivalent linear displacement acceleration $x_{R(i)}''$ is also stored in the RAM 156.

The control flow then goes to step S314 in which the disturbance observer 160 estimates the disturbance $w_{2(i)}$, and the equivalent linear displacement velocity $x_{B'(i)}$ and equivalent relative linear displacement $x_{RB(i)}$ of the belt 30, on the basis of the equivalent linear displacement velocity $x_{R'(i)}$ and the equivalent linear displacement acceleration $x_{R''(i)}$. The estimated values $w_{2(i)}$, $x_{B'(i)}$ and $x_{RB(i)}$ are stored in the RAM 156.

While the equivalent linear displacement acceleration $x_{R''(i)}$ as well as the equivalent linear displacement velocity $x_{R'(i)}$ is used to estimate the disturbance $w_{2(i)}$ and others, only the equivalent linear displacement velocity $x_{R'(i)}$ may be used by the disturbance observer 160.

The disturbance observer 160 receives the equivalent linear displacement velocity and acceleration $x_{R'(i)}$, $x_{R''(i)}$ only after these inputs $x_{R'(i)}$, $x_{R''(i)}$ are filtered by a high-pass filter (not shown), so that only the variable components of the velocity and acceleration $x_{R'(i)}$, $x_{R''(i)}$ are used by the observer 160.

Then, step S315 is implemented to determine whether the integer "i" is equal to or larger than a predetermined value "N" or not. If not, a negative decision (NO) is obtained in step S315, and step S316 is implemented to increment the integer "i" to repeat the above steps S312–S315. With these steps S312–S316 repeated the predetermined number "N" of times, a total of "N" sets of $x_{R'(i)}$, $x_{B'(i)}$, $w_{2(i)}$ and $x_{RB(i)}$ are stored in the RAM 156, and an affirmative decision (YES) is obtained in step S315. In this case, step S317 is implemented to calculate the amounts of change $\Delta K_{W(i)}$ and $\Delta D_{W(i)}$. More specifically, these amounts of change $\Delta K_{W(i)}$ and $\Delta D_{W(i)}$ are calculated by the least square method on the basis of the "N" sets of data indicated above. Step S317 is followed by step S318 to determine whether the absolute value of the amount of change $\Delta K_{W(i)}$ is equal to or smaller than the reference value $\Delta K_{WS}$ or not. If an affirmative decision (YES) is obtained in step S318, the control flow goes to step S319.

In step S319, the current level of the air pressure P is estimated, on the basis of the spring constant basic value $K_W$ and the damping coefficient basic value $D_W$, which are retrieved from the "basic value" memory of the RAM 156, and which are considered to represent the actual spring constant and damping coefficient. Step S319 is followed by step S320 to determine whether the air pressure P is lower than the reference value $P_0$ or not. If not, the display device 168 is not activated to inform the vehicle operator of the abnormal air pressure P. In this case, a negative decision (NO) is obtained in step S320, and step S322 is then implemented to reset the integer "i" to 1. Then, the control flow goes back to step S312, and subsequent steps are executed in the next cycle of execution of this routine.

If the air pressure P is lower than the reference value $P_0$, an affirmative decision (YES) is obtained in step S320, and step S321 is implemented to activate the display device 168 to provide an indication to inform the vehicle operator that the air pressure P is abnormal. In this case, the execution of the routine is terminated with step S321.

If the absolute value of the present amount of change $\Delta K_{W(i)}$ of the spring constant is larger than the reference value $\Delta K_{WS}$, a negative decision (NO) is obtained in step S318, and step S323 is implemented to compensate the spring constant basic value $K_W$ and the damping coefficient basic value $D_W$ used by the disturbance observer 160, on the basis of the currently obtained amounts of changes $\Delta K_{W(i)}$ and $\Delta D_{W(i)}$. This step S323 is equivalent to step S308 of the routine of FIG. 46 of the previous embodiment. After executing step S323, the control flow goes back to step S312, and steps S312–S323 are repeated until an affirmative decision (YES) is obtained in step S318, that is, until the absolute value of the amount of change $\Delta K_{W(i)}$ becomes equal to or smaller than the reference value $\Delta K_{WS}$.

While only the amount of change $\Delta K_{W(i)}$ is compared with the reference value $\Delta K_{WS}$ in step S318, the amount of change $\Delta D_{W(i)}$ as well as the amount of change $\Delta K_{W(i)}$ may be compared with the reference value $\Delta D_{WS}$. For example, the compensation of the basic values $K_W$, $D_W$ may be repeated until the absolute values of the amounts of change $\Delta K_{W(i)}$ and $\Delta D_{W(i)}$ become equal to or smaller than the respective reference values $\Delta K_{WS}$ and $\Delta D_{WS}$, and an affirmative decision (YES) is obtained in step S318.

While the "basic value" is a predetermined nominal value in the present embodiment, the basic value according to the present invention may be 0 or any value other than the nominal value.

It will be understood from the above description of the present embodiment that the rotor 10, magnetic pickup 12, waveform shaper 18, the calculator of the rim speed calculator/compensator 45 for calculating the wheel speed cooperate to provide a detecting device for detecting the wheel motion state as indicated above. It will also be understood that portions of the computer 47 assigned to execute steps S312 and S314 of the routine of FIG. 51 constitute a disturbance observer, and that a portion of the computer 47 assigned to execute step S317 of the same routine constitutes means for estimating an amount of change from the basic value to the current value of the wheel information as indicated above. Further, portions of the computer 47 assigned to execute steps S323 and S318 of the same routine constitute basic value compensating means, while a portion thereof assigned to execute step S319 of the same routine constitutes wheel information estimating means.

Figure 51:
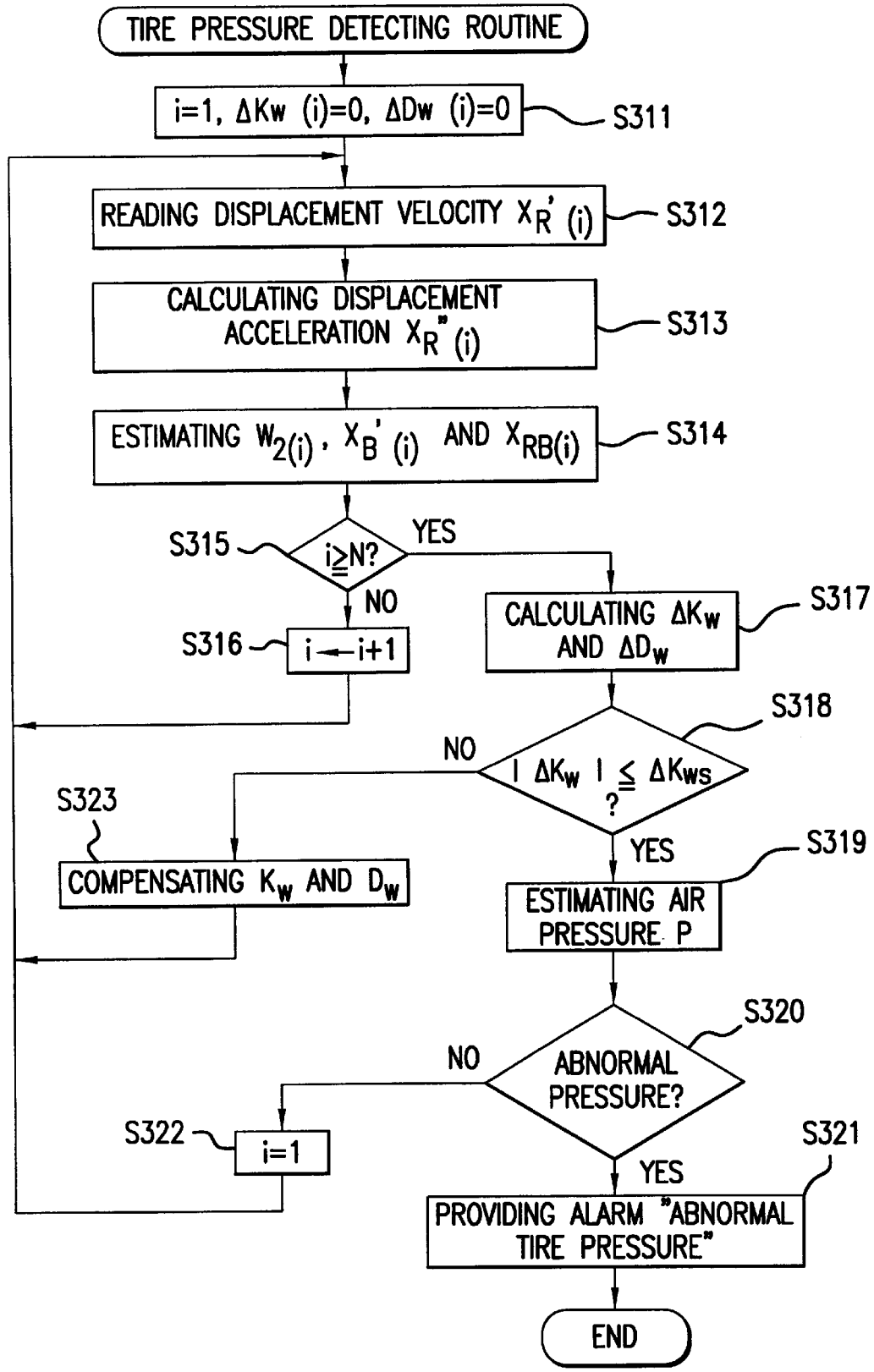
FIG. 51 is a flow chart illustrating a routine for detecting air pressure of the tired wheel according to a control program stored in the read-only memory of the computer of FIG. 50.

It will be understood that the tire air pressure detecting routine of FIG. 51 is formulated such that the amounts of change $\Delta K_W$ and $\Delta D_W$ are calculated each time the predetermined "N" set of data $x_{R'(i)}$, $x_{B'(i)}$, $w_{2(i)}$ and $x_{RB(i)}$ have been stored in the RAM 156. However, the routine may be modified such that the amounts of change $\Delta K_W$ and $\Delta D_W$ are calculated each time a new set of those data has been stored in the RAM 156 after "N" sets of the data have been stored. In this case, the above equation (45) is modified so as to update the "N" sets of data such that the first stored set of data (oldest set of data) is replaced by the last stored set of data (newly obtained set of data). An example of such modified routine is illustrated in the flow chart of FIG. 52. This modified routine will be described, with a brief explanation of the steps similar to those of the routine of FIG. 51.

Figure 52:
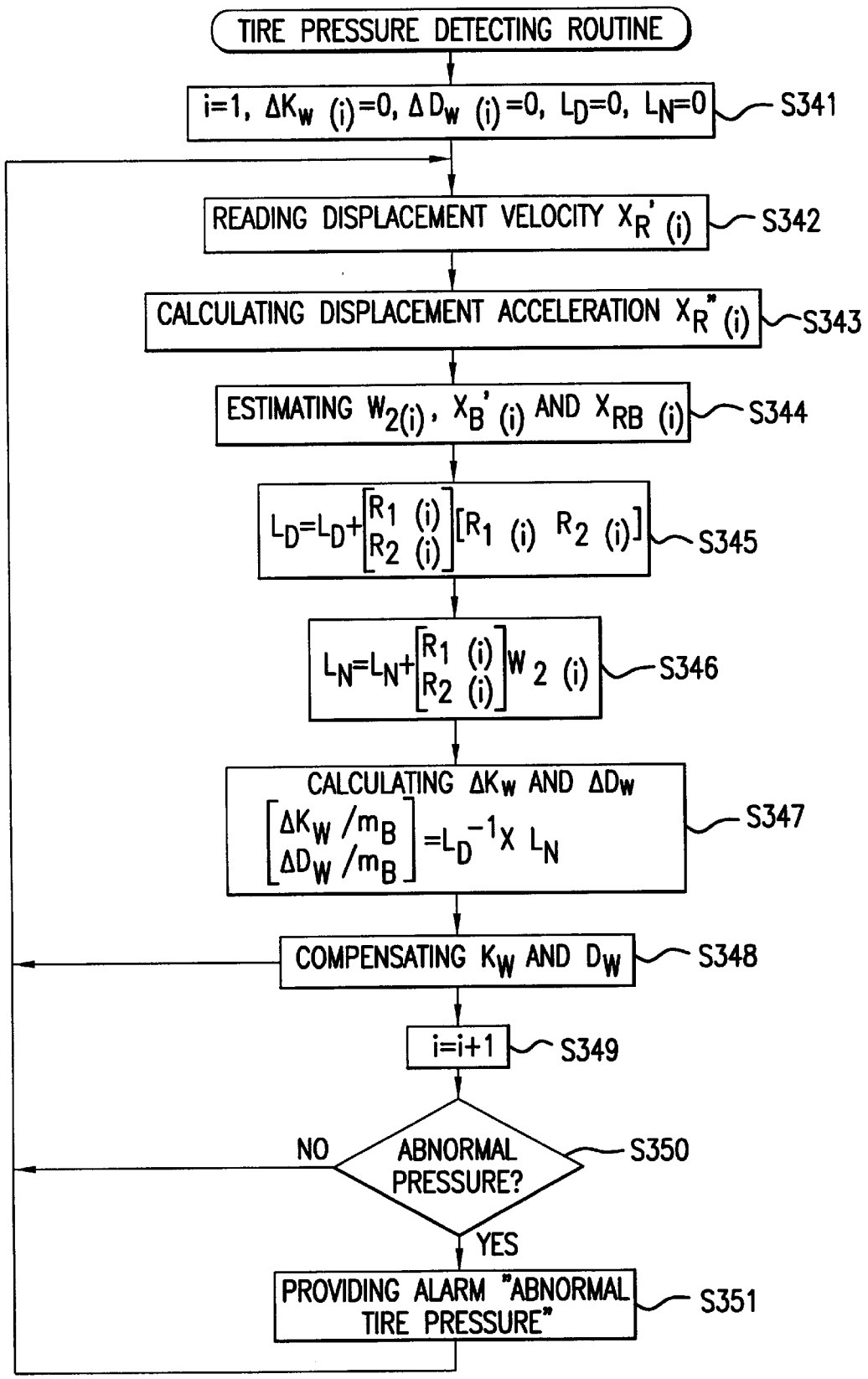
FIG. 52 is a flow chart illustrating a modified tire pressure detecting routine according to a control program stored in the read-only memory.

The routine of FIG. 52 is initiated with step S341 to set the integer "i" to "1", and zero not only the amounts of change $\Delta K_{W(i)}$ and $\Delta D_{W(i)}$ but also matrices $L_D$ and $L_N$. The matrix $L_D$ is represented by the left term of the right member of the above equation (45), while the matrix $L_N$ is represented by the right term of the right member of the equation (45).

Step S341 is followed by step S342 to calculate the equivalent linear displacement velocity $x_{R'(i)}$ on the basis of the output of the displacement velocity detector 140. Step S343 is then implemented to calculate the equivalent linear displacement acceleration $x_{R''(i)}$. Step S343 is followed by step S344 in which the disturbance observer 160 estimates the disturbance $w_{2(i)}$, the equivalent linear displacement velocity $x_{B'(i)}$ and the equivalent relative linear displacement $x_{RB(i)}$, on the basis of the variable components of the velocity and acceleration $x_{R'(i)}$, $x_{R''(i)}$.

The control flow then goes to step S345 to add to the present value of the matrix $L_D$ an increment based on the present values of the equivalent linear displacement velocities $x_{R\,(i)}'$, $x_{B\,(i)}'$ and the equivalent relative linear displacement $x_{RB(i)}$. Step S346 is then implemented to add to the present value of the matrix $L_N$ an increment based on the present values of $x_{R\,(i)}'$, $x_{B\,(i)}'$, $x_{RB(i)}$ and the present value of the disturbance $w_{2(i)}$. Thus, steps S345 and 346 are provided to update the matrices $L_D$ and $L_N$. Then, the control flow goes to step S347 to calculate the amounts of change $\Delta K_{W(i)}$ and $\Delta D_{W(i)}$ by inserting $L_D$ and $L_N$ in the equation (45). Step S347 is followed by step S348 to compensate the spring constant basic value $K_W$ and the damping coefficient basic value $D_W$ used by the disturbance observer 160, on the basis of the calculated amounts of change $\Delta K_{W(i)}$ and $\Delta D_{W(i)}$. The content of this step S348 is the same as that of steps S318 and S323 of the routine of FIG. 51.

The control flow then goes to step S349 to increment the integer "i", and then to step S350 to determine whether the air pressure P is abnormal or not. This determination is made on the assumption that the present basic values $K_W$ and $D_W$ represent actual spring constant and damping coefficient, respectively. If an affirmative decision (YES) is obtained in step S350, step S351 is implemented to activate the display device 66 to inform the vehicle operator of the abnormal air pressure P. The control flow then goes back to step S342.

While the present invention has been described in detail above in its presently preferred embodiments, it is to be understood that the present invention is not limited to the details of the illustrated embodiments, but may be modified with changes, modifications and improvements, which may occur to those skilled in the art, without departing from the scope of the invention defined in the following claims.

What is claimed is:

1. A wheel information estimating apparatus, comprising:
   a detecting device for detecting a wheel motion state relating to a movement of a tired wheel of a motor vehicle;
   estimating means for estimating wheel information relating to the tired wheel, on the basis of said wheel motion state detected by said detecting device, by using a model of the tired wheel and an internal parameter which is a constant of a mechanical element of said model, said model having a rim and a belt which are connected to each other by a torsion spring; and
   modifying means for modifying said internal parameter so as to improve accuracy of the estimated value of the wheel information obtained by said estimating means.

2. A wheel information estimating apparatus according to claim 1, wherein said wheel motion state has a plurality of frequency components, the apparatus further comprising frequency characteristic modifying means for modifying a frequency characteristic of said wheel motion state to be supplied to the estimating means, such that a ratio of a strength of the selected one of the plurality of frequency components of said wheel motion state, said selected one being within a selected frequency range, to a strength of the other frequency components outside said selected frequency range is increased.

3. A wheel information estimating apparatus according to claim 2, wherein said frequency characteristic modifying means comprises a pre-processing filter disposed between said detecting device and said estimating means, for selecting a component of a signal supplied from said detecting device to said estimating means, the selected component being within said selected frequency range, and for supplying the selected component to said estimating means.

4. A wheel method of assaying translational recoding in vitro comprising (a) providing a translational reporter vector comprising a polylinker interposed between first and second luciferase coding sequences wherein said first and second luciferase coding sequences are in different reading frames;

(b) inserting a DNA to be tested in said reporter vector at the polylinker to form a test vector such that the first and second luciferase coding sequences remain in different reading frames;

(c) inserting the DNA to be tested in said reporter vector at the polylinker to form a control vector such that the first and second luciferase coding sequences are in the same reading frame;

(d) separately transcribing said reporter vector, said test vector, and said control vector in vitro to result in respective RNAs comprising transcription copies of said first luciferase coding sequence said DNA to be tested, and said second luciferase coding sequence;

(e) separating translating each of said RNAs in vitro to result in translation products thereof;

(f) determining luminescences attributable to each of said translation products, wherein the tranaslation products of the reporter vector contributed background luminescence, the translation products of the control vector contribute normal luminescence, and the translation products of the test vector contribute test luminescence;

(g) subtracting background luminescence from said normal and said test luminescences and normalizing said test luminescence wiht respect to said normal luminescence.

5. A wheel information estimating apparatus according to claim 2, wherein said frequency characteristic modifying means comprises means for changing said selected frequency range so that an amount of variation of an estimated value of said wheel information obtained by said estimating means is not greater than a predetermined value.

6. A wheel information estimating apparatus according to claim 1, wherein said estimating means comprises (a) a disturbance observer for estimating a disturbance acting on the tired wheel as wheel information, on the basis of a basic value of said internal parameter, and said wheel motion state received from said detecting device, said disturbance observer estimating said disturbance as one of a plurality of variables in an equation of state indicative of a rotary motion of said wheel, and said internal parameter being a moment of inertia $J_R$ of the rim, a moment of inertia $J_B$ of the belt, and a spring constant K of said torsion spring, and (b) means for estimating an amount of change from said basic value to a value indicative of an actual state of said wheel information, on the basis of said disturbance estimated by said disturbance observer.

7. A wheel information estimating apparatus according to claim 6, further comprising (c) basic value compensating means as said modifying means for compensating said basic value of the internal parameter, on the basis of said amount of change estimated by said change amount estimating means, so that the estimated amount of change is not larger than a predetermined value; and (d) wheel information estimating means for estimating said compensated internal parameter basic value as said wheel information.

8. A wheel information estimating apparatus according to claim 7, wherein said rim and said belt of said model of the tired wheel are rotatable relative to each other, said disturbance observer estimating an angular velocity $\omega_B$ of the belt, a torsion angle $\theta_{RB}$ between the rim and the belt, and a disturbance $w_2$, on the basis of a detected value of an angular velocity $\omega_R$ of the rim as said wheel motion state, and basic values of said moment of inertia $J_R$ of the rim, said moment of inertia $J_B$ of the belt, and said spring constant K, as said internal parameter basic value, said change amount estimating means estimating an amount of change $\Delta K$ from the basic value of said spring constant K to a value indicative of an actual spring constant, on the basis of estimated values of said angular velocity $\omega_B$ of the belt, said torsion angle $\theta_{RB}$, and said disturbance $w_2$, said basic value compensating means compensating the basic value of said spring constant K, so that the estimated amount of change $\Delta K$ is not larger than a predetermined value, said wheel information estimating means estimating the basic value of the spring constant K as said wheel information, when said amount of change $\Delta K$ is not larger than said predetermined value.

9. A wheel information estimating apparatus according to claim 8, wherein said disturbance observer defines said disturbance $w_2$ as represented by the following equation:

$$w_2 = (-1/J_B)T_d + (\Delta K/J_B)\theta_{RB}$$

where $T_d$ is a disturbance torque applied from a road surface to said belt of the wherein wheel, and wherein said change amount estimating means estimates said amount of change $\Delta K$ according to a relationship between the estimated values of said disturbance $w_2$ and said torsion angle $\theta_{RB}$.

10. A wheel information estimating apparatus according to claim 9, wherein said change amount estimating means calculates a normalized value obtained by dividing a cross-correlation function of the estimated values of said disturbance $w_2$ and said torsion angle $\theta_{RB}$, by an auto-correlation function of the estimated value of said torsion angle $\theta_{RB}$, and estimates said amount of change $\Delta K$, on the basis of said normalized value as a variable representative of a relationship between said disturbance $w_2$ and said torsion angle $\theta_{RB}$.

11. A wheel information estimating apparatus according to claim 7, wherein said disturbance observer assumes an equivalent model of the tired wheel which is equivalent to a basic model in which a rim is coupled with a belt through a torsion spring and a damper which are connected in parallel with each other, such that said rim and said belt are rotatable relative to each other, said equivalent model being designed such that a rim is coupled with a belt through a torsion spring and a damper which are connected in parallel with each other, such that said rim and said belt are displaceable relative to each other in one linear direction, said disturbance observer estimating an equivalent linear displacement velocity $x_B'$ of the belt, an equivalent relative linear displacement $x_{RB}$ between the rim and the belt, and a disturbance $w_2$, on the basis of a detected value of an equivalent linear displacement velocity $x_R'$ of said rim, as said wheel motion state, and basic values of an equivalent inertial mass $m_R$ of the rim, an equivalent inertial mass $m_B$ of the belt, a spring constant $K_W$ and a damping coefficient $D_W$, as said wheel information basic value, said change amount estimating means estimating an amount of change $\Delta K_W$ from the basic value of said spring constant $K_W$ to a value indicative of an actual spring constant, and an amount of change $\Delta D_W$ from the basic value of said damping coefficient $D_W$ to a value indicative of an actual damping coefficient, on the basis of estimated values of said equivalent linear displacement velocity $x_B'$ of the belt, said equivalent relative linear displacement $x_{RB}$ and said disturbance $w_2$, said basic value compensating means compensating the basic values of the spring constant $K_W$ and the damping coefficient $D_W$, so that the estimated amounts of change $\Delta K_W$ and $\Delta D_W$ are not larger than respective predetermined values, said wheel information estimating means estimating the basic values of the spring constant $K_W$ and the damping coefficient $D_W$ as the actual spring constant and damping coefficient, when said estimated amounts of change $\Delta K_W$ and $\Delta D_W$ are not larger than said respective predetermined values.

12. A wheel information estimating apparatus according to claim 11, wherein said disturbance observer defines said disturbance $w_2$ as represented by the following equation:

$$w_2 = (\Delta D_W/m_B)(x_R' - x_B') + (\Delta K_W/m_B)x_{RB} + F_d/m_B$$

where $F_d$ is a disturbance received by said belt from a road surface, and wherein said change amount estimating means estimates the amounts of change $\Delta D_W$ and $\Delta K_W$ on the basis of estimated values of said disturbance $w_2$, said equivalent linear displacement velocity $x_B'$ of the belt, and said equivalent relative linear displacement $x_{RB}$, and said detected value of the equivalent linear displacement velocity $x_R'$ of the rim.

13. A wheel information estimating apparatus according to claim 12, wherein said wheel information estimating means estimates said amount of change $\Delta D_W$ and said amount of change $\Delta K_W$, on the basis of the estimated values of the disturbance $w_2$, the equivalent linear displacement velocity $x_B'$ of the belt, and the equivalent relative linear displacement $x_{RB}$, and the detected value of the equivalent linear displacement velocity $x_R'$ of the rim, such that respective estimated values of said amount of change $\Delta D_W$ and said amount of change $\Delta K_W$ are determined so as to substantially minimize a sum of the squares of a difference between the estimated value of the disturbance $w_2$ and a theoretical approximate value thereof.

14. A wheel information estimating apparatus according to claim 7, further comprising tire pressure estimating means for estimating an air pressure P of a tire attached to said tired wheel, on the basis of said wheel information estimated by said wheel information estimating means.

* * * * *

UNITED STATES PATENT AND TRADEMARK OFFICE
CERTIFICATE OF CORRECTION

PATENT NO. : 6,142,026
DATED : November 7, 2000
INVENTOR(S) : Hideki Ohashi et al.

It is certified that error appears in the above-identified patent and that said Letters Patent is hereby corrected as shown below:

Please replace claim 4 as follows:
-- 4. A wheel information estimating apparatus according to claim 2, wherein said frequency characteristic modifying means comprises means for changing said selected frequency range, on the basis of at least one of an estimated value of said wheel information obtained by said estimating means and a related value of said estimated value. --

Signed and Sealed this

Twenty-fifth Day of September, 2001

*Attest:*

Nicholas P. Godici

*Attesting Officer*

NICHOLAS P. GODICI
*Acting Director of the United States Patent and Trademark Office*